United States Patent
Hamada et al.

(10) Patent No.: US 6,931,198 B1
(45) Date of Patent: Aug. 16, 2005

(54) APPARATUS AND METHOD FOR DOWNLOADING DESIRED DATA SIGNAL TO USER-SELECTABLE STORAGE UNIT

(75) Inventors: Ichiro Hamada, Kanagawa (JP); Masao Mizutani, Kanagawa (JP); Hiraku Inoue, Kanagawa (JP)

(73) Assignee: Sony Corporation, (JP)

( * ) Notice: Subject to any disclaimer, the term of this patent is extended or adjusted under 35 U.S.C. 154(b) by 0 days.

(21) Appl. No.: 09/353,707

(22) Filed: Jul. 14, 1999

(30) Foreign Application Priority Data

| Jul. 15, 1998 | (JP) | ................................. 10-200269 |
| Jul. 15, 1998 | (JP) | ................................. 10-200270 |
| Jul. 15, 1998 | (JP) | ................................. 10-200271 |
| Jul. 15, 1998 | (JP) | ................................. 10-200272 |

(51) Int. Cl.$^7$ .......................... H04N 5/781; H04N 7/16; H04N 7/173

(52) U.S. Cl. ....................... 386/46; 386/125; 725/141; 725/153

(58) Field of Search .......................... 386/45, 125, 126; 707/100, 102, 1, 3–5, 10; 709/200, 203, 205, 709/217, 218, 219, 223, 224, 225, 227, 319; 360/69; H04N 5/76, 5/781, 5/783, 9/79, H04N 7/16, 7/173; 725/101, 110, 141, 153

(56) References Cited

U.S. PATENT DOCUMENTS

| 5,241,428 A | * | 8/1993 | Goldwasser et al. ........ 386/109 |
| 5,488,409 A | * | 1/1996 | Yuen et al. .................... 725/41 |
| 5,528,746 A | * | 6/1996 | Yumine et al. .............. 345/840 |
| 5,731,923 A | * | 3/1998 | Sakuma ........................ 360/69 |
| 5,978,855 A | * | 11/1999 | Metz et al. .................. 709/249 |
| 6,029,068 A | * | 2/2000 | Takahashi et al. ........ 455/426.1 |
| 6,192,454 B1 | * | 2/2001 | De Vos ....................... 711/154 |
| 6,209,029 B1 | * | 3/2001 | Epstein et al. .............. 709/219 |
| 6,314,426 B1 | * | 11/2001 | Martin et al. ................ 707/100 |

* cited by examiner

Primary Examiner—Thai Tran
(74) Attorney, Agent, or Firm—Lerner, David, Littenberg, Krumholz & Mentlik, LLP

(57) ABSTRACT

An information receiving apparatus instructs a storage device to be ready to perform a downloading operation. For example, the information receiving apparatus instructs the storage device to perform a setup for a recording wait status when the information receiving apparatus has the storage device start the downloading mode, and instructs to start and stop recording on a recording device by detecting the start and stop timing of recording data which a data transmitting section transmits. The information receiving apparatus also requests the storage device to report an operation condition at the storage device during the downloading mode. The information receiving apparatus determines a downloading-operation condition according to the operation-condition report sent from the storage device and appropriately controls the downloading operation.

54 Claims, 39 Drawing Sheets

FIG. 13

| | | | | | | | |
|---|---|---|---|---|---|---|---|
| DATA HEADER | 19 | colspan="6" | data_type (audio_data) | | | | |
| | 20 | colspan="4" | data_transmission_type (satellite) | | | colspan="2" | Tag (10) |

| | | | | | | | |
|---|---|---|---|---|---|---|---|
| DATA BODY (ATRAC) | 21 | colspan="3" | FDF field length ("1000") | colspan="4" | audio_data_type_1 (ATRAC) | | |
| | 22 | colspan="3" | audio_data_type_2 (0000) | copy-right | original or_copy | stereo mono | emphasis |
| | 23 | data_start indicator | data_end indicator | PES_data_counter | colspan="4" | reserved | | |
| | 24–26 | colspan="7" | present_PES_number | | | | | |
| | 27–28 | colspan="7" | reserved | | | | | |
| | 29 | colspan="7" | ATRAC data checksum | | | | | |
| | 30 ⋮ 188 | colspan="7" | ATRAC_data (159 bytes) | | | | | |

FIG. 14

| | CS[0] | CS[1] | CS[2] | CS[3] | CS[4] | CS[5] | CS[6] | CS[7] |
|---|---|---|---|---|---|---|---|---|
| 29 | | | | | | | | |
| 30 | AT[0] [0] | AT[0] [1] | | | | | | AT[0] [7] |
| | AT[1] [0] | | | | | | | |
| | AT[2] [0] | | | | | | | |
| 188 | AT[158] [0] | | | | | | | AT[158] [7] |

FIG. 24

| No. | ID | TYPE | DETAILED TYPE | CONNECTION STATUS | NICKNAME | ATRAC INPUT |
|---|---|---|---|---|---|---|
| 1 | id1 | DISC | MD | ON | Jimmy | ALLOWED |
| 2 | id2 | DISC | MD | ON | Eric | ALLOWED |
| 3 | id3 | VCR | ANALOG VCR | ON | VCR-1 | NOT ALLOWED |
| 4 | id4 | DISC | DVD | ON | DVD-1 | NOT ALLOWED |
| 5 | id5 | DISC | MD | ON | Jeff | NOT ALLOWED |

FIG. 38
(a) 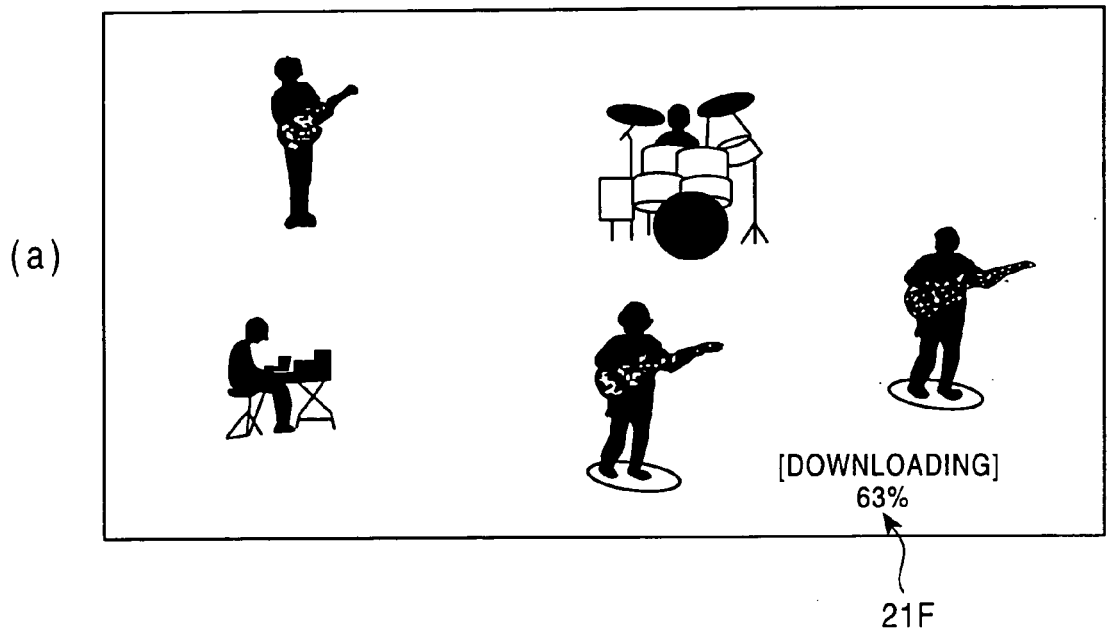
(b) 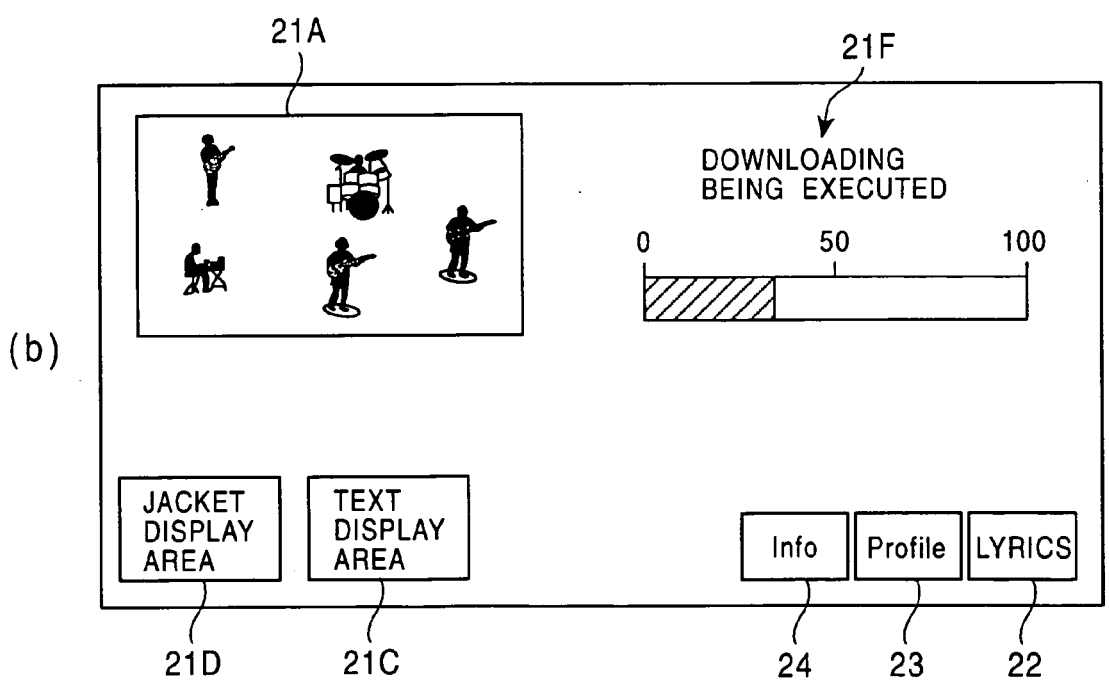

APPARATUS AND METHOD FOR DOWNLOADING DESIRED DATA SIGNAL TO USER-SELECTABLE STORAGE UNIT

BACKGROUND OF THE INVENTION

1. Field of the Invention

The present invention relates to systems for transmitting, receiving, and recording (downloading) information, such as a data service system using digital satellite broadcasting, and more particularly, to an information receiving apparatus for receiving information and for sending downloading data to a storage device.

2. Description of the Related Art

Digital satellite broadcasting has become widespread these days. Compared with analog broadcasting, digital satellite broadcasting is immune to noise and fading, and allows high-quality signal transmission. In addition, a frequency use efficiency has been improved and multiple channels can be used. In digital satellite broadcasting, for example, one satellite can provide several hundreds of channels. In such digital satellite broadcasting, a number of special channels have been provided, such as a sport channel, a movie channel, a music channel, and a news channel. In these special channels, programs having corresponding special contents are broadcasted.

It has been proposed that, with the use of the above digital broadcasting satellite system, the user be able to download audio data such as a musical piece and the user be able to make a purchase contract for a product while watching a broadcasted screen in a so-called TV shopping. In other words, the digital satellite broadcasting system provides data service broadcasting in addition to usual broadcasting.

When a musical-piece data is to be downloaded, for example, the broadcasting side multiplexes broadcasting programs with musical-piece data and broadcasts them. When the musical piece is downloaded, a graphical user interface (GUI) screen (a screen for downloading operations) is displayed to allow the user to perform interactive operations. The data of this GUI screen is also multiplexed and broadcasted.

The user having a receiving apparatus selects the desired channel and performs predetermined operations on the receiving apparatus to display the GUI screen used for downloading. When the user performs an operation on the displayed operation screen, data is sent, for example, to a digital audio unit connected to the receiving apparatus and recorded.

It can be considered that such a GUI screen used for downloading musical-piece data is provided with a required display form and a required output form including sound by handling characteristic data (files), such as audio data for outputting sound according to a predetermined operation in addition to information including image data and text data constituting the GUI screen, as objects and specifying the output forms of these objects with scenario descriptions by a predetermined method.

A display screen (including audio output) for implementing a function for a given objective by specifying with description information, such as the above GUI screen, is referred to as a "scene" in this application. An "object" indicates unit information for which its output form is specified according to description information, such as an image, sound, and text. During transmission, the data file of description information itself is treated as one "object."

Objects for implementing scene display and an audio output on the scene display are appropriately mapped onto the directory structure of data constituting scenes to be broadcasted by the broadcasting side, encoded by a predetermined transmission method, and sent. When one program needs a plurality of scenes, for example, the data of objects required for the plurality of scenes is appropriately mapped and sent.

The receiving apparatus decodes the data according to the transmission method, obtains, for example, the data of object clusters necessary for a required scene display, and outputs it as a scene.

The receiving apparatus which the user owns is connected to a storage device used for downloading. As the storage device, an MD recorder, a VCR, or a DVD recorder can be used. Appropriate collaborative operations need to be performed during downloading between the storage device and the receiving apparatus.

To ensure an accurate downloading operation, an appropriate action also needs to be taken depending on actual downloading conditions.

To execute positive downloading, the storage device needs to satisfy an operation condition for implementing downloading.

When an MD recorder is taken as an example, if a disk is not loaded or a disk is write-protected, downloading cannot be performed. A disk also needs to have a sufficient remaining recording capacity.

In addition to these medium conditions, the following conditions need to be checked for accurate downloading: whether the storage device is turned on and whether the storage device is ready to receive data from the receiving apparatus.

To perform downloading, the user needs to check that these conditions are satisfied in the storage device, and if the conditions are not satisfied, the user has to take a necessary countermeasure, such as a disk change.

Actually, however, the user does not always perform this checking appropriately, and an error occurs due to misunderstanding or an unfamiliar operation.

In such a case, even if downloading is actually started, appropriate downloading cannot be performed.

A time period required for a downloading operation differs depending on the amount of data, such as the length of a musical piece.

The user wants to know the progress of the current downloading operation. Because a downloading time differs according to the musical piece being downloaded, it is difficult to determine even an approximate progress.

It has been proposed that compressed data such as ATRAC data described later be directly sent to the storage device in downloading to reduce the downloading time. In such high-speed downloading, since musical-piece data is downloaded, for example, within a period (about one-fourth, for example) shorter than the usual performance time of the musical piece, it is more difficult for the user to know the progress.

The user may have a plurality of units of the same type, such as MD recorders. In such a case, the user may connect a plurality of storage devices to the receiving apparatus.

Then, before downloading, it is necessary to select a connected storage device to which musical-piece data is to be sent and in which the data is to be downloaded into a recording medium. This means that the user has to perform an operation for selecting the unit for which downloading is to be executed.

When the user is required to perform such a selection operation, it is demanded that the receiving apparatus know the conditions of connected units and the user perform the unit selection operation by a simpler operation method.

SUMMARY OF THE INVENTION

Accordingly, it is an object of the present invention to provide collaborative operations between an information receiving apparatus and a storage device and to appropriately handle an erroneous situation, in order to perform an appropriate downloading operation.

The foregoing object is achieved in one aspect of the present invention through the provision of an information receiving apparatus including receiving means for receiving transmitted data; data transmitting means for extracting necessary data from the received data and for transmitting the necessary data to a storage device as recording data for downloading; mode instruction means for instructing the storage device on a downloading mode; status determination means for determining the downloading-operation status of the storage device; and control means for controlling an operation progress in the downloading mode according to the determination performed by the status determination means.

The mode instruction means instructs the storage device to be ready to perform a downloading operation. For example, the mode instruction means instructs the storage device to perform a setup for a recording wait status when the mode instruction means has the storage device start the downloading mode, and instructs to start and stop recording on a recording device by detecting the start and stop timing of the recording data which the data transmitting means transmits.

The mode instruction means may request the storage device to report an operation condition at the storage device during the downloading mode.

With this operation, the storage device becomes ready to perform a downloading operation for the recording data to be transmitted from the information receiving means, and downloading appropriate for the recording data is performed.

Since detailed control of the information receiving apparatus (IRD) is unnecessary for recording of the recording data (such as ATRAC data), a large processing load is not imposed on the information receiving apparatus.

The status determination means can determine the downloading-operation status according to the report of the operation condition sent from the storage device. The control means can control an appropriate downloading operation according to the determined operation condition. When an error occurs, appropriate error processing (such as a retry of downloading) is possible. If a retry of downloading is not possible, a message is issued to the user to report the operation condition.

Since the start and stop timing of the recording on a recording medium at the storage device is correctly obtained, the progress condition of the downloading operation can be correctly managed. Therefore, a downloading operation for management information and additional information, and termination processing of the downloading mode can be appropriately executed.

When a series of downloading operations are finished, since the mode instruction means instructs the storage device to terminate the downloading mode, the storage device returns to a normal condition.

When management information and additional information can be downloaded together with the recording data (such as ATRAC data), the downloading services for the user is enhanced. When management information and additional information are superposed on a broadcast, information given by the broadcasting station (the contents offering side) can also be recorded. Copyright protection and appropriate reproduction-condition settings are allowed.

In the present invention, the information receiving apparatus appropriately performs the series of downloading operations at the storage device and a highly reliable downloading system is implemented.

In the present invention, the information receiving apparatus checks whether downloading positively fails for some reason at the storage device when downloading is to be performed.

To this end, the information receiving apparatus is provided with determination means for determining whether the storage device can perform a recording operation for recording data to be transmitted before the recording-data transmitting means starts transmitting the recording data to the storage device; and control means for controlling a data transmission operation performed by the recording-data transmitting means, according to the determination result obtained by the determination means.

Before downloading, the determination means checks whether downloading positively fails for some reason at the storage device. When it is not the case (namely, when conditions required for a downloading operation are satisfied), the control means controls such that the transmission of the recording data is started and the storage device performs downloading. Downloading failure is thus prevented.

When downloading conditions are not satisfied, a message is presented to the user to request a necessary action. Since a necessary action, such as loading a disc, changing the disc, or performing processing related to a remaining recording capacity, is requested, downloading failure caused by no loaded disc, a write-protected disc, and a low remaining recording capacity is prevented. A user's action in response to the message leads to successful downloading.

The information receiving apparatus may be further provided with device instruction means for instructing a storage device so as to be ready to receive recording data to be transmitted from the information receiving apparatus before the recording-data transmitting means starts transmitting the recording data to the storage device.

The information receiving apparatus directly controls the storage device for a condition which can be handled without any intervention by the user, such as a power status and an input-switching status, to set the storage device to a predetermined status required for a downloading operation. With this operation, a condition which can be handled without any intervention by the user can be automatically satisfied. This increases a possibility of a successful downloading and saves the time and labor of the user.

When a necessary action cannot be taken because the user is not there, downloading is not performed. In a system in which a charge is imposed according to downloading, the charge is prevented from being imposed on the user when downloading fails. This is very effective processing.

When downloading is canceled, the user is prevented from being confused or misunderstanding through prevention of the cancel condition (and a reason) to the user.

As described above, since downloading failure is prevented and successful downloading is achieved as much as possible, system reliability greatly increases.

Another object of the present invention is to allow the user to determine a downloading progress condition during downloading.

The foregoing object is achieved in another aspect of the present invention through the provision of an information receiving apparatus including receiving means for receiving transmitted data; data transmitting means for extracting necessary data from the received data and for transmitting the necessary data to a storage device as recording data for downloading; requesting means for requesting the storage device for the ongoing-recording-position information of the recording data currently being recorded, while the storage device is executing an operation for recording the recording data transmitted by the data transmitting means on a recording medium; ongoing-recording-position-information determination means for receiving the ongoing-recording-position information transmitted in response to the request of the requesting means; and progress-condition-display control means for generating the progress information data of a recording operation in the storage device according to the total-amount information of the recording data transmitted from the data transmitting means to the storage device and the ongoing-recording-position information received by the ongoing-recording-position-information determination means, and for outputting the progress information data as display data.

The information receiving apparatus requests the storage device to report the ongoing-recording-position information (such as time position information counted with the top of a musical piece being set to zero) of the recording data, determines the progress condition of the actual recording operation from the ongoing-recording-position information sent in response to the request, and generates and display progress information data.

With this operation, the user can be appropriately informed of the progress condition of the downloading operation.

When the ongoing-recording information is requested at a predetermined interval, and the progress information data is updated every time when the ongoing-recording information is received and is output as display data, the progress condition can be updated and displayed during downloading. When the predetermined interval is made shorter, the displayed progress condition is changed more smoothly and the user can easily understand the progress condition at a glance.

Still another object of the present invention is to allow the information receiving apparatus to clearly manage a connected-unit condition and thereby to facilitate a selection operation for selecting a unit to which data is to be downloaded.

The foregoing object of the present invention is achieved in still another aspect of the present invention through the provision of an information receiving apparatus including: receiving means for receiving transmitted data; recording-data transmitting means for extracting necessary data from the received data, for transmitting the necessary data to a connected storage device, and for recording it on a recording medium; device-information storage means for storing information related to each connected storage device; device-information management means for obtaining information related to each storage device connected to the information receiving apparatus and for making the device-information storage store the information; and selection control means for performing a predetermined processing related to a storage-device selection with the use of the information stored in the device-information storage means in order to determine a storage device to which data is to be transmitted from the recording-data transmitting means.

Since the information receiving apparatus makes the device-information storage means store (in a ID table) information of each storage device, such as ID information, a unit type, and information of whether a data input in a predetermined format (such as ATRAC) is allowed, in order to manage the connected-unit condition, the connected-unit condition can be accurately determined.

The control selection means can appropriately list storage devices suited to a downloading destination with the use of data stored in the device-information storage means, can present the list to the user as a unit-selection list, and can facilitate a user operation for inputting a selection for the list.

Since the selection control means can make a list suited for downloading, an inappropriate selection item is prevented from being presented to the user. Therefore, an inappropriate selection is prevented, and a highly reliable downloading system is implemented.

When name information automatically generated for a connected unit and name information which the user inputs are stored and are used for a selection list, an easy-to-understand and clear selection operation is given to the user.

When a connected storage device is disconnected, data indicating disconnection is stored corresponding to the storage device in the device-information storage means. This means that even if a storage device is disconnected, the information of the storage device is held and it can be determined that the storage device is not connected. Therefore, the information receiving apparatus holds the information of a storage unit once connected and accurately determines the actual connection condition. When a disconnected storage device is again connected, since the information thereof, such as the unit type, has already been stored, there is no need to store it again. Information collection and determination, and information writing into the device-information storage means are lightened. The user can use name data (nickname data) input and stored in the past as effective data when the storage device is connected again. The time and labor of the user for inputting name data is eliminated.

BRIEF DESCRIPTION OF THE DRAWINGS

FIG. 13 is a view showing the data body of the TS packet.

FIG. 14 is a view showing checksum data of the data body in the TS packet.

FIG. 24 is a view showing an ID table in the present embodiment.

FIG. 38 is a view showing example downloading progress conditions in the present embodiment.

DESCRIPTION OF THE PREFERRED EMBODIMENT

An embodiment of the present invention will be described below.

Taken as an example a system to which the present invention may be applied is a system in which a program is broadcasted in digital satellite broadcasting and a receiving apparatus receives information such as musical-piece data (audio data) related to the program, can output the program and the related musical-piece data, and can download the musical-piece data to a connected storage device.

The receiving apparatus (an IRD described later) in such a system also serves as an embodiment of the present invention. A Mini-Disc (MD) recorder is taken as an example of the storage device.

Figure 1:
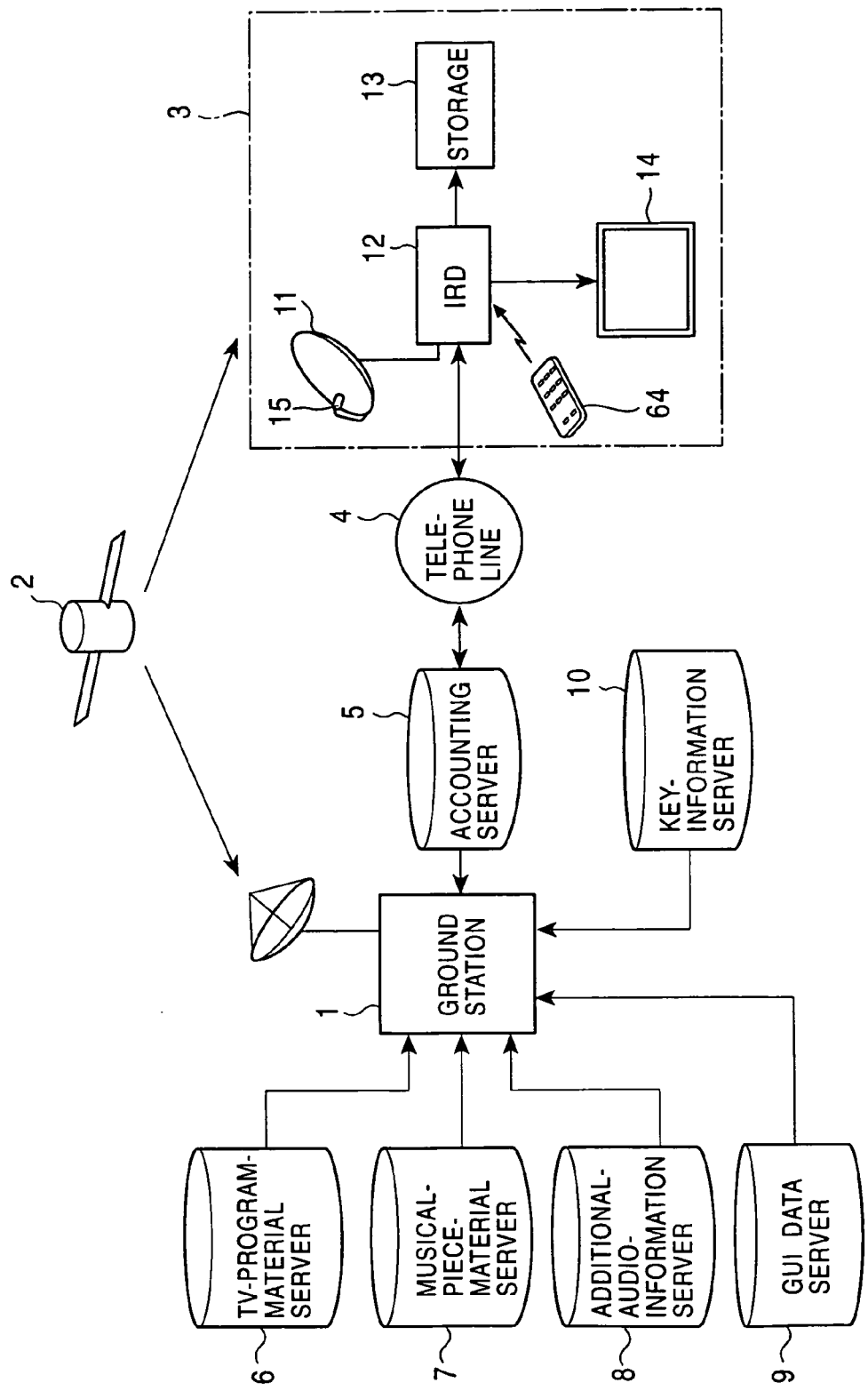
FIG. 1 is a block diagram showing an example structure of a digital-satellite-broadcasting receiving system according to an embodiment of the present invention.

The following descriptions will be made in the order shown below.
1. Digital satellite broadcasting system
   1-1. Whole structure
   1-2. Operations on GUI screen
   1-3. Ground station
   1-4. Transmission format
   1-5. Transmission format of ATRAC data
   1-6. IRD
   1-7. MD recorder
   1-8. MD area structure
2. Downloading
   2-1. Unit-connection structure
   2-2. Processing related to unit connection
   2-3. General downloading operation
   2-4. Downloading setting processing
   2-5. Check processing before downloading
   2-6. Setting up for downloading
   2-7. Downloading ATRAC data
   2-8. Downloading management/additional information and end processing
   2-9. Error processing 1. Digital Satellite Broadcasting System 1–1. Whole Structure FIG. 1 shows the whole structure of a digital satellite broadcasting system in the present embodiment. As shown in the figure, a ground station 1 for digital satellite broadcasting receives TV-program broadcasting materials sent from a TV-program-material server 6, musical-piece data materials sent from a musical-piece-material server 7, additional audio information sent from an additional-audio-information server 8, and GUI data sent from a GUI-data server 9.

The TV-program-material server 6 offers materials used for usual broadcasting programs. Music broadcasting material sent from this TV-program-material server includes moving pictures and sound. With the use of moving-picture materials and sound materials in the TV-program-material server 6, a moving picture and sound are broadcasted, for example, for new-song promotion in a music broadcasting program.

The musical-piece-material server 7 offers audio programs through audio channels. Materials in audio programs include sound only. The musical-piece-material server 7 transmits materials for audio programs through a plurality of audio channels to the ground station 1.

In program broadcasting in each audio channel, a musical piece is repeatedly broadcasted for a predetermined unit time period. Each audio channel is independent and various methods of use can be considered. In one method, for example, several of the latest Japanese pop songs are repeatedly broadcasted for a given time period in one audio channel whereas in another audio channel several of the latest foreign pop songs are repeatedly broadcasted for a given time period.

The additional-audio-information server 8 offers time information of a musical piece output from the musical-piece-material server 7 and other information.

The GUI-data server 9 offers GUI data for forming GUI screens on which the user performs operations. In a GUI screen related to musical-piece downloading, described later, for example, image data and text data for generating a list page of musical pieces to be distributed and an information page of each musical piece, data for generating a still picture for an album jacket, and other data are provided. In addition, the GUI-data server 9 offers electrical-program-guide (EPG) data used for displaying a program list called an EPG at a receiving facility 3.

The GUI data conforms, for example, to the multimedia hypermedia information coding experts group (MHEG) method. The MHEG method is an international standard of scenario descriptions in which multimedia information, procedures, and operations and combinations thereof are handled as objects, the objects are encoded, and a title (such as a GUI screen) is created therefrom. MHEG-5 is employed in the present embodiment.

The ground station 1 multiplexes the information sent from the TV-program-material server 6, the musical-piece-material server 7, the additional-audio-information server 8, and the GUI-data server 9, and sends it.

In the present embodiment, the video data sent from the TV-program-material server 6 is compression-encoded by the moving picture experts group (MPEG) 2 method, and audio data is compression-encoded by the MPEG audio method. The audio data sent from the musical-piece-material server 7 is compression-encoded by one of, for example, the MPEG audio method and the adaptive transform acoustic coding (ATRAC) method for each audio channel.

These data items are encoded by the use of key information sent from a key-information server 10 during multiplexing.

An internal-structure example of the ground station 1 will be described later.

A signal sent from the ground station is received by the receiving facility 3 at each house through a satellite 2. The satellite 2 has a plurality of transponders. One transponder has, for example, a transmission capacity of 30 Mbps. The receiving facility 3 is provided with a parabolic antenna 11, an integrated receiver decoder (IRD) 12, a storage device 13, and a monitor unit 14.

In the figure, a remote controller 64 for operating the IRD 12 is shown.

The parabolic antenna 11 receives a signal sent through the satellite 2. The received signal is converted to a signal having a predetermined frequency by a low-noise block downconverter (LNB) 15 mounted to the parabolic antenna 11, and is sent to the IRD 12.

To describe outlined operations in the IRD 12, the signal of a predetermined channel is selected from the received signal, the selected signal is decoded to obtain video data and audio data for a program, and they are output as a video signal and an audio signal. The IRD 12 also outputs a GUI screen according to GUI data multiplexed with the data for the program and sent. Such an output of the IRD 12 is sent, for example, to the monitor unit 14. The monitor unit 14 displays the image and outputs the sound of the program received and selected by the IRD 12. The monitor unit 14 can also display the GUI screen according to user operations described later.

The storage device 13 stores audio data (musical-piece data) downloaded by the IRD 12. The type of the storage device 13 is not specially limited. An MD recorder/player (hereinafter called an MD recorder), a DAT recorder/player, or a DVD recorder/player can be used. In addition, a personal computer can be used as the storage device 13. In this case, audio data is stored in media which allow recording, such as a hard disk and a CD-R.

In the present embodiment, it is assumed that the IRD 12 executes downloading to an MD recorder among units connected as the storage devices 13 in downloading operations described later.

Figure 2:
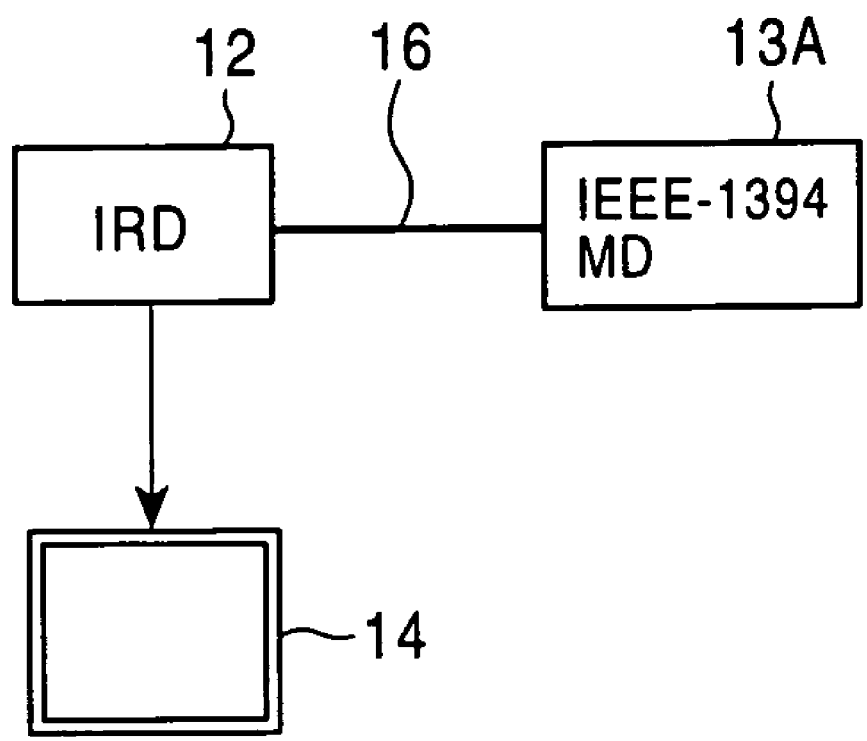
FIG. 2 is a block diagram showing an examplary structure of a receiving facility in the present embodiment.

In the receiving facility 3 of the present embodiment, as shown in FIG. 2, an MD recorder 13A provided with a data interface conforming to the IEEE-1394 data transmission standard can be used as the storage device 13 shown in FIG. 1.

The MD recorder 13A conforming to IEEE 1394 is connected to the IRD 12 with an IEEE-1394 bus 16. Therefore, in the present embodiment, musical-piece audio data (data to be downloaded) received by the IRD 12 can be directly recorded in a condition in which it is compression-encoded by the ATRAC method. When the MD recorder 13A is connected to the IRD 12 with the IEEE-1394 bus 16, album jacket data (still-picture) data and text data such as the lyrics of a musical piece can be recorded in addition to the above audio data.

The IRD 12 can communicate with an accounting server 5 through, for example, a telephone line 4. An IC card storing various types of information, described later, is inserted into the IRD 12. When a musical-piece audio data is downloaded, history information related to this operation is stored in the IC card. The information of the IC card is sent to the accounting server 5 at a predetermined occasion and a predetermined timing through the telephone line 4. The accounting server 5 sets a charge according to the sent history information, imposes it on the user, and bills the user.

It is understood from the above description that, in the system to which the present invention is applied, the ground station 1 multiplexes and seconds video data and audio data used for materials in music program broadcasting, sent from the TV-program-material server 6, audio data used for materials in audio channels, sent from the musical-piece-material server 7, additional audio information sent from the additional-audio-information server 8, and GUI data sent from the GUI-data server 9.

When this broadcasting is received by the receiving facility 3 at each house, the selected channel program can be watched, for example, via the monitor unit 14. As a first GUI screen using GUI data sent together with program data, an EPG screen can be displayed for program search. As a second GUI screen, a GUI screen for a special service other than usual program broadcasting can be used. When a predetermined operation is performed, a service other than watching usual programs offered in the broadcasting system can be taken in the present embodiment.

When a GUI screen for downloading audio (musical-piece) data is displayed, for example, and an operation is performed using this GUI screen, the user can download the audio data of the desired musical piece to record it into the storage device 13.

In the present embodiment, data service broadcasting which offers a special service other than usual program broadcasts and, which accompanies an operation for an GUI screen is also called interactive broadcasting since it has interactive capability.

1-2. Operations on GUI Screen

Figure 3:
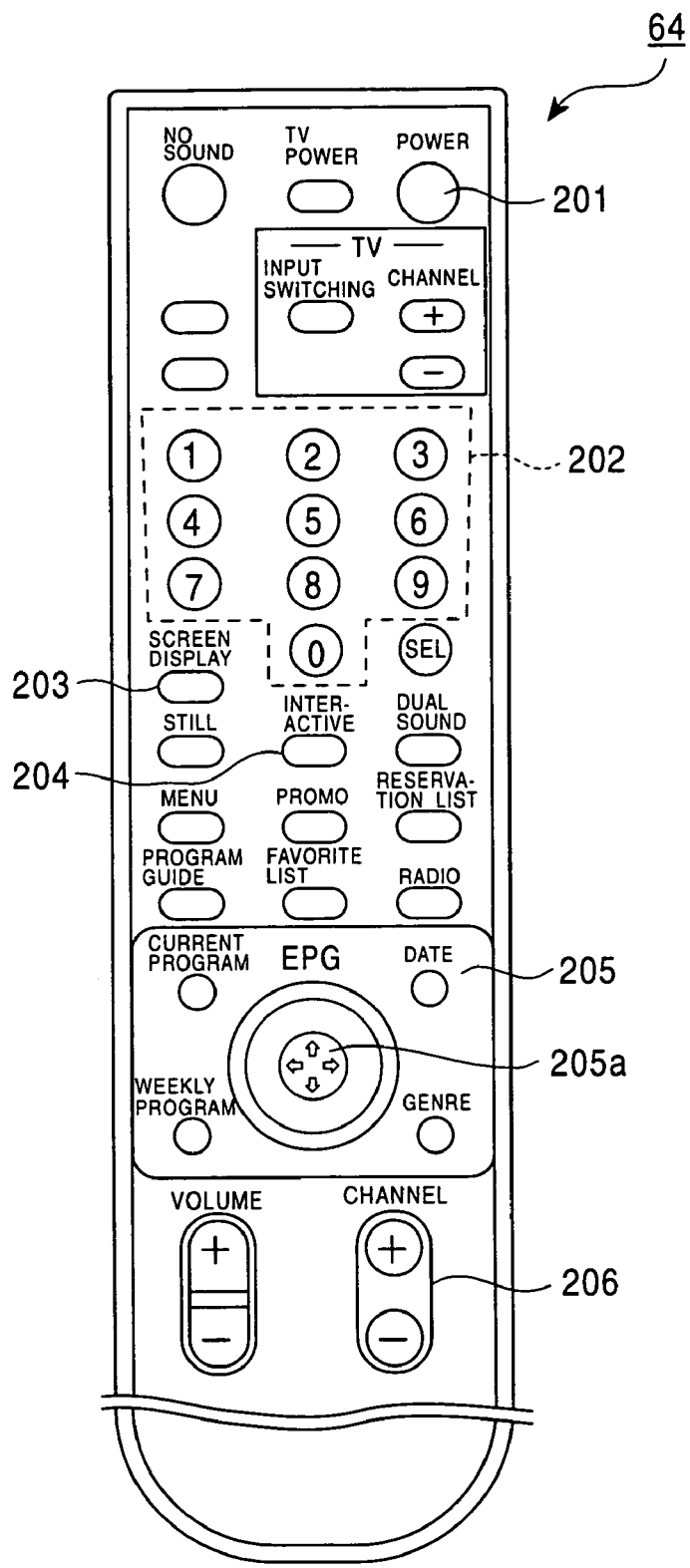
FIG. 3 is an elevation showing the appearance of a remote controller for an IRD in the present embodiment.
Figure 4:
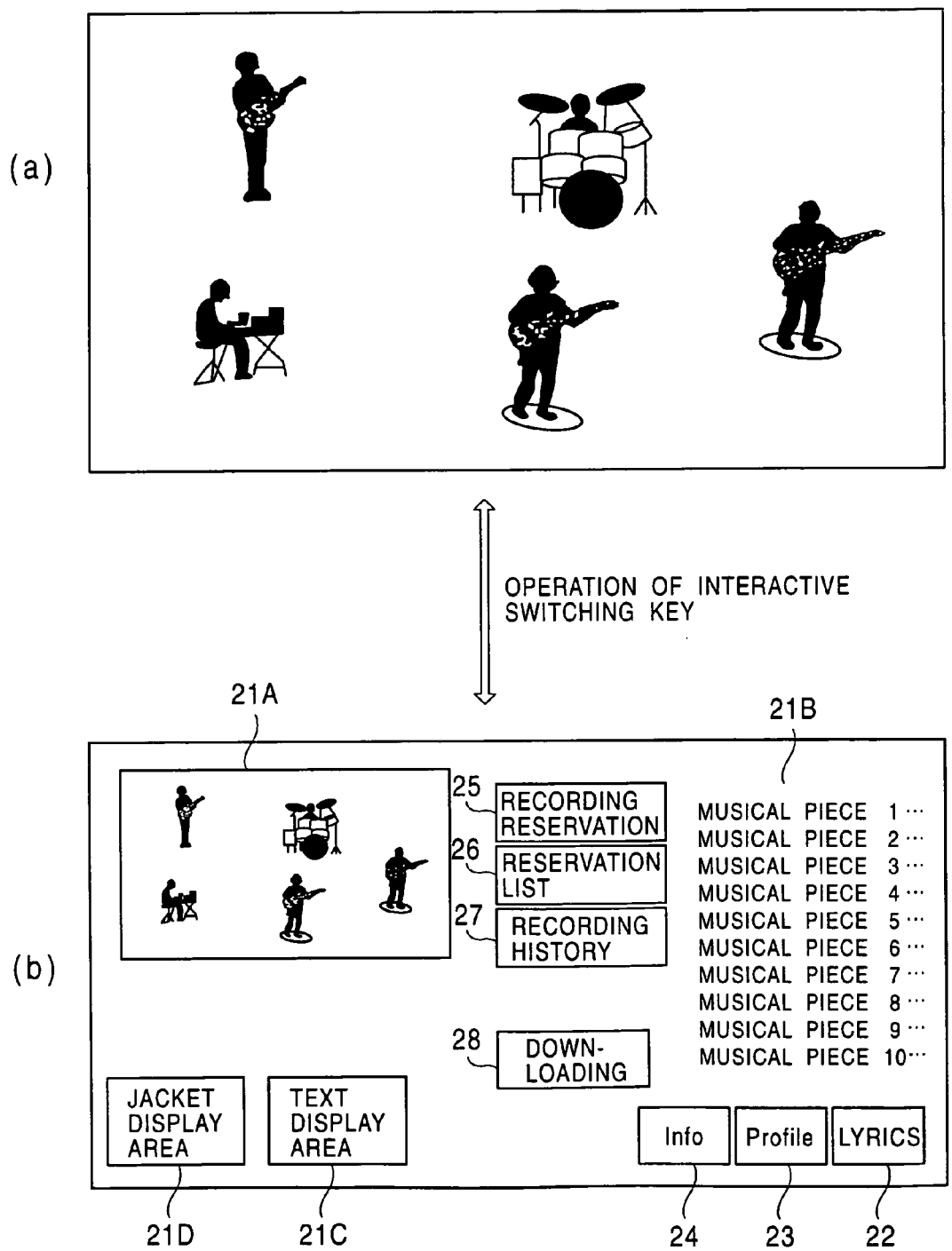
FIG. 4 is a view showing switching between a broadcast screen and a GUI screen.

An example of use of the above-described interactive broadcasting, that is, an operation example on a GUI screen, will be generally described by referring to FIG. 3 and FIG. 4. Downloading musical-piece data (audio data) is taken as an example.

Main operation keys on the remote controller 64, with which the user operates the IRD 12, will be first described below by referring to FIG. 3.

FIG. 3 shows an operation panel of the remote controller 64 on which various keys are arranged. Among these keys, a power key 201, numeric keys 202, a screen display switching key 203, an interactive switching key 204, an EPG-key panel 205, and a channel key 206 will be described.

The power key 201 turns the IRD 12 on and off. The numeric keys 202 are used for changing the channel by specifying the number and for a numeric-input operation for a GUI screen.

The screen display switching key 203 switches, for example, between a usual broadcasting screen and the EPG screen. After the EPG screen is displayed by the screen display switching key 204, when a key disposed in the EPG-key panel 205 is operated, program search is performed by using the electronic-program-guide display screen. An arrow key 205a in the EPG-key panel section 205 can be also used for cursor movement on a GUI screen for a service described later.

The interactive switching key 204 switches between the usual broadcasting screen and a GUI screen for a service accompanied by the broadcasting program.

The channel key 206 sequentially switches the selection channel in the IRD 12 in the ascending or descending order of channel numbers.

The remote controller 64 in the present embodiment can be also used for various operations, for example, for the monitor unit 14, and is provided with various keys corresponding to those operations. Descriptions of those keys corresponding to the monitor unit 14 are omitted.

An operation example on the GUI screen will be described below by referring to FIG. 4.

When broadcasting is received by the receiving facility 3 and the desired channel is selected, moving pictures based on program materials offered by the TV-program-material server 6 are displayed on the screen of the monitor unit 14 as shown in FIG. 4(a). In other words, usual program contents are displayed. It is assumed here that a music program is displayed, and the music program accompanies a downloading service (interactive broadcasting) of musical-piece audio data.

When this music program is displayed, if the user operates the interactive switching key 204 on the remote controller 64, for example, the displayed screen is changed to a GUI screen for downloading the audio data as shown in FIG. 4(b).

In this GUI screen, the image formed of the video data sent from the TV-program-material server 6, displayed in FIG. 4(a), is reduced and displayed in a TV program display area 21A at the upper left section of the screen.

At the upper right section of the screen, a list 21B of the musical pieces broadcasted in the audio channels is displayed. A text display area 21C and a jacket display area 21D are indicated at the lower left section of the screen. In the right-hand side of the screen, a lyrics-display button 22, a profile-display button 23, an information-display button 24, a recording-reservation button 25, a reservation-list button 26, a recording-history display button 27, and a downloading button 28 are displayed.

The user looks for a musical piece of interest while watching the musical-piece names listed in the list 21B. When the user finds an interesting musical piece, the user operates the arrow key 205a (in the EPG-key-panel section 205) on the remote controller 64 to place the cursor at the position of the musical-piece name displayed and performs an Enter operation (for example, presses the center of the arrow key 205a).

With these operations, the user can test-listen to the musical piece selected by the cursor. More specifically, since a musical piece is repeatedly broadcasted within a predetermined unit time in each audio channel, the IRD 12 switches the audio channel to that of the musical piece selected by the above operations while the same screen is displayed in the TV program display area 21A, and thereby the user can listen to the musical piece. At the jacket display area 21D, the still picture of the album jacket of the musical piece is displayed.

When the cursor is moved to the lyrics display button 22 and an Enter operation is performed (hereinafter, an operation of moving the cursor to a button and performing an Enter operation is called pressing the button), for example, the lyrics of the musical piece is displayed in the text display area 21C in synchronization with the audio data. In the same way, when the profile-display button 23 or the information-display button 24 is pressed, the profile of the artist performing the musical piece or the concert information of the artist is displayed in the text display area 21C. The user can understand the musical pieces currently being distributed and in addition, detailed information of each musical piece in this way.

To buy the musical piece test-listened to, the user needs to press a downloading button 28. When the downloading button 28 is pressed, the audio data of the selected musical piece is downloaded and recorded into the storage device 13. Together with the audio data of the musical piece, its lyrics data, the profile information of the artist, and the still-picture data of the jacket can also be downloaded.

Every time the audio data of the musical piece is downloaded in this way, its history information is stored in the IC card placed in the IRD 12. The information stored in the IC card is sent to the accounting server 5, for example, once in a month, and the charge is imposed on the user corresponding to the history of use of the data service. Then, musical-piece data is appropriately sold, and the copyright of a musical piece to be downloaded is protected.

To reserve downloading in advance, the user needs to press the recording reservation button 25. When this button is pressed, the GUI screen is switched and a list of musical pieces for which a reservation can be made is shown on the screen. This list can indicate musical pieces retrieved in hour units, in week units, or for each channel. When the user selects in this list a musical piece for which a downloading reservation is to be made, its information is written into the IRD 12. To confirm the musical piece for which a downloading reservation has been made, the user needs to press the reservation-list button 26 to show the list on the whole screen. A musical piece for which downloading has been reserved in this way is downloaded by the IRD 12 at the reservation time and stored in the storage device 13.

To check a downloaded musical piece, the user needs to press the recording-history button 27 to display a list of downloaded musical pieces on the whole screen.

As described above, in the receiving facility 3 of a system to which the present invention is applied, a list of musical pieces is displayed on the GUI screen of the monitor unit 14. A musical piece is selected according to the items displayed on the GUI screen. The musical piece is test-listened to, and the lyrics of the musical piece and the profile of the artist can be understood. Furthermore, downloading the musical piece, a reservation thereof, and a display of a downloading history or a reservation list can be also performed.

Although details will be described later, the display of the GUI screen shown in FIG. 4(b), display changes on the GUI screen corresponding to user operations for the GUI screen, and audio outputs are implemented by scenario descriptions according to the MHEG method, described above, in which object relationships are specified. Objects refer to image data of each item corresponding to a button shown in FIG. 4(b) and material data displayed in each display area.

In the present application, an environment in which an information output form (image display and audio output) according to a certain objective is implemented by specifying the relationships between objects with scenario descriptions, such as the GUI screen, is referred to as a "scene." Objects constituting one scene include the file of the scenario descriptions itself.

As described above, broadcasting programs are distributed and the audio data of musical pieces are also distributed by the use of a plurality of audio channels in the digital satellite broadcasting system according to the present embodiment. The desired musical piece can be looked for with the use of a list of distributed musical pieces and its audio data can be easily stored in the storage device 13. As services other than offering programs in the digital satellite broadcasting system, various types of services can be considered in addition to the musical-piece downloading described above. For example, a product-introduction program called TV shopping is broadcasted first, and then a GUI screen is provided in order to make a purchase contract.

1–3. Ground Station

An outline of the digital satellite broadcasting system according to the present embodiment has been described so far. Detailed descriptions of the system will be made below. A structure of the ground station 1 will be described first by referring to FIG. 5.

In the following descriptions, some items described below are assumed.

In the present embodiment, a digital storage media command control (DSM-CC) protocol is employed for transmission from the ground station to the receiving facility 3 through the satellite 2.

The DSM-CC (MPEG-part 6) protocol specifies commands and control methods used for retrieving an MPEG-encoded bit stream stored in a digital storage medium (DSM) or for storing a stream into a DSM through a network. The DSM-CC protocol is employed in the present embodiment as a transmission standard in the digital satellite broadcasting system.

To transmit the contents (a set of objects) of a data broadcasting service (such as a GUI screen) by the DSM-CC protocol, it is necessary to define a contents description form. In the present embodiment, MHEG, described above, is employed as the definition of this description form.

Figure 5:
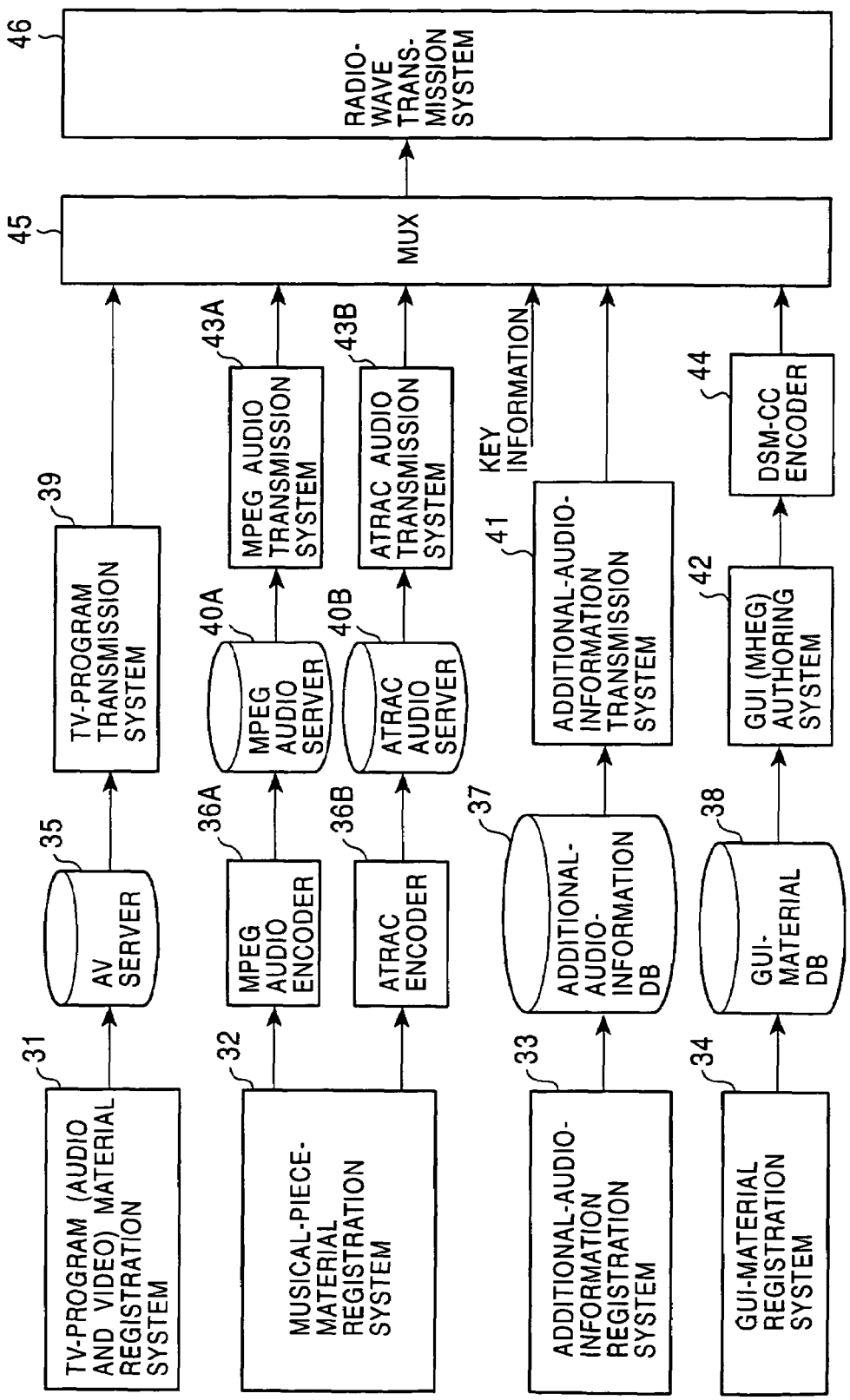
FIG. 5 is a block diagram showing an examplary structure of a ground station.

In the structure of the ground station 1 shown in FIG. 5, a TV-program-material registration system 31 records material data obtained from the TV-program-material server 6 into an AV server 35. The material data is sent to a TV-program transmission system 39. The video data thereof is compressed, for example, by the MPEG-2 method, and the audio data thereof is packetized, for example, by the MPEG audio method. The output of the TV-program transmission system 39 is sent to a multiplexer 45.

A musical-piece-material registration system 32 sends material data obtained from the musical-piece-material server 7, that is, audio data, to an MPEG audio encoder 36A and an ATRAC encoder 36B. The MPEG audio encoder 36A and the ATRAC encoder 36B compression-encode the sent audio data and record it into an MPEG audio data server 40A and an ATRAC audio server 40B.

The MPEG audio data recorded into the MPEG audio server 40A is transmitted to an MPEG audio transmission system 43A, packetized there, and sent to the multiplexer 45. The ATRAC data recorded into the ATRAC audio server 40B is sent to an ATRAC audio transmission system 43B as quadruple-speed ATRAC data, packetized there, and sent to the multiplexer 45.

An additional-audio-information registration system 33 records material data obtained from the additional-audio-information server 8, that is additional audio information, into an additional-audio information database 37. The additional audio information recorded into the additional-audio-information database 37 is sent to an additional-audio-information transmission system 41, packetized there, and sent to the multiplexer 45.

A GUI-material registration system 34 records material data obtained from the GUI-data server 9, that is, GUI data, into a GUI-material database 38.

The GUI-material data recorded into the GUI-material database 38 is sent to a GUI authoring system 42, and converted to a data form which can be output as a GUI screen, that is, a scene described with FIG. 4.

The data sent to the GUI authoring system 42 includes the still-picture data of an album jacket, text data such as the lyrics of a musical piece, and audio data to be output according to an operation if the GUI screen is used, for example, for downloading the musical piece.

These data items are called mono media. The GUI authoring system 42 encodes the mono media to handle them as objects.

A scenario-description file (script) specifying the relationships among the objects and MHEG-5 contents are created in order to obtain the video and audio output forms corresponding to the display form of a scene (GUI screen) such as that shown in FIG. 4(b) and operations.

In the GUI screen shown in FIG. 4(b), video and audio data (MPEG video data and MPEG audio data) based on the material data of the TV-program-material server 6 and MPEG audio data based on the musical-piece-material data of the musical-piece-material server 7 are displayed. The output form corresponding to operations is given.

Therefore, the GUI authoring system 42 handles video and audio data based on the material data of the TV-program-material server 6, MPEG audio data based on the musical-piece-material data of the musical-piece-material server 7, and additional audio information based on the additional audio information of the additional-audio-information server 8 as objects, as required, and specifies by an MHEG script in the scenario-description file.

MHEG-contents data sent from the GUI authoring system 42 includes a script file, and various types of still-picture data files and text data files serving as objects. Still-picture data has, for example, 640 by 480 pixels compressed by a joint photograph experts group (JPEG) method. Text data has, for example, 300 characters or less.

The MHEG-contents data obtained by the GUI authoring system 42 is sent to a DSM-CC encoder 44.

The DSM-CC encoder 44 converts to a transport stream (TS) having a type which can be multiplexed with a video and audio data stream conforming to the MPEG-2 format, packetizes it, and outputs it to the multiplexer 45.

The multiplexer 45 multiplexes in the time domain a video packet and an audio packet sent from the TV-program transmission system 39, an audio packet sent from the MPEG audio transmission system 43A, a quadruple-speed audio packet sent from the ATRAC audio transmission system 43B, an additional-audio-information packet sent from the additional-audio-information transmission system 41, and a GUI-data packet sent from the GUI authoring system 42, and enciphers them according to key information output from the key-information server 10 (shown in FIG. 1).

The output of the multiplexer 45 is sent to a radio-wave transmission system 46. Processing such as addition of error correcting codes, modulation, and frequency conversion is applied to the output, and then the output is transmitted through the antenna toward the satellite 2.

1-4. Transmission Format

A transmission format specified according to the DSM-CC method in the present embodiment will be described next.

Figure 6:
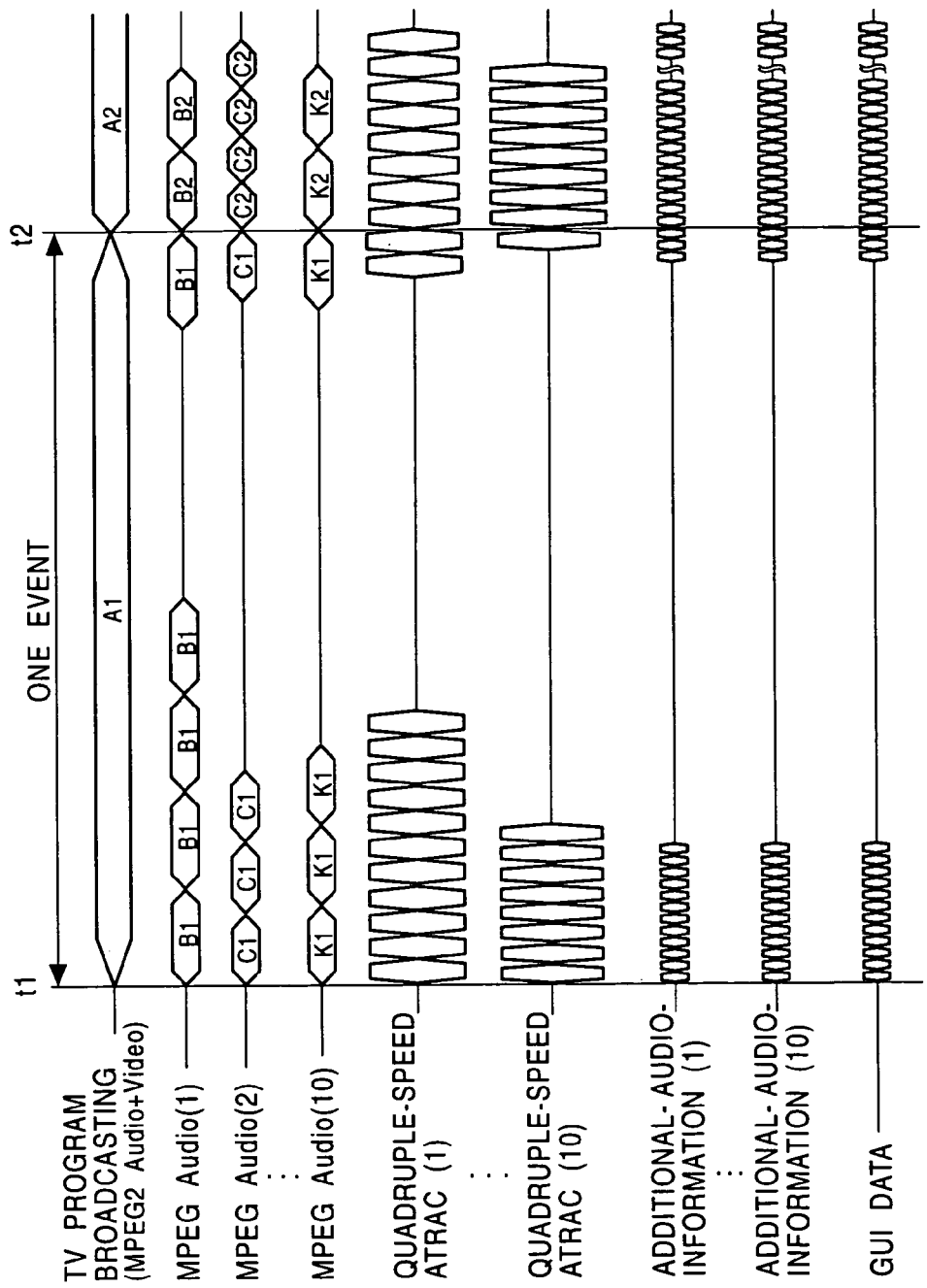
FIG. 6 is a timing chart of data transmitted from the ground station.

FIG. 6 shows an example of data transmitted from the ground station 1 to the satellite 2. Each data shown in the figure is actually multiplexed in the time domain, as described before. In FIG. 6, a period from a time t1 to a time t2 corresponds to one event, and the next event starts at the time t2. An event refers to, for example, a time unit for which a line-up set of a plurality of musical pieces is changed in a music program channel, and is usually set to 30 minutes or one hour.

As shown in FIG. 6, in the event from the time t1 to the time t2, a program having a predetermined contents A1 is broadcasted with a usual moving picture. In the event starting at the time t2, a program having a predetermined contents A2 is broadcasted. A moving picture and sound are transmitted in this usual program.

Ten channels, for example, from a channel CH1 to a channel CH10 are assigned to MPEG audio channels (1) to (10). In each of the audio channels CH1, CH2, CH3, . . . , and CH10, a certain musical piece is repeatedly transmitted during one event. Specifically, in the event from the time t1 to the time t2, a musical piece B1 is repeatedly transmitted through the audio channel CH1, a musical piece Cl is repeatedly transmitted through the audio channel CH2, the same condition is applied to other channels, and a musical piece K1 is repeatedly transmitted through the audio channel CH10. Such repeated transmission processing is also applied to quadruple-speed ATRAC audio channels (1) to (10), shown therebelow.

In FIG. 6, the same musical piece is transmitted through a MPEG audio channel and a quadruple-speed ATRAC audio channel having the same channel number, which is written as a number in parentheses. Additional audio information is added to the audio data having the same channel number as the additional audio data, which is written as a number in parentheses. Still-picture data and text data to be transmitted as GUI data are also generated for each channel. As shown in FIG. 7(a) to (d), these data items are time-division-multiplexed and transmitted by MPEG-2 transport packets. Each transport packet has a header, in which information indicating the type of a packet is written. The IRD 12 restructure each data as shown in FIG. 7(e) to (h) with the use of header information in each data packet.

Figure 7:
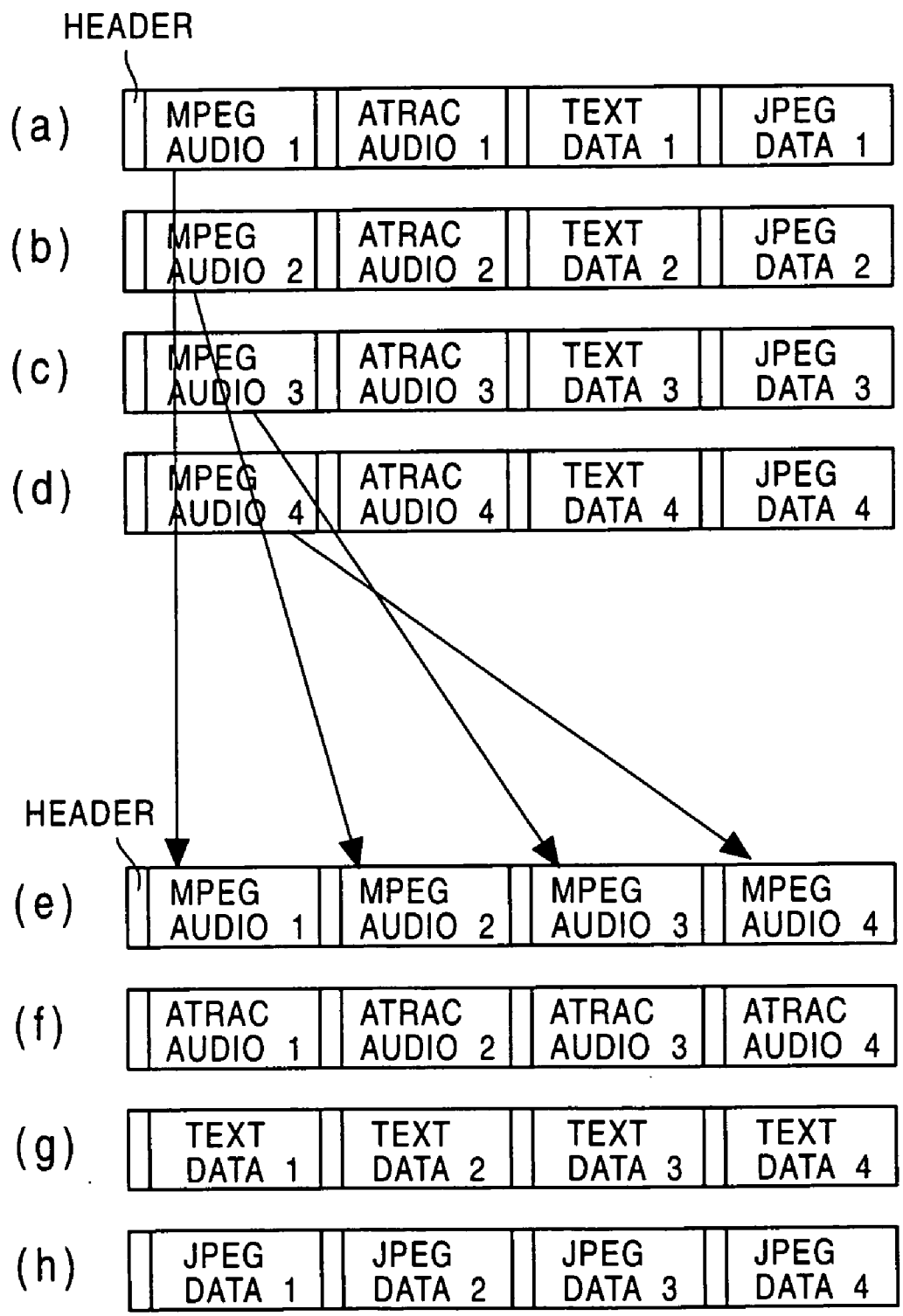
FIG. 7 is a view showing a time-division-multiplexing structure of transmitted data.

Among the transmission data items shown in FIG. 6 and FIG. 7, at least the GUI data used for a data service (interactive broadcasting) is logically formed in the following way according to the DSM-CC protocol. Only a transport-stream data output from the DSM-CC encoder will be described here.

Figure 8:
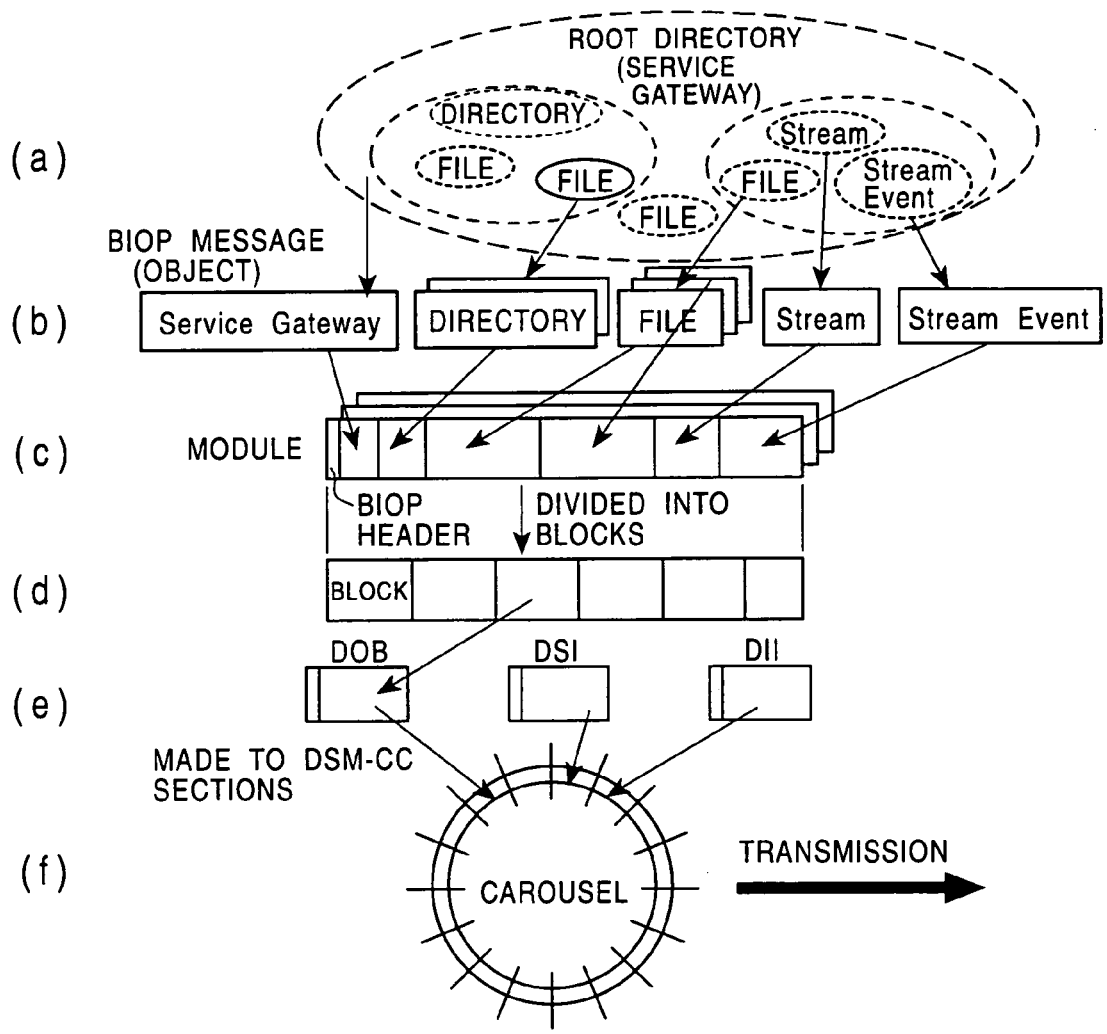
FIG. 8 is a view showing a DSM-CC transmission format.

As shown in FIG. 8(a), a data broadcasting service transmitted by the DSM-CC protocol in the present embodiment is included in a root directory called a service gateway. The service gateway includes a directory, a file, a stream, and a stream event as objects.

Among them, a file includes a still picture, sound, a text, or a script written by MHEG.

A stream includes information for linking to other data services and AV streams (such as MPEG video data and audio data serving as TV-program materials, and MPEG audio data and ATRAC audio data serving as musical-piece materials).

A stream event includes link information and time information.

A directory is a folder for grouping data related to each other.

In the DSM-CC protocol, these unit information items and the service gateway are handled as objects and each object is converted to a BIOP message as shown in FIG. 8(b).

In descriptions related to the present invention, since differences among three objects, a file, a stream, and a stream event, are not essential, the file object is taken as an example in the following descriptions.

In the DSM-CC protocol, a data unit called a module shown in FIG. 8(c) is formed. The module has at least one object which has been converted to a BIOP message shown in FIG. 8(b), is a variable-length data unit to which a BIOP header is added, and serves as a buffering unit of data received at the receiving side.

In the DSM-CC protocol, when one module is formed of a plurality of objects, there are no special rules or limitations in the relationships among the objects. In other words, to put it in an extreme way, even if one module is formed of two or more objects between scenes having no relationship, the rule is not violated at all in the DSM-CC protocol.

To transmit this module by a form called a section specified in the MPEG-2 format, the module is mechanically divided into data units basically having a fixed length called blocks as shown in FIG. 8(d). It is specified that the last block in a module does not need to have the specified fixed length. This block division is performed because the MPEG-2 format specifies that one section should not exceed 4 KB.

In this case, the block serving as a data unit is identical with the section.

A block obtained by dividing the module in this way is converted to a message form called a download data block (DDB) with a header being added.

Control messages called download server initiate (DSI) and download indication information (DII) are generated when conversion to the DDB is performed.

The DSI and DII are information required when the receiving side (IRD 12) obtains a module from received data. The DSI mainly includes the identifier of a carousel, described next, and information related to the carousel (such as one-rotation time for the carousel and timeout of carousel rotation). It also includes information for obtaining the location of the root directory (service gateway) of the data service (in an object carousel method).

The DII corresponds to each module included in a carousel, and includes information such as the size and version of each module and the timeout of the module.

As shown in FIG. 8(f), three types of messages, the DDB, DSI, and DII are periodically and repeatedly transmitted corresponding to the data unit of the section. Therefore, the receiving side can receive any time a module which includes objects required for, for example, obtaining the desired GUI screen (scene).

In the present application, such a transmission method is called a carousel method compared to a merry-go-round, and a data transmission form typically expressed as shown in FIG. 8(f) is called a carousel.

There are two carousel methods, a data carousel method and an object carousel method. In the object carousel method, objects having attributes such as a file, a directory, a stream, and a service gateway are handled as data items and transmitted with the use of a carousel. It can handle a directory structure, which is largely different from the data carousel method. In the system according to the present embodiment, the object carousel method is employed.

GUI data sent from the carousel in the foregoing way, which is the data output from the DSM-CC encoder 44 shown in FIG. 5, is output in a transport-stream form. The transport stream has a structure, for example, shown in FIG. 9.

FIG. 9(a) shows a transport stream. The transport stream is a bit string defined by the MPEG system and is formed of a connection of packets (transport packets) each having a fixed length of 188 bytes as shown in the figure.

Each transport packet is formed of a header, an adaptation field for placing additional information into a specified individual packet, and a payload (data area)= expressing the contents of the packet (such as video data and audio data), as shown in FIG. 9(b).

The header is set, for example, to four bytes and, as shown in FIG. 9(c), includes a synchronization byte at the top, a packet_ID (PID) indicating packet identification information disposed at a predetermined position after the synchronization byte, scramble control information indicating whether scrambling is used or not, and adaptation-field control information indicating whether an adaptation field and a payload are used or not.

The receiving side descrambles in units of packets according to the control information. Necessary packets such as video data, audio data, and text data can be separated and extracted by a demultiplexer. Time information serving as the reference for video and audio synchronous reproduction can be reproduced.

It is understood from the foregoing description that one transport stream includes multiplexed packets of video data, audio data, and text data for a plurality of channels. In addition, a signal for controlling program selection, the signal being called program specific information (PSI); information (EMM/ECM) required for restricted receiving (a receiving function for determining whether the user can receive a charged channel according to the contract condition); and service information (SI) for implementing services such as an EPG are multiplexed simultaneously. The PSI will be described below.

Figure 10:
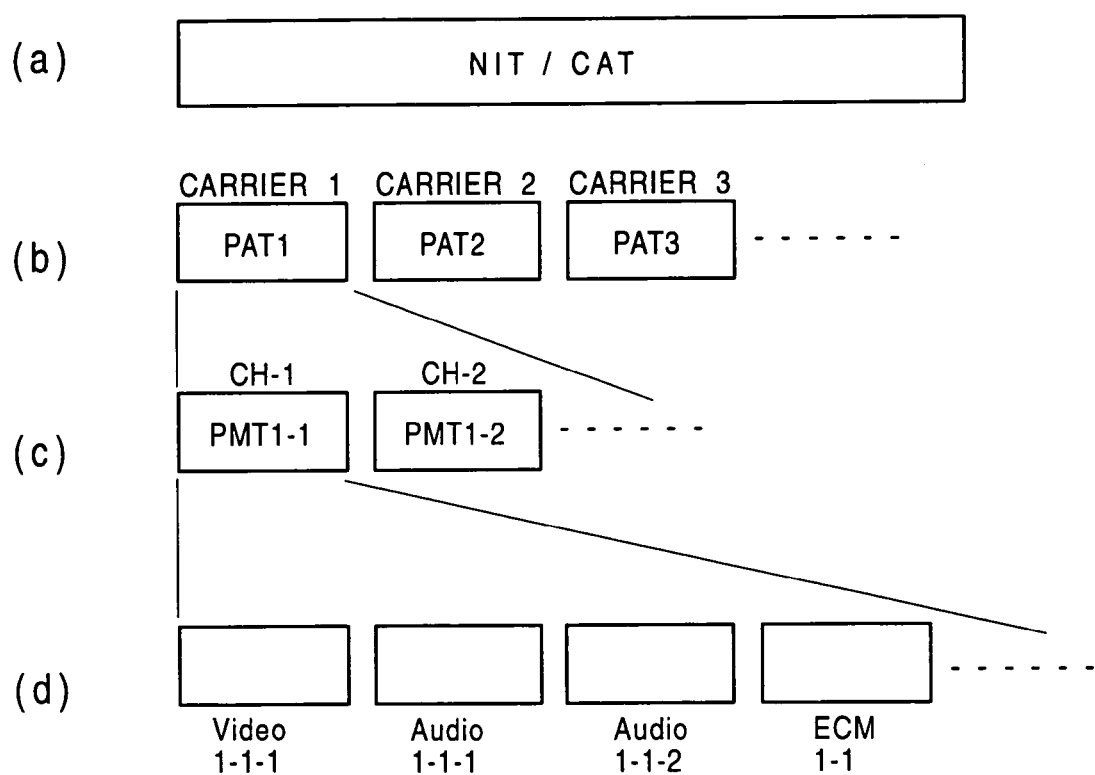
FIG. 10 is a view showing a PSI table structure.

The PSI is formed of four tables as shown in FIG. 10. Each table is indicated by a section format, which conforms to the MPEG system.

FIG. 10(a) shows a network information table (NIT) and a conditional access table (CAT).

An NIT having the same types of contents is multiplexed with each carrier. They are transmission factors for each carrier, such as a polarizing plane, a carrier frequency, and a convolution rate) and a list of channels multiplexed therewith. The PID of an NIT is set to 0x0010.

A CAT having the same types of contents is multiplexed with each carrier. They are the identification of a restricted-receiving method and the PID of an entitlement management message (EMM) packet serving as individual information of contract information. The PID of an CAT is set to 0x0001.

FIG. 10(b) shows a PAT, which has contents unique to each carrier. The PAT includes channel information in the carrier and the PID of a program map table (PMT) indicating the contents of each channel. The PID of a PAT is set to 0x0000.

A PMT shown in FIG. 10(c) is information for each channel in the carrier.

The contents of each channel are multiplexed in a PMT. As shown in FIG. 10(d), a PMT includes, for example, components (such as video data and audio data) constituting each channel and the PID of an encryption control message (ECM) packet required for descrambling. The PID of a PMT is specified by the PAT.

1-5. Transmission Format of ATRAC Data

The transmission format of ATRAC data will be described below. As shown in FIG. 6, one event includes 10 quadruple-speed ATRAC audio channels (1) to (10) as transmission data.

When music data is distributed in satellite broadcasting as described above, if the audio data is transmitted as is, the amount of data is huge and a transmission time is long. Therefore, it has been considered that the audio data is compressed, for example, by the ATRAC method and transmitted. The ATRAC method has been employed in MD systems to compress audio data and record it.

When audio data is compressed by the ATRAC method, the data rate of music data to be distributed can be reduced, and distributed audio data can be directly recorded into an MD.

In the ATRAC method, a recording unit is called a sound group and formed of 424 bytes. Therefore, when ATRAC data is distributed in satellite broadcasting, it is desired that data be transmitted without destroying sound groups.

In the ATRAC method, audio data is digitized at a sampling frequency of 44.1 kHz and a quantization bit count of 16. The digitized audio data is taken out at a time window 11.61 ms long and compressed by modified discrete cosine transform (DCT) to reduce to about one-fifth in the data amount.

When audio data is digitized at a sampling frequency of 44.1 kHz and a quantization bit count of 16, and then is taken out at the time window 11.61 ms long in the foregoing way, 512 samples are obtained. Therefore, the data amount of the audio data at the time window 11.61 ms long is 512 multiplied by 2, 1024 bytes. With two right and left channels, the data amount is twice 1024 bytes, 2048 bytes.

In the ATRAC method, this 2048-byte data is compressed to 424 bytes by modified DCT. This 424-byte ATRAC data is called a sound group, which is a unit to transmit audio data compressed by the ATRAC method. Since 2048-byte data is compressed to 424-byte data, the compression rate of the ATRAC method is about one-fifth.

As described above, a 424-byte sound group corresponding to compressed audio data in a 11.61-ms period serves as a unit of compressed audio data in the ATRAC method. It is desired that this sound group unit be maintained when ATRAC audio data is transmitted.

A data structure of an MD system in which the sound group serves as a unit will be described later by referring to FIG. 18.

Figure 9:
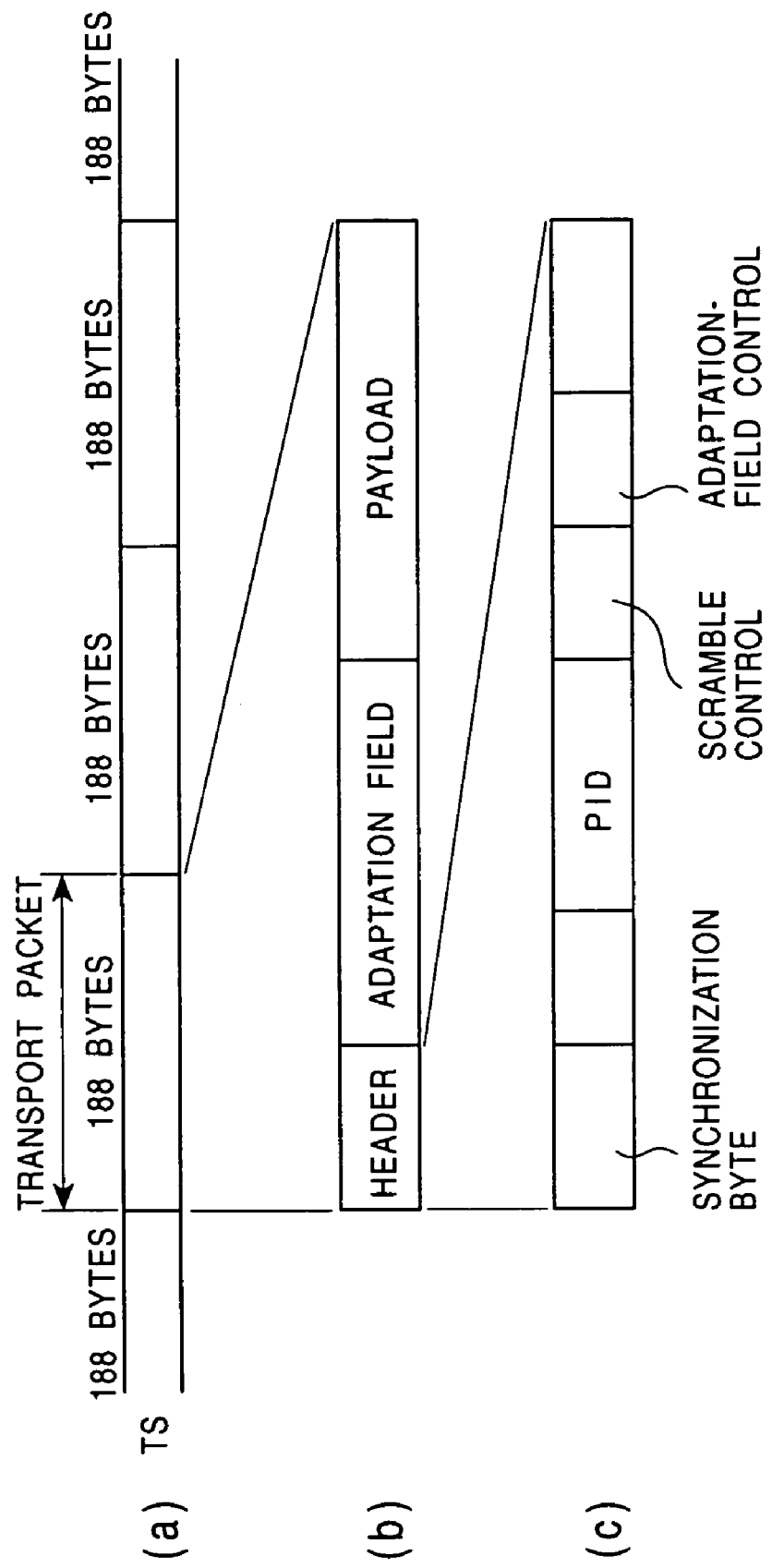
FIG. 9 is a view showing a data structure of a transport stream.

On the other hand, in the MPEG-2 method, video data, audio data, and other data are disposed on packets each having a fixed length of 188 bytes, called transport packets (TS packets) shown in FIG. 9, multiplexed in one stream, and transmitted. Therefore, when audio data compressed by the ATRAC method is transmitted with an MPEG-2 stream, it is necessary to dispose the audio data in TS packets each having 188 bytes.

Since an 424-byte ATRAC sound group has no relationship with a 188-byte TS packet, however, if ATRAC data is just assigned to TS packets and transmitted, sound groups are destroyed and ATRAC demodulation and ATRAC recording become difficult.

Therefore, in the present embodiment, when ATRAC data is transmitted by an MPEG-2 stream, while the ATRAC data unit is maintained, the data is efficiently transmitted by the use of packetized elementary stream (PES) packets in the following way.

In the MPEG-2 method, a plurality of programs are multiplexed and transmitted in transmission units called TS packets, each of which has a fixed length of 188 bytes. On the other hand, when audio data compressed by the ATRAC method is transmitted, a 424-byte ATRAC sound-group data unit needs to be maintained.

Figure 11:
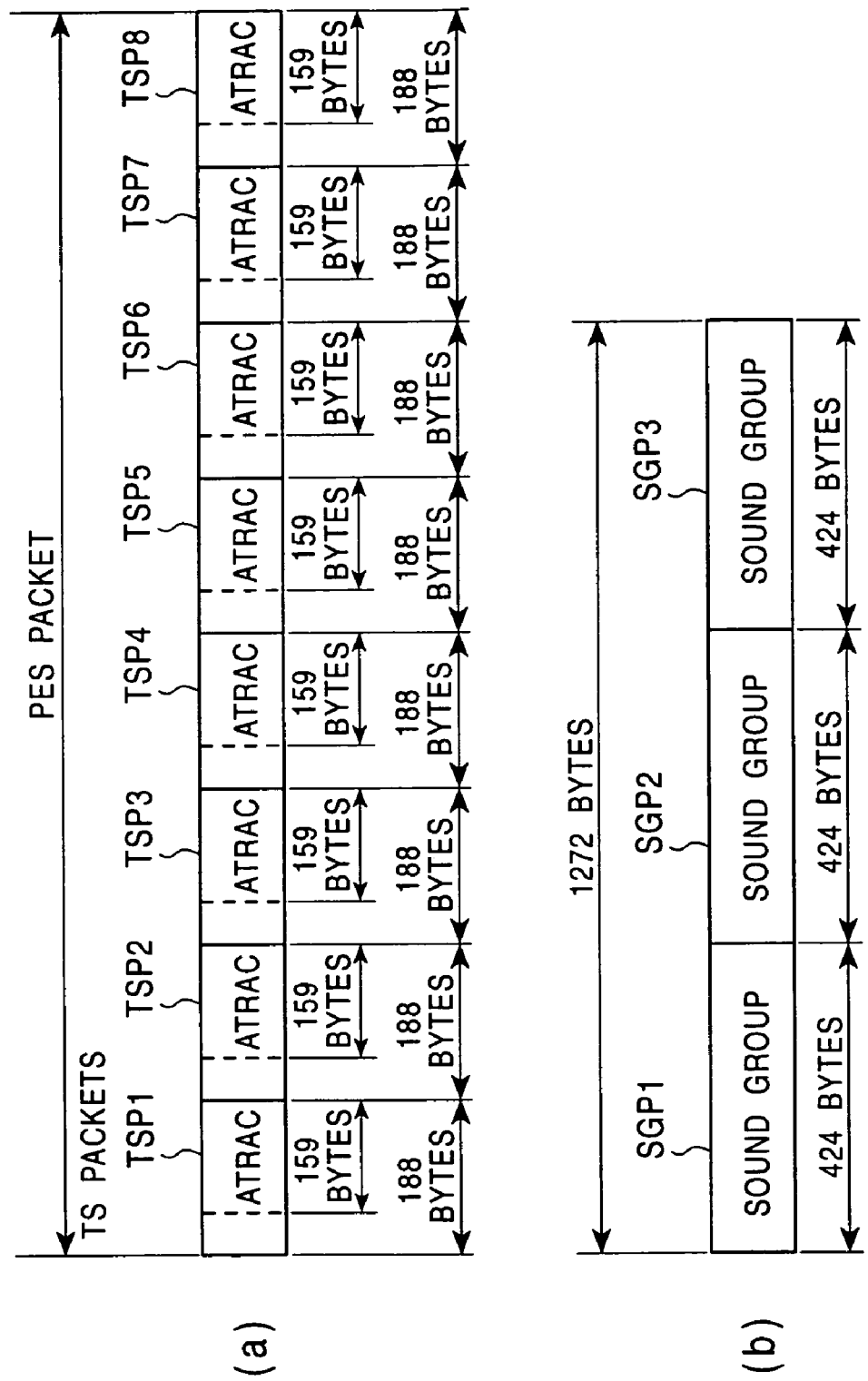
FIG. 11 is a view showing a PES packet.

As shown in FIG. 11(a), 159-byte ATRAC-compressed audio data is disposed in each of TS packets TSP1 to TSP8, and these eight TS packets TSP1 to TSP8 form a PES packet.

When one TS packet contains 159-byte ATRAC data and eighth TS packets form a PES packet in this way, the PES packet has 159 bytes multiplied by eight, that is, 1272 bytes. Since one sound group has 424 bytes, 1272-byte data to be transmitted by one PES packet corresponds to data in three sound groups SGP1 to SGP3, as shown in FIG. 11(b), because 424 bytes multiplied by three equals 1272 bytes.

When one TS packet contains 159-byte ATRAC data and eighth TS packets form a PES packet, data in three sound groups is transmitted by one PES packet. Since one PES packet conveys data in an integral number of sound groups, ATRAC data has a good matching with a PES packet.

When ATRAC data is transmitted, 159 bytes are used for transmitting ATRAC data in a TS packet having a fixed length of 188 bytes in this way.

The remaining 29 bytes in the TS packet are used for a TS-packet header, a PES header, a data header, and others. The data header includes the type of data to be transmitted and the type of a data transmission path, such as satellite broadcasting or terrestrial broadcasting. In addition, a field dependent field (FDF) that defines information unique to ATRAC data is also included.

As described above, in the transmission method of the present embodiment, when ATRAC data is transmitted, one TS packet includes 159-byte ATRAC data, a data header, and an FDF, eight TS packets form one PES packet, and one PES packet conveys three-sound-group data.

A specific example of transmitting ATRAC data by PES packets in this way will be described below.

Figure 12:
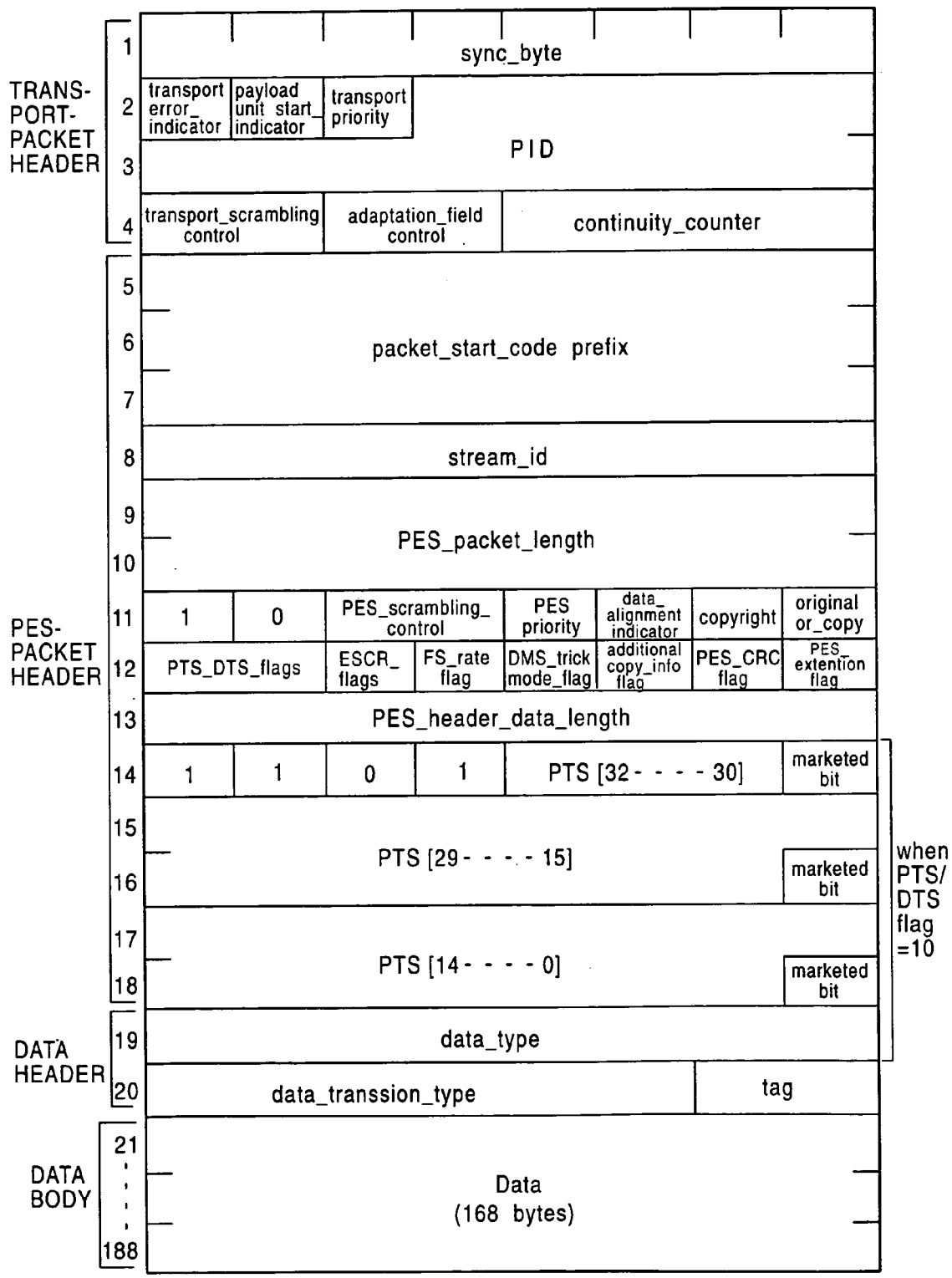
FIG. 12 is a view showing a TS packet.

FIG. 12 shows a structure of a TS packet used when synchronous transmission is allowed by the use of a presentation time stamp (PTS). As shown in FIG. 12, a TS packet has a fixed length of 188 bytes. The first to fourth bytes of the TS packet are assigned to a transport-packet header, the fifth to the 18th bytes are assigned to a PES-packet header, the 19th to 20th bytes are assigned to a data header, and the 21st to 188th bytes are assigned to a data body. FIG. 13 shows a structure of the data body. FIG. 12 and FIG. 13 illustrate in detail a TS packet used for transmitting ATRAC data, a general TS packet being shown in FIG. 9.

At the top of the transport-packet header, one sync byte is provided. Following this sync byte, a one-bit transport-error indicator indicating whether an error occurs in the packet, a one-bit payload-unit-start indicator indicating that a new PES packet starts at the payload of this transport packet, and a one-bit transport priority indicating the importance of this packet are provided.

The IRD 12 sets the transport-error indicator to 1 if a transmission error occurs. A TS packet having a transport-error indicator of 1 is treated as a packet having low data reliability.

The transport-packet header further includes 13-bit stream identification information (PID) indicating the individual stream of the packet. Transport-scrambling control indicating whether scrambling is performed in the payload of the packet and the type of scrambling, adaptation-field control indicating whether an adaptation field is disposed, and a continuity counter for determining whether a packet having the same PID has been partially discarded at the middle are provided.

At the top of the PES-packet header, disposed from the fifth byte to the 18th byte, a packet-start-code prefix having a fixed length of 24 bits is provided. An eight-bit stream ID for identifying the stream and a PES-packet length indicating the length of the PES packet follow. And then provided are a fixed pattern of 10, a two-bit PES-scrambling control, a one-bit PES priority, a one-bit copyright, one-bit identification information of original or copy, two-bit PTS and DTS flags, a one-bit ESCR flag, a one-bit ES-rate flag, a one-bit DMS-trick-mode flag, a one-bit additional-copy-information flag, a one-bit PES CRC flag, and a one-bit PES-extension flag.

An eight-bit PES-header-data length follows next.

Then, a fixed pattern of 1101, the 32nd bit to the 30th bit of the PTS, a time stamp, and a one-bit market bit follow. At the next 15 bits, the 29th bit to the 15th bit of the PTS are disposed with a one-bit market bit added. At the next 15 bits, the 14th bit to the 0th bit of the PTs are disposed with a one-bit market bit added.

At the data header from the 19th byte to the 20th byte, an eight-bit data type, a six-bit data-transmission type, and a two-bit tag are disposed. The data type specifies the type of the data to be transmitted. The data-transmission type specifies the type of the data transmission path, such as satellite broadcasting or terrestrial broadcasting. The tag specifies whether an additional header is disposed after the data header. When the tag is set to 00, for example, data follows the data header. When the tag is set to 01, an additional header follows the data header. When the tag is set to 10, a plurality of additional headers are disposed in the PES packet.

In the data body, positioned from the 21st byte to the 188th byte, ATRAC data is disposed. FIG. 13 shows an arrangement of the ATRAC data.

As shown in FIG. 13, at the first four bits of the 21st byte, an FDF-field length is provided. An audio-data type 1 is provided at the next four bits. The FDF-field length specifies the length of the FDF field. The audio-data type 1 defines the audio data type, such as ATRAC. An audio-data type 2 is provided next. The audio-data type 2 defines a classification in the data type, such as ATRAC1 or ATRAC2. A one-bit copyright, a one-bit original/copy, a one-bit stereo/mono, and a one-bit emphasis follow next.

Then, a one-bit data-start indicator, a one-bit data-end indicator, and a three-bit PES-data counter are provided.

The data-start indicator indicates that the data currently being transmitted is the first PES packet of musical-piece data. In other words, the eighth TS packets of a PES which includes the first ATRAC data of the musical piece have a data-start indicator of 1.

The data-end indicator indicates that the data currently being transmitted is the last PES packet of the musical piece.

In other words, the eighth TS packets of a PES which includes the last ATRAC data of the musical piece have a data-end indicator of 1.

The PES-data counter indicates the position of the TS packet in the eighth TS packets of the PES packet.

The next three bits are reserved. A present PES number is disposed at the next 24 bits. The present PES number indicates the number of the PES packet in which the data currently being transmitted is disposed, from the top PES packet.

Therefore, with the present PES number and the PES data counter, continuity in units of TS packets can be determined. This means that the continuity of ATRAC data disposed in TS packets can be determined.

The 27th byte and the 28th byte are reserved. An ATRAC-data checksum (CRC error detection code) is disposed in the 29 byte.

From the 30th byte to the 188th byte, 159-byte ATRAC data is arranged.

FIG. 14 shows the relationship between the ATRAC-data checksum, disposed in the 29th byte, and ATRAC data. The ATRAC-data checksum is calculated in the following way.

Each bit, each of CS[0] to CS[7], of the ATRAC-data checksum is set in order to obtain SUM[0]–SUM[7]=0x00, where SUM[0]=CS[0]^AT[0][0]^AT[1][0]^ . . . ^AT[158][0],
SUM[1]=CS[1]^AT[0][1]^AT[1][1]^ . . . ^AT[158][1],
SUM[2]=CS[2]^AT[0][2]^AT[1][2]^ . . . ^ AT[158][2],
SUM[3]=CS[3]^AT[0][3]^AT[1][3]^ . . . ^AT[158][3],
SUM[4]=CS[4]^AT[0][4]^AT[1][4]^ . . . ^AT[158][4],
SUM[5]=CS[5]^AT[0][5]^AT[1][5]^ . . . ^AT[158][5],
SUM[6]=CS[6]^AT[0][6]^AT[1][6]^ . . . ^AT[158][6],
SUM[7]=CS[7]^AT[0][7]^AT[1][7]^ . . . ^AT[158][7],
AT[0][0] indicates the first byte of the 159-byte ATRAC data, and AT[158][7] indicates the last byte.

With the ATRAC-data checksum being provided in this way, the IRD 12 and the storage device 13 can check the reliability of the ATRAC data to be downloaded.

As described above, in a TS packet, 159-byte ATRAC data is disposed, and unique information is defined and inserted into the FDF. The FDF is disposed at a fixed position in the TS packet in order to provide easy unit signal processing when an additional-data header, ATRAC data, and FDF data are received.

Analyzing the FDF indicates the position of the data of a TS packet in the musical piece to be transmitted. Therefore, even if an error occurs for some reason during transmission and a packet cannot be normally transmitted, it is possible to determine the missing data. In addition, data is determined to be the first or the last in the musical piece by detecting the data-start indicator or the data-end indicator. With the use of the first or the last data, a recording start position or a recording end position can be easily detected when the storage device 13 is used for downloading.

1-6. IRD

A structure example of the IRD 12, provided for the receiving facility 3, will be described next by referring to FIG. 15.

Figure 15:
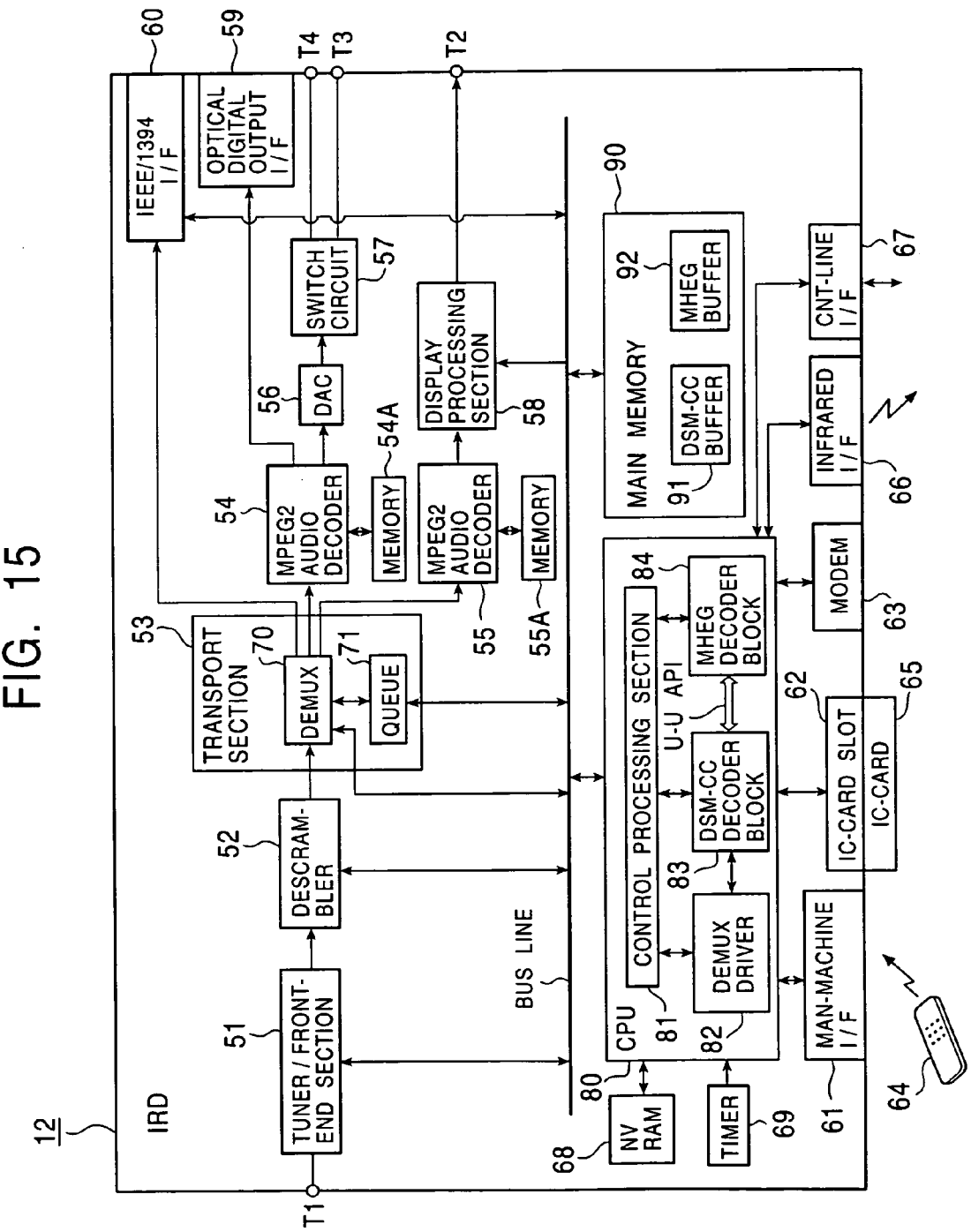
FIG. 15 is a block diagram showing an IRD structure in the present embodiment.

In the IRD 12 shown in FIG. 15, a received signal converted to have a predetermined frequency is input from the LNB 15 of the parabolic antenna 11 to an input terminal T1 and sent to a tuner/front-end section 51.

According to a setting signal which specifies transmission factors sent from a central processing unit (CPU) 80, the tuner/front-end section 51 receives the carrier (receiving frequency) determined from the setting signal and applies processing such as Viterbi demodulation and error correcting to obtain a transport stream.

The transport stream obtained by the tuner/front-end section 51 is sent to a descrambler 52. The tuner/front-end section 51 obtains a PSI packet from the transport stream to update its program selection information, obtains the component PID of each channel from the transport stream, and sends it, for example, to the CPU 80. The CPU 80 uses the obtained PID for received-signal processing.

The descrambler 52 receives descrambling-key data stored in an IC card 65 through the CPU 80. The CPU 80 sets the PID. With the descrambling-key data and the PID, the descrambler 52 performs descrambling and sends the result to a transport section 53.

The transport section 53 includes a demultiplexer 70 and a queue 71 formed, for example, of a DRAM. The queue 71 is formed of a plurality of memory areas arranged in rows each of which corresponds to a module. In the present embodiment, for example, 32 rows of memory areas are provided, which means information of up to 32 modules can be stored at the same time.

In a general operation, the demultiplexer 70 separates necessary transport packets from the transport stream sent from the descrambler 52 according to a filter condition specified by a DeMUX driver 82 in the CPU 80, uses the queue 71 as a work area, if necessary, obtains data in the format shown in FIG. 7(e) to FIG. 7(h), and sends them to the corresponding functional-circuit sections.

The MPEG video data separated by the demultiplexer 70 is input to an MPEG-2 video decoder 55, and the MPEG audio data is input to an MPEG audio decoder 54. The individual packet of each of these MPEG video and audio data separated by the demultiplexer 70 are input to the corresponding decoder in the PES format, described above.

The MHEG-contents data in the transport stream is extracted by the demultiplexer 70 from the transport stream in units of transport packets, and is written into predetermined memory areas in the queue 71 to be grouped in module units. The MHEG-contents data grouped in units of modules is written into a DSM-CC buffer 91 through a data bus under the control of the CPU 80 and maintained.

Necessary quadruple-speed ATRAC data (compressed audio data) in the transport stream is also extracted by the demultiplexer 70, for example, in units of transport packets, and output to an IEEE-1394 interface 60. In addition to the audio data, video data and various command signals can be also sent through the IEEE-1394 interface 60.

As described with FIG. 6, quadruple-speed ATRAC (1) to (10) having, for example, the data of 10 musical pieces are received at the same time as quadruple-speed ATRAC data. When a specified musical piece among them is to be downloaded to the storage device 13, for example, only the ATRAC data of the musical piece to be downloaded is output through the IEEE-1394 interface 60 to the storage device 13.

More specifically, when a certain musical piece is to be downloaded, the CPU 80 controls the IEEE-1394 interface 60 so as to extract only the ATRAC data of the musical piece and output it.

The MPEG-2 video decoder 55, which receives the MPEG video data in the PES format, applies decoding processing to the data according to the MPEG-2 format by using a memory 55A as a work area. The decoded video data is sent to a display processing section 58.

The display processing section 58 receives the video data sent from the MPEG-2 video decoder 55 and video data for a data service, such as GUI-screen video data, obtained by an MHEG buffer 92 in a main memory 90, described later. The display processing section 58 applies predetermined signal processing to the received video data, converts it to an analog video signal conforming to a predetermined TV system, and outputs it to an analog video output terminal T2.

When the analog video output terminal T2 is connected to an video input terminal of the monitor unit 14, a screen such as that shown in FIG. 4 is displayed.

The MPEG-2 audio decoder 54, which receives the MPEG audio data in the PES format, applies decoding processing to it according to the MPEG audio format by using a memory 54A as a work area. The decoded audio data is sent to a D/A converter 56 and an optical digital output interface 59.

The D/A converter 56 converts the input audio data to an analog audio signal, and outputs to a switch circuit 57. The switch circuit 57 switches the signal path so as to output the analog audio signal to one of analog audio output terminals T3 and T4.

The analog audio output terminal T3 is provided in order to be connected to an audio input terminal of the monitor unit 14. The analog audio output terminal T4 is used for outputting the downloaded musical piece as the analog signal.

The optical digital output interface 59 converts the input digital audio data to an optical digital signal and outputs it. In this case, the optical digital output interface 59 conforms, for example, to IEC 958.

The main memory 90 is used as a work area when the CPU 80 performs various control processing. In the present embodiment, areas serving as the DSM-CC buffer 91, described before, and an MHEG buffer 92 are assigned in the main memory 90.

The MHEG buffer 92 is a work area for generating image data (such as GUI-screen image data) created by script descriptions in the MHEG method. Image data generated there is sent to the display processing section 58 through a bus line.

The CPU 80 performs the whole control of the IRD 12. The control includes a control of data extraction in the demultiplexer 70.

The CPU 80 also applies decoding processing to the obtained MHEG-contents data to structure a GUI screen (scene) according to the contents of the script descriptions and outputs it.

Therefore, the CPU 80 is provided with a control processing section 81 for intensively executing main control processing, and in addition, at least, for example, a DeMUX driver 82, a DSM-CC decoder block 83, and an MHEG decoder block 84. In the present embodiment, among these portions, at least the DSM-CC decoder block 83 and the MHEG decoder block 84 are implemented by software.

The DeMUX driver 82 specifies filter conditions for the demultiplexer 70 according to the PID of the input transport stream.

The DSM-CC decoder block 83 restructures data stored in the DSM-CC buffer 91 in units of modules to form MHEG-contents data.

The MHEG decoder block 84 performs decoding according to the MHEG-contents data obtained from the DSM-CC decoder block 83. The relationship between objects specified in the MHEG-contents script file is implemented to form a scene. When a GUI screen is formed as the scene, the image data of the GUI screen is generated according to the contents of the script file by using the MHEG buffer 92.

A U-U API interface is used between the DSM-CC decoder block 83 and the MHEG decoder block 84.

The U-U API interface is used for accessing a DSM manager object (server object implementing a DSM function), and thereby operations are performed for objects, such as the service gateway, a directory, a file, a stream, and a stream event.

A client object can operate these objects by using this API.

An operation example for extracting a target object required for generating one scene from a transport stream under the control of the CPU 80 will be described below.

In the DSM-CC protocol, a interoperable object reference (IOR) is used for indicating the position of an object in a transport stream. The IOR includes an identifier against a carousel for looking for the object, the identifier (hereinafter called module_id) of a module including the object, an identifier (hereinafter called object_key) for specifying the object in the module, and tag information (hereinafter called association_tag) for identifying a DII having the information of the module including the object.

The DII having the module information includes information such as the module_id, the size, and the version of each of one or more modules, and tag information (hereinafter called association_tag) for identifying the module.

When the CPU 80 identifies the IOR extracted from the transport stream, the object indicated by the IOR is received and separated, for example, in the following processes.

(Pr 1) The DeMUX driver 82 in the CPU 80 searches the elementary stream (ES) loop of the PMT in the carousel for an ES having the same value as the association_tag of the IOR to obtain the PID. The DII is included in the ES having this PID.

(Pr 2) This PID and the table_id_extension are set as filter conditions in the demultiplexer 70. The demultiplexer 70 separates the DII and outputs it to the CPU 80.

(Pr 3) In the DII, the association_tag of the module corresponding to the module_id included in the IOR is obtained.

(Pr 4) The ES loop (carousel) of the PMT is searched for an ES having the same value as the association_tag to obtain the PID. The target module is included in the ES having this PID.

(Pr 5) With the PID and the module_id being set as filter conditions, the demultiplexer 70 performs filtering. The transport packet satisfying these filter conditions is extracted and stored in a predetermined memory area (row) in the queue 71 to finally form the target module.

(Pr 6) From this module, the object corresponding to the object_key included in the IOR is extracted. This is the target object. The object extracted from the module is written, for example, into a predetermined area of the DSM-CC buffer 91.

The foregoing operations are repeated to store the target objects into the DSM-CC buffer 91, and thereby MHEG contents forming a required scene are obtained.

A man-machine interface 61 receives a command signal sent from the remote controller 64 and sends it to the CPU 80. The CPU 80 performs a necessary control processing to obtain the operation of the unit corresponding to the received command signal.

The IC card 65 is inserted into an IC-card slot 62. The CPU 80 performs information write and read operations for the inserted IC card 65.

A modem 63 is connected to the accounting server 5 through the telephone line 4. The CPU 80 controls the modem 63 such that the IRD 12 communicates with the accounting server 5.

A non-volatile memory 68 is provided in order that the CPU 80 holds necessary information for a long period. The non-volatile memory 68 stores information which should be held even if the power is turned off, such as the initial values and the settings of various control coefficients. In the present embodiment, the non-volatile memory 68 stores a connected-unit ID table which holds the information of the connected units.

A timer 69 functions as a so-called time measurement unit, and counts the current date and time by the year, month, day, hour, minute, and second. It is used, for example, for a downloading reservation.

Control data and commands can be transferred through the IEEE-1394 interface 60 to and from the storage device 13 if the storage device 13 conforms to IEEE 1394.

When the storage device does not conform to IEEE 1394 and is connected, communication for commands and others is allowed with the use of a control-line interface 67 or an infrared interface 66 constituting an external bus line.

The control-line interface 67 allows bidirectional command communication between the IRD 12 and the storage device 13. When a connected unit can operate with an infrared remote commander, the unit is controlled by infrared commands of the data form corresponding to the unit, output from the infrared interface 66. When the storage device 13 can output infrared signals, bidirectional communication is allowed through the infrared interface.

When the storage device 13 does not conform to IEEE 1394, audio data is output to the storage device 13 as a base-band signal, not as ATRAC data, through the optical digital output interface 59 or the analog audio output terminal T4.

Signal flows of video and audio sources in the IRD 12 having the above structure will be additionally described with the display form shown in FIG. 4 taken into account.

As shown in FIG. 4(a), to output a usual program, MPEG video data and MPEG audio data required for the program are extracted from an input transport stream and decoding processing is applied to them. The video data and the MPEG audio data are output from the analog video output terminal T2 and the analog audio output terminal T3, respectively, and the monitor unit 14 performs an image display and an audio output for the broadcasting program.

To output the GUI screen shown in FIG. 4(b), the transport section 53 extracts the MHEG-contents data required for the GUI screen (scene) from the input transport stream, and inputs it into the DSM-CC buffer 91. By using the data, the DSM-CC decoder block 83 and the MHEG decoder block 84 function as described above to generate the image data of the scene (GUI screen) in the MHEG buffer 92. This image data is output from the analog video output terminal T2 through the display processing section 58, and thereby the GUI screen is displayed on the monitor unit 14.

When a musical piece is selected from the musical-piece list 21B on the GUI screen shown in FIG. 4(b) for test-listening to the audio data of the musical piece, the demultiplexer 70 obtains the MPEG audio data of the musical piece. This MPEG audio data is converted to an analog audio signal through the MPEG audio decoder 54, the D/A converter 56, the switch circuit 57, and the analog audio output terminal T3, and output to the monitor unit 14.

When the downloading button 28 is pressed on the GUI screen shown in FIG. 4(b) to download the audio data, the demultiplexer 70 extracts the audio data of the musical piece to be downloaded, and output from the analog audio output terminal T4, the optical digital output interface 59, or the IEEE-1394 interface 60.

Especially when the MD recorder 13A conforming to IEEE 1394 shown in FIG. 2 is connected to the IEEE-1394 interface 60, the demultiplexer 70 extracts the quadruple-speed ATRAC data of the musical piece to be downloaded, and the data is recorded into a disc loaded into the MD recorder 13A through the IEEE-1394 interface 60. In this case, the demultiplexer 70 also extracts, for example, the still-picture data of an album jacket compressed by the JPEG method and text data such as the lyrics of the musical piece and artist profile from the transport stream, and transmitted to the MD recorder 13A through the IEEE-1394 interface 60. The MD recorder 13A can record these still-picture data and text data in a predetermined area of the loaded disc.

In the digital satellite broadcasting system employing the DSM-CC protocol as the transmission standard as described above in the present embodiment, two types of receiving apparatuses, that is, the IRD 12, can be used in terms of the structure of a receiving buffer.

One type of the IRD 12 includes a large-capacity receiving buffer such as a flash memory or a hard disk drive used for a data service (GUI-screen display output). In such a structure, the entire data service (MHEG contents) broadcasted is received at once and held in the receiving buffer. Once the data service is received and held, any MHEG scene (GUI screen) can be immediately displayed only with a delay of a memory-access waiting time. In other words, even when the user performs an operation for switching the GUI screen (scene), the next scene is displayed almost immediately.

In such a case, a slight overhead time caused by filter-condition switching in the demultiplexer is not a problem in displaying a GUI screen.

The other type of the IRD 12 does not have a large-capacity receiving buffer for some reason such as for reduction in cost. The IRD 12 in the present embodiment described above is of this type. The whole data of the data broadcasting service cannot be buffered at once, and only several modules, each of which is a receiving unit, of data are buffered in a receiving buffer. In the IRD 12 shown in FIG. 15, this receiving buffer corresponds to the queue 71. Only the memory area of 32 rows, which can buffer the modules, is provided.

In such an IRD, the size of a module cannot exceed the size of a buffer memory in the receiving apparatus. Therefore, the entire data service should be formed of a set of modules, and a procedure for receiving only a module required for a display at a certain point of time needs to be specified.

The procedure, Pr 1 to Pr 6, for extracting an object, described before, is used in an IRD having no large-capacity receiving buffer.

Figure 16:
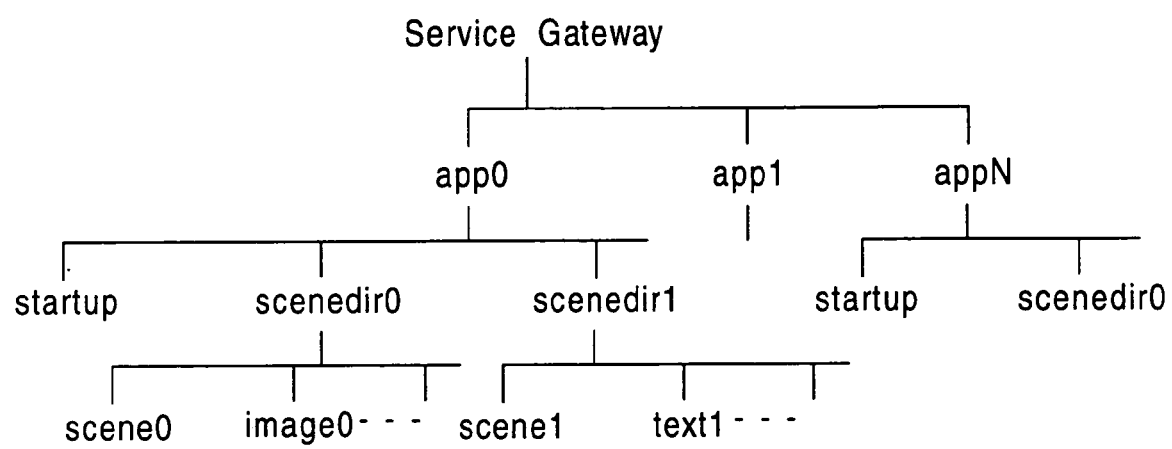
FIG. 16 is a view showing an examplary directory structure of a data service.

FIG. 16 shows a directory structure of files (MHEG application files) serving as a data service conforming to the MHEG method. The object carousel method can handle this directory structure.

An MHEG application file serving as an inlet for a service domain is usually a file called app0/startup immediately below a service gateway.

Basically, application directories, app0, app1, . . . , and appN, are disposed under the service domain (service gateway), and an application file called startup and the directories, scenedir0, scenedir1, . . . , of scenes constituting an application are disposed under each application directory. Under each scene directory, an MHEG scene file and content files constituting a scene are disposed.

It is assumed that the director structure shown in FIG. 16 is used, the application to be accessed first in a data service is a file called service gateway/app0/startup and the first scene is formed of still-picture and text files included in scenedir0.

The IRD starts receiving in the following procedure in this data service.

(Pr 11) Obtain the PID of the desired data service by referencing a PMT. Perform filtering in the demultiplexer with the PID, table_id, and table_id_extension being set to filter conditions to obtain a DSI. The IOR of a service gateway object is written into the DSI.

(Pr 12) Obtain the service gateway object from the IOR in the object extracting procedure, (Pr 1) to (Pr 6).

In two types of BIOP messages, the service gateway object and a directory object, information such as the names, positions (IOR), and types of objects disposed directly below the directory is included as attribute information called binding. Therefore, when the name of an object is given, the object having the name can be reached by tracing down from the service gateway directory by directory. (If an object having the identical name exists, a different upper path name is required.) And then, the procedure below is followed.

(Pr 13) Obtain the IOR of the app0 object from the binding information in the service gateway object. Obtain the app0 object by following the object extracting procedure, (Pr 1) to (Pr 6).

(Pr 14) Obtain the IOR of the startup object from the binding information in the app0 object. Obtain the startup object by following the object extracting procedure, (Pr 1) to (Pr 6). Obtain a scenedir0 object, which is the first scene, and others in the same way.

1-7. MD Recorder

Figure 17:
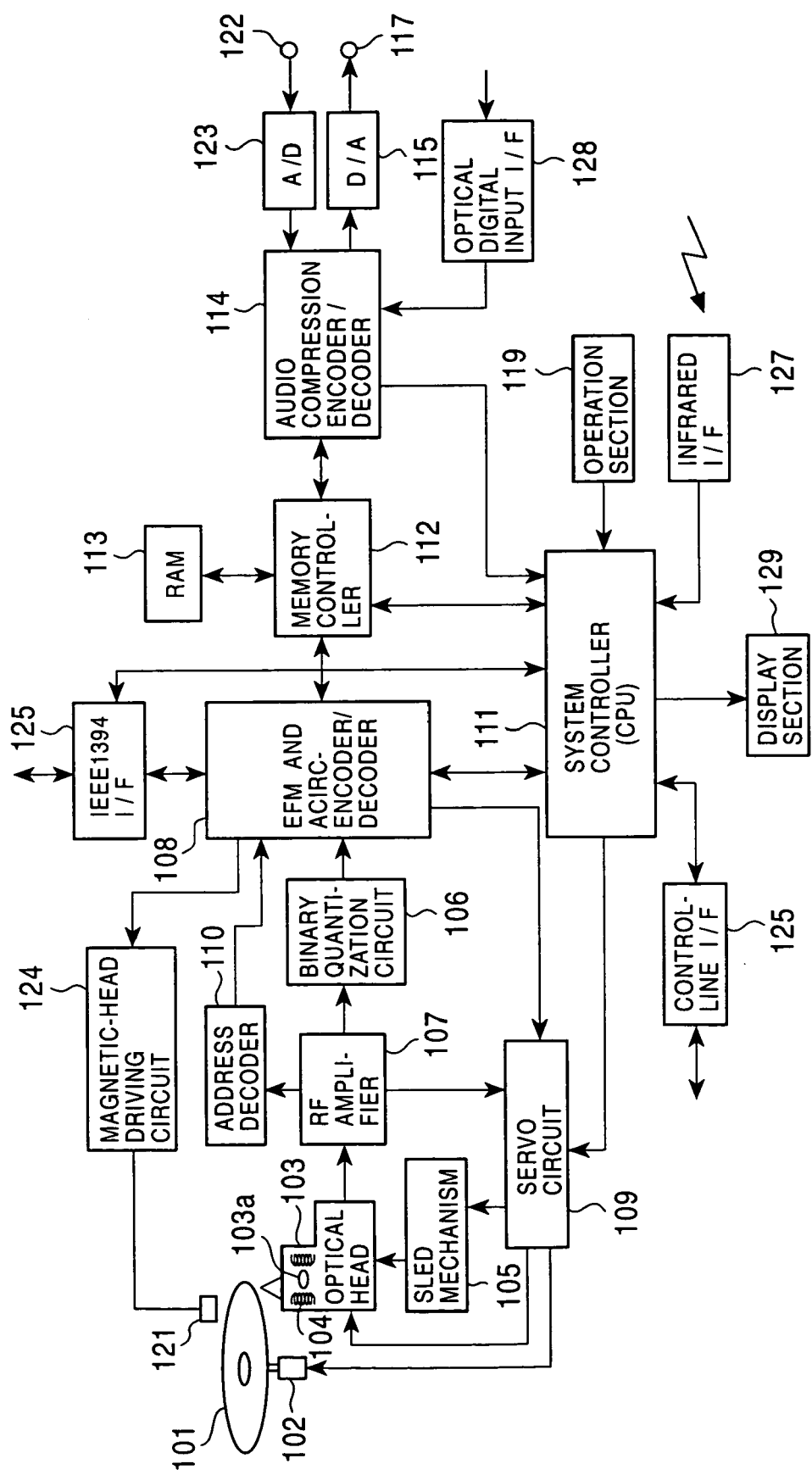
FIG. 17 is a block diagram of an MD recorder connected to the IRD in the present embodiment.

FIG. 17 shows a structure example of an MD recorder serving as the storage device 13.

A disc 101 is, for example, a Mini Disc made from a magneto-optical disk having a diameter of 64 mm accommodated in a cartridge. The loaded disc 101 is rotated by a spindle motor 102 at a predetermined CLV speed. An optical head 103 and a magnetic head 121 are disposed so as to oppose each other against a recording surface of the disc 101 at both sides. A laser diode for outputting laser light, an optical system formed of a polarizing beam splitter and an objective 103a, and a detector for detecting reflected light are mounted on the optical head 103. The objective 103a is held by a two-axis device 104 such that the objective can move in a disc radial direction and a direction in which it approaches and retracts from the disc. The optical head 103 and the magnetic head 121 can be moved in the disc radial direction by a sled mechanism 105.

Information detected by the optical head 103 from the disc 101 is sent to an RF amplifier 107. The RF amplifier 107 applies calculation processing to the output of each detector of the optical head 103 to extract a reproduction RF signal, a tracking error signal, a focus error signal, and absolute-position information wobble-recorded. The reproduction RF signal is sent to an eight-to-fourteen-modulation (EFM) and advanced-cross-interleave-Reed-Solomon-code (ACICR) encoder/decoder section 108. The tracking error signal and the focus error signal are sent from the RF amplifier 107 to a servo circuit 109. The absolute-position information is sent to an address decoder 110, is decoded, and is output as an absolute-position address.

The servo circuit 109 generates various servo driving signals from the tracking error signal, the focus error signal, a track jump command and an access command from a system controller 111, and rotation-speed detection information from the spindle motor 102 to control the two-axis device 104 and the sled mechanism 105 to perform focus control and tracking control.

The system controller 111 manages the whole operations. An input is given to the system controller 111 from an operation section 119.

An audio signal (analog audio signal) input to an input terminal 122 is sent to an A/D converter 123 for recording. The A/D converter 123 converts the audio signal to a digital signal and sends it to an audio compression encoder/decoder 114. The audio compression encoder/decoder 114 compresses the audio data by the ATRAC method.

The input terminal 122 is for a so-called analog line input. When the terminal is connected, for example, to the terminal T4 of the IRD 12, an audio signal can be input from the IRD 12.

The data ATRAC-compressed by the audio compression encoder/decoder 114 is written into a RAM 113 once under the control of the memory controller 112, and then is sent to the EFM and ACIRC encoder/decoder 108. The EFM and ACIRC encoder/decoder 108 adds error correcting codes to the audio data, and EFM-modulates the data. The output of the EFM and ACIRC encoder/decoder is sent to the magnetic head 121 through a magnetic-head driving circuit 124. The optical head 103 emits a high-level laser beam in order to write the data into the disc. The ATRAC-compressed audio data is recorded into the disc 101.

In this MD recorder, ATRAC data can be directly input and recorded. ATRAC data is input, for example, through an IEEE-1394 interface 125.

When the IEEE-1394 interface 60 of the IRD 12 is connected to the IEEE-1394 interface 125, quadruple-speed ATRAC data is sent through the interfaces for downloading.

ATRAC data input through the IEEE-1394 interface 125 is sent to the EFM and ACIRC encoder/decoder 108, and error correcting codes are added to this audio data and EFM modulation is applied there. The output of the EFM and ACIRC encoder/decoder 108 is sent to the magnetic head 121 through the magnetic-head driving circuit 124. At the same time, the optical head 103 emits a high-level laser beam to write the data into the disc. The audio data compressed by the ATRAC method is thus recorded into the disc 101.

An optical digital input interface 128 is also provided.

When the optical digital input interface 128 conforms to IEC 958, for example, if it is connected to the optical digital output interface 59 of the IRD 12 or too an optical digital output interface of another unit, digital audio data is input through these interfaces.

In this case, since the data is not in the ATRAC data form, the input digital audio data is compressed in the ATRAC format by the audio compression encoder/decoder 114, and changed to recording data through the RAM 113 and the EFM and ACIRC encoder/decoder 108.

In reproduction, the optical head 103 reads a recording signal from the disc 101. The output of the optical head 103 is sent to the RF amplifier 107, and the RF amplifier 107 outputs a reproduction RF signal. The reproduction RF signal is sent to the EFM and ACIRC encoder/decoder 108 through a binary quantization circuit 106. The EFM and ACIRC decoder/encoder 108 applies EFM modulation processing and error correcting processing by ACIRC to the reproduction RF signal.

The output of the EFM and ACIRC encoder/decoder 108 is written into the RAM 113 once under the control of the memory controller 112. The optical head 103 reads data from the magneto-optical disc 101 and reproduction data is sent from the optical head 103 to the RAM 113, at 1.41 Mb/sec intermittently.

The data written into the RAM 113 is read at a reproduction-data transmission rate of 0.3 Mb/sec, is sent to the audio compression encoder/decoder 114, and decompression processing is applied to the ATRAC-compressed data.

The decoded data, that is, the digital audio data quantized by 16 bits and sampled at a sampling frequency of 44.1 kHz, is sent to the D/A converter 115, and is converted to an analog audio signal. The analog audio signal is output from an output terminal 117 to an external unit or to a reproduction system including an amplifier and a speaker.

Data is written into or read from the RAM 113 with an address specified by a write pointer or a read pointer controlled by the memory controller 122. The write pointer is incremented at 1.41 Mb/sec whereas the read pointer is incremented at 0.3 Mb/sec. Due to a difference between the write bit rate and the read bit rate, data is always accumulated to some extent in the RAM 113. When data is accumulated to the full capacity of the RAM 113, the write pointer stops incrementing, and the optical head 103 stops reading data from the disc 101. Since the read pointer continues incrementing, however, a reproduction audio output is not interrupted.

Only an operation for reading data from the RAM 113 continues. When data accumulated in the RAM 113 becomes a predetermined amount or less than that, the optical head 113 again starts reading data and the write pointer again starts incrementing. Data again accumulates in the RAM 13.

Since a reproduction audio signal is output through the RAM 113 in this way, even if tracking fails due to external disturbance, for example, a reproduction audio output is not interrupted. In addition, when the head is moved to a correct tracking position while data remains in the RAM 113 and data reading is restarted, this reproduction operation can continue without adversely affecting the reproduction output.

In recording, a digital audio signal or an analog audio signal input in real-time is compressed by the ATRAC method, accumulated in the RAM 113 once, and then read at a predetermined timing in units of, for example, clusters, described later, as recording data to be processed. The data can be processed at a high rate in processing such as ACIRC processing and EFM processing. Since the data is input in real-time according to the music, a musical piece is recorded into the disc 101 within the same time period as that for the performance of the musical piece.

Conversely, when musical-piece data is sent from the IRD 12 in the quadruple-speed ATRAC format, the input of one musical piece is finished within a short time. Since processing needs to be performed according to the input rate, recording (that is, downloading a musical piece) into the disc 101 can be finished within a very short time. A musical piece having a performance time of four minutes, for example, can be downloaded in about one minute.

The operation section 119 and an infrared interface 127 are provided as operation input sections for the system controller 112, which controls the whole operations.

The operation section 119 is provided with operators such as various operation keys and dials. The operators include those related to recording and reproduction operations, such as reproduction, recording, halt, stop, FF (fast forward), REW (rewinding), and AMS (automatic mark search) operators, mode operators related to play modes, such as usual reproduction, program reproduction, and shuffle reproduction operators, operators for display-mode operations which change a display condition in a display section 129, and operators for editing operations, such as track (program) division, track connection, track deletion, track-name input, and disc-name input operators.

The information of operations at these operation keys and dials is sent to the system controller 111, and the system controller 111 performs operation control according to the operation information.

The infrared interface 127 receives/decodes an infrared command signal output from, for example, a special infrared remote commander, and sends it to the system controller 111. Since the remote commander is provided with operation keys similar to those on the operation section 119, the user can perform desired operations by the use of the remote commander.

The IRD 12 can output an infrared command signal in a command signal form corresponding to the MD recorder through the infrared interface 66 to specify various designations, such as recording start/stop and halt, to the MD recorder.

When a control-line interface 126 is provided, if it is connected to the control-line interface 67 of the IRD, the system controller 11 is allowed to perform various data communication with the CPU 80. With these interfaces, the IRD 12 can perform various designations, such as recording start/stop and halt, to the MD recorder.

When the IEEE-1394 interface is used for connection, various control commands as well as ATRAC data can be transferred through the IEEE-1394 interface. Therefore, when the MD recorder does not conform to IEEE 1394, it is suited that the IRD 12 controls the MD recorder through the control-line interface 126 or the infrared interface 127.

The system controller 111 controls display operations on the display section 129.

More specifically, the system controller 11 sends data to be displayed to a display driver in the display section 129. The display driver drives, for example, a liquid-crystal panel according to the received data to display the required numerals, characters, and symbols. For example, the operation mode of the disc which data is being recorded into or reproduced from, a track number, recording time/reproduction time, and an editing operation state. Character information (such as a track name) attached to main-data track (ATRAC data of a musical piece) and managed can be recorded into the disc 101. Input characters are displayed when such character information is input, and character information read from the disc is displayed.

When text data and image data serving as AUX files, described later, is read from the disc 101, they can be displayed in the display section 129.

To perform a recording or reproduction operation for the disc 101, it is necessary to read control information recorded into the disc 101, that is, premastered TOC (P-TOC) and user TOC (U-TOC). The system controller 111 determines the address of a recording area on the disc 101 and the address of a reproduction area according to the control information. This control information is held by the RAM 113.

The system controller 111 reads the control information from the most inner side of the disc 101 when the disc is loaded, and stores it in the RAM 113 such that it can be referenced in recording/reproduction/editing for the disc 101.

The U-TOC is rewritten when data is recorded or edited. The system controller 111 updates the U-TOC information stored in the RAM 113 every time a recording or editing operation is performed, and according to this updating, it also updates the U-TOC information in the disc 101 at a predetermined timing.

The disc 101 has tracks for ATRAC data and those for AUX data files. To manage the AUX data files, AUX-TOC is formed on the disc 101.

The system controller 111 reads AUX-TOC when it reads U-TOC, and stores AUX-TOC in the RAM 113 such that the AUX data management condition can be referenced as required.

Although details will be described later, when ATRAC data sent from the IRD 12 is downloaded into the disc 101, in addition to the ATRAC data, information (also called additional information) accompanied by the ATRAC data, which is the data of a musical piece, such as necessary U-TOC data, other text data, and image data, is also offered. In a series of downloading operations, in addition to ATRAC data, management/additional information therefor are also recorded into the disc 101 as U-TOC data and AUX data files.

1-8. MD Area Structure

A structure of recording data and an area structure in the MD (disc 101) will be described below.

Figure 18:
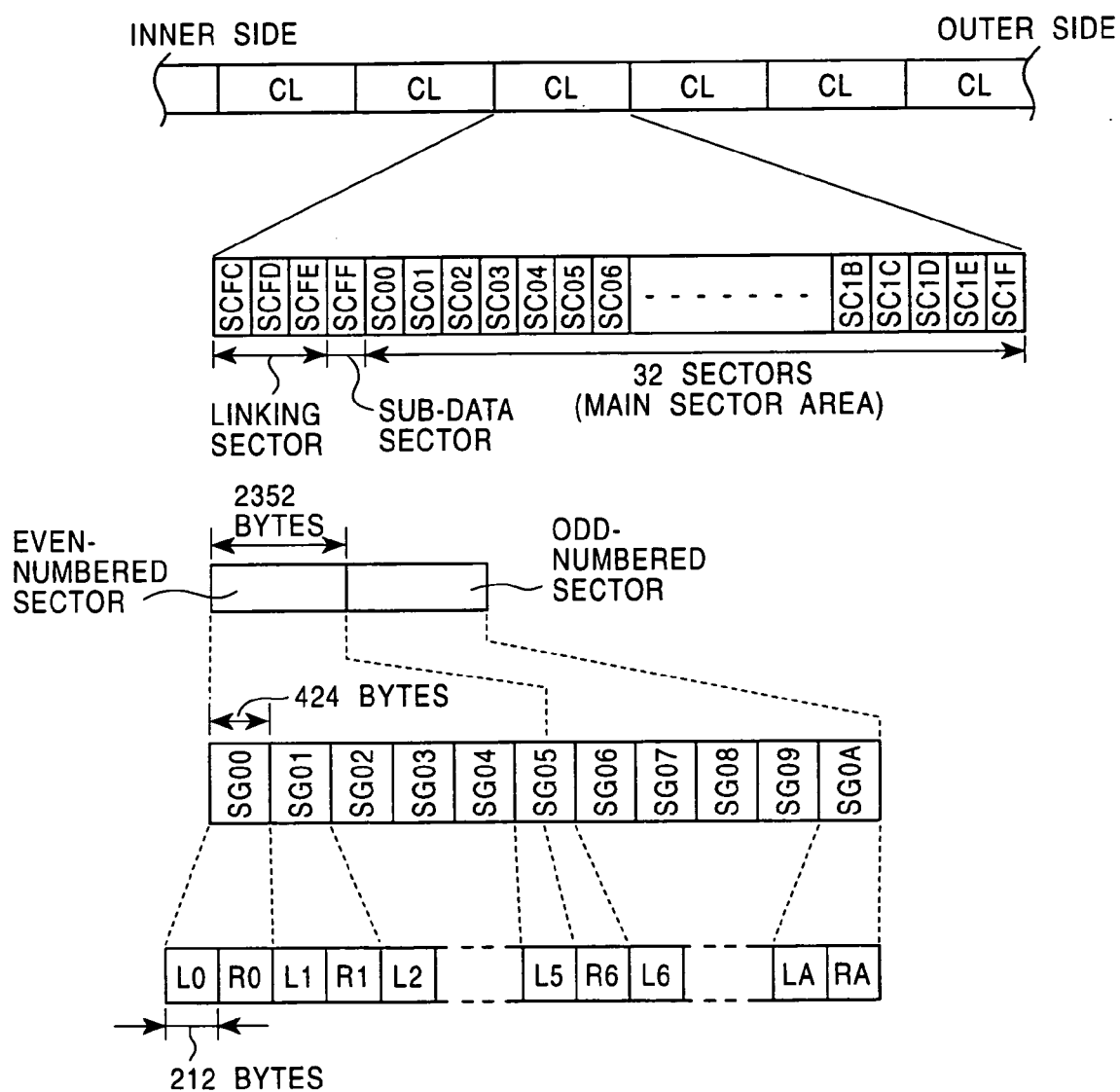
FIG. 18 is a view showing a cluster format in a Mini Disc.

As a recording track in the Mini-Disk system, clusters CL are formed consecutively as shown in FIG. 18. One cluster serves as a recording unit, and corresponds to two or three turns of the track.

One cluster CL is formed of four-sector linking area at sectors SCFC to SCFF and a 32-sector main data area at sectors SC00 to SC1F. One sector serves as a data unit having 2352 bytes.

Among the four-sector linking area, the sector SCFF serves as sub-data sector and is used for sub-data information recording. The three sectors SFFC to SFFE are not used for data recording.

TOC data, audio data, and AUX data are recorded into the 32-sector main data area.

An address is recorded in alternate sectors.

A sector is further divided into sound groups. Two sectors corresponds to 11 sound groups.

As shown in the figure, two consecutive sectors, an even-numbered sector such as a sector SC00 and an odd-numbered sector such as a sector SC01, include sound groups SG00 to SG0A. One sound group is formed of 424 bytes and has audio data of 11.61 ms.

In one sound group SG, data is divided and recorded into an L channel and an R channel. For example, a sound group SG00 is formed of an L channel data L0 and an R channel data R0, and a sound group SG01 is formed of an L channel data L1 and an R channel data R1.

An L-channel or R-channel data area having 212 bytes is called a sound frame.

Figure 19:
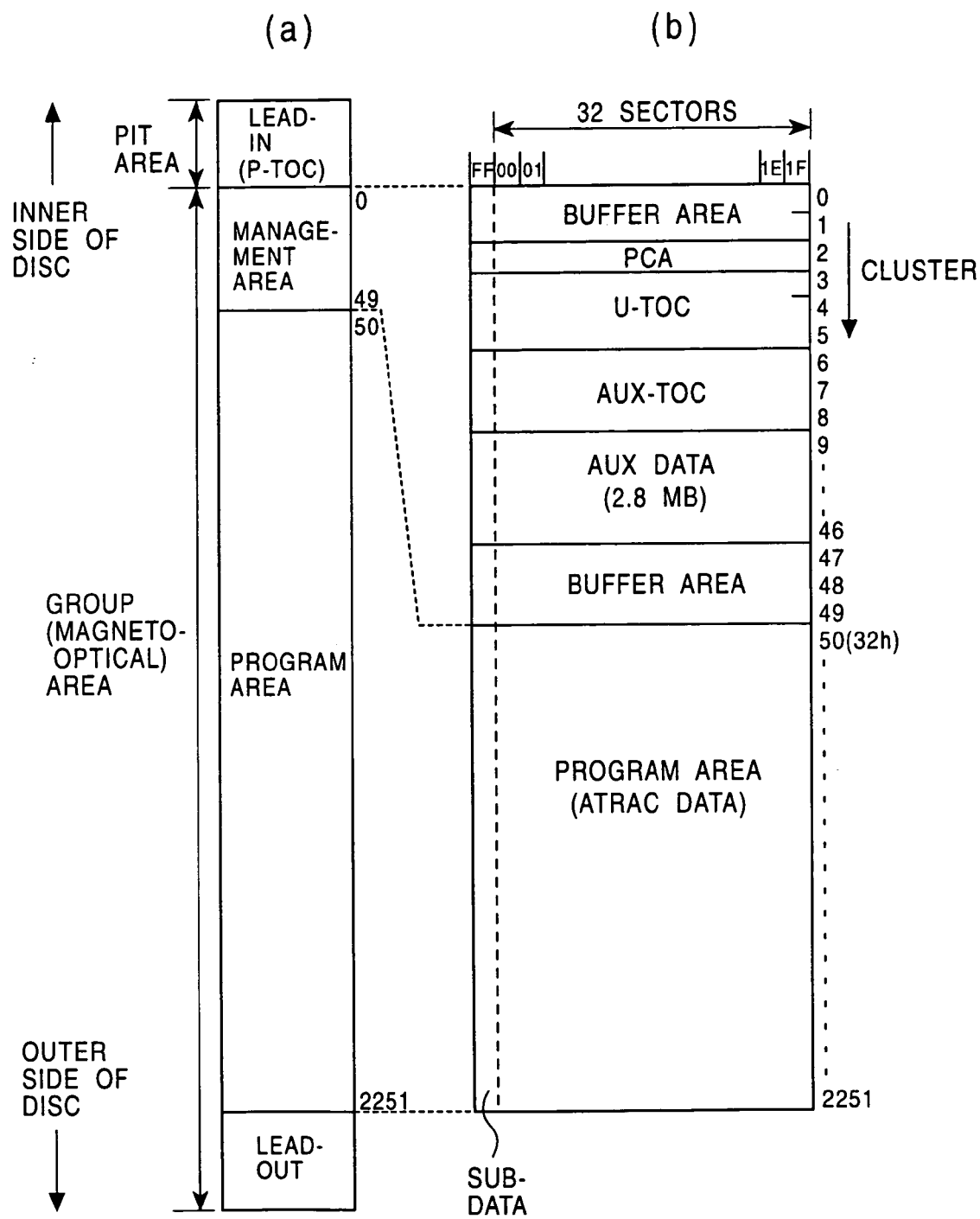
FIG. 19 is a view showing an area structure of the Mini Disc.

FIG. 19 shows an area structure of the disc 101.

FIG. 19(a) shows areas from the most inner side to the most outer side of the disc.

In a magneto-optical disc 90, a pit area is provided at the most inner side, where reproduction-only data is formed by embossed pits, and P-TOC is recorded therein.

A magneto-optical area is provided at a more outer position than the pit area, and serves as a recording-and-reproduction-allowed area where groups are formed as recording-track guides.

In this magneto-optical area, a management area is formed at the most inner side from a cluster 0 to a cluster 49, and a program area is formed from a cluster 50 to a cluster 251, where a program such as an actual musical piece is recorded. A lead-out area is provided at a more outer position than the program area.

FIG. 19(b) shows details in the management area. In FIG. 19(b), the horizontal direction corresponds to sectors (linking sectors omitted) and the vertical direction corresponds to clusters.

In the management area, clusters 0 and 1 serves as a buffer area against the pit area, and a cluster 2 serves as a power calibration area PCA used for adjusting the output power of laser light.

Clusters 3, 4, and 5 store U-TOC. A U-TOC data format is specified for each sector in one cluster and predetermined management information is recorded. U-TOC data is recorded three times repeatedly in the clusters 3, 4, and 5.

Since one cluster has 32 sectors in a main sector area, up to 32 types (U-TOC sectors 0 to 31) of management information can be recorded in a U-TOC cluster.

Actually, mainly used U-TOC sectors are sectors 0, 1, 2, and 4. The U-TOC sector 0 specifies the recording position address of a recorded track and a track mode. The U-TOC sectors 1 and 4 specify character information indicating the name of the recorded track. The U-TOC sector 2 specifies the recording time of the recorded track.

Clusters 6, 7, and 8 store AUX-TOC, which manages an AUX-data file. File management information such as an allocation table for data files such as a text file and an image file is recorded.

Although a detailed description is omitted here, a data format is specified for each sector in one cluster and predetermined file management information is recorded. AUX-TOC data is recorded three times repeatedly in the clusters 6, 7, and 8.

AUX data is recorded in an area from a cluster 9 to a cluster 46. AUX-data files are formed in units of sectors, including a picture-file sector for a still-picture file, a text-file sector for a character information file, and a karaoke-text-file sector for a character information file synchronized with a program.

These AUX-data files and a portion in the AUX-data area where an AUX-data file can be recorded are managed by the AUX-TOC.

The data-file recording capacity of the AUX-data area is 2.8 MB in an error correcting method mode 2.

The data-file recording capacity can be extended by forming a second AUX-data area, for example, at the latter half of the program area or an area more outer than the program area, such as a lead-out section.

Clusters 47, 48, and 49 serve as a buffer area against the program area.

In the program area starting from a cluster 50 (=32h), the audio data of one or a plurality of musical pieces is recorded in the ATRAC format.

Each recorded program and a recordable area are managed by the U-TOC.

In each cluster in the program area, the sector FFh can be used for recording some information as sub data, as described above.

2. Downloading 2-1. Unit Connection Structure

The system for executing transmission, receiving, and downloading of a program in satellite communication broadcasting has been described. A downloading operation for the storage device 13 connected to the IRD 12 will be described below.

The receiving facility formed at a house was simply described by referring to FIG. 2. In an actual case, a plurality of storage devices 13 may be connected to the IRD 12.

Figure 20:
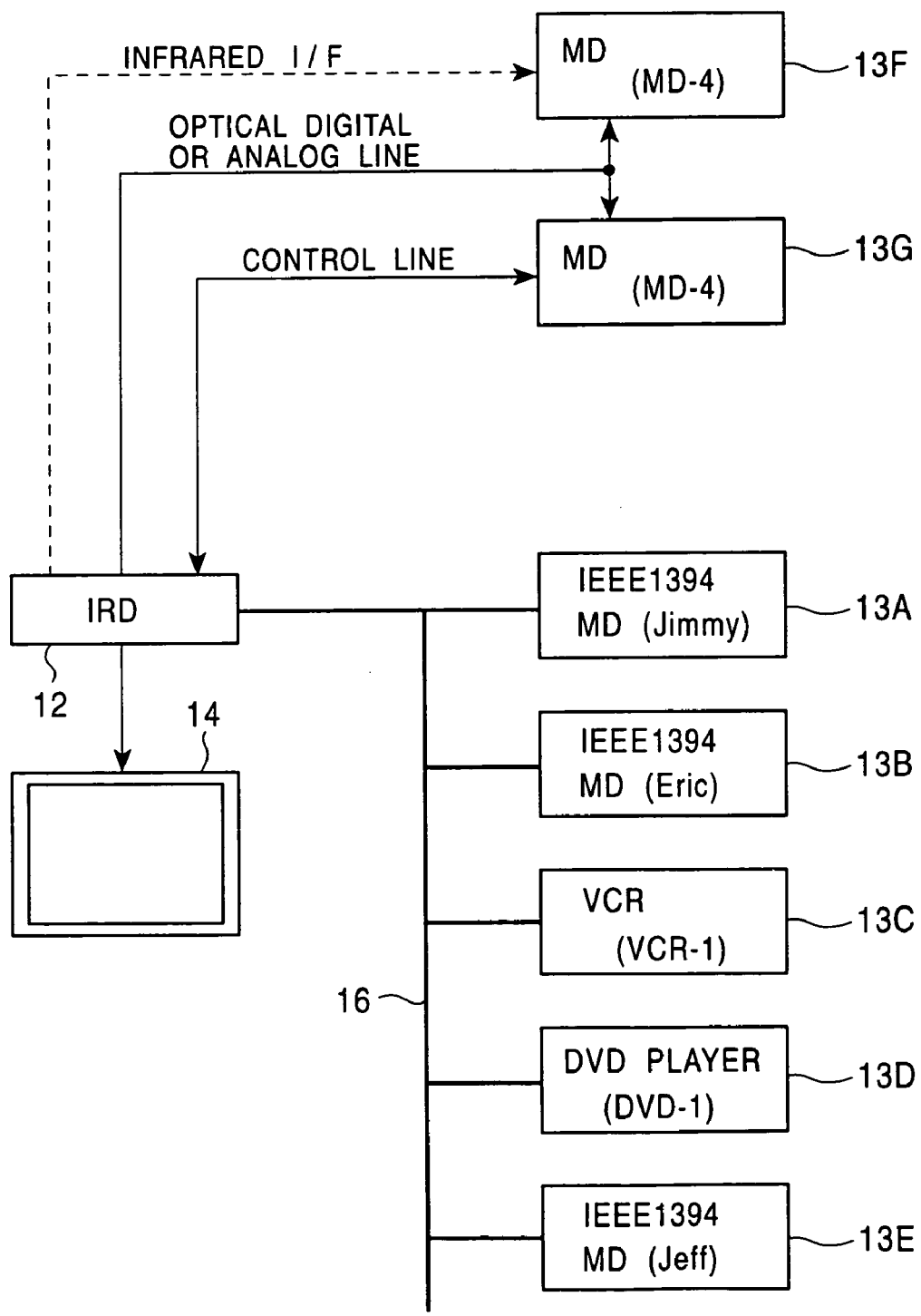
FIG. 20 is a block diagram showing an examplary structure of a receiving facility in the present embodiment.

FIG. 20 shows a structural example of a case in which a plurality of storage devices 13 are connected.

In FIG. 20, five IEEE-1394 units are connected to the IRD 12. They are MD recorders 13A, 13B, and 13E, a VCR 13C, and a DVD player 13D.

These units can communicate with the IRD 12 by the IEEE-1394 method by using various control data and commands.

The MD recorders 13A and 13B can also record ATRAC data sent through an IEEE-1394 bus 16. Conversely, The MD recorder 13E is not provided with a function for recording ATRAC data sent through the IEEE-1394 interface as is. In the MD recorder 13E, digital audio data is input through the IEEE-1394 bus 16 or an optical digital line, and ATRAC processing is applied and recorded.

The MD recorders 13F and 13G do not conform to IEEE 1394.

When these recorders are connected to the IRD 12 with an optical digital line or an analog line, they can receive audio data from the IRD 12. When they are connected by an infrared interface or through a control line, their operations can be controlled by the IRD 12.

In the following description of a downloading operation, the MD recorder 13A or 13B is used as a storage device. In other words, the IRD 12 sends ATRAC data and various commands to the MD recorder 13A or 13B through the IEEE-1394 bus, and has it execute high-speed downloading of quadruple-speed ATRAC data.

When downloading is performed in real time but not at a high speed, the same downloading processing as that described below can be allowed for the other units 13C to 13G.

2-2. Unit-Connection Processing

The processing of the IRD 12 performed when a unit serving as the storage device 13 is connected to the IRD 12 will be described below.

Every time when a storage device is connected, the CPU 80 of the IRD 12 adds data related to the connected unit to a connected-unit ID table shown in FIG. 24. This connected-unit ID table (hereinafter called an ID table) is stored in the non-volatile memory 68.

In communication between the connected unit and the IRD 12, commands specified in IEEE 1394 are used.

Figure 21:
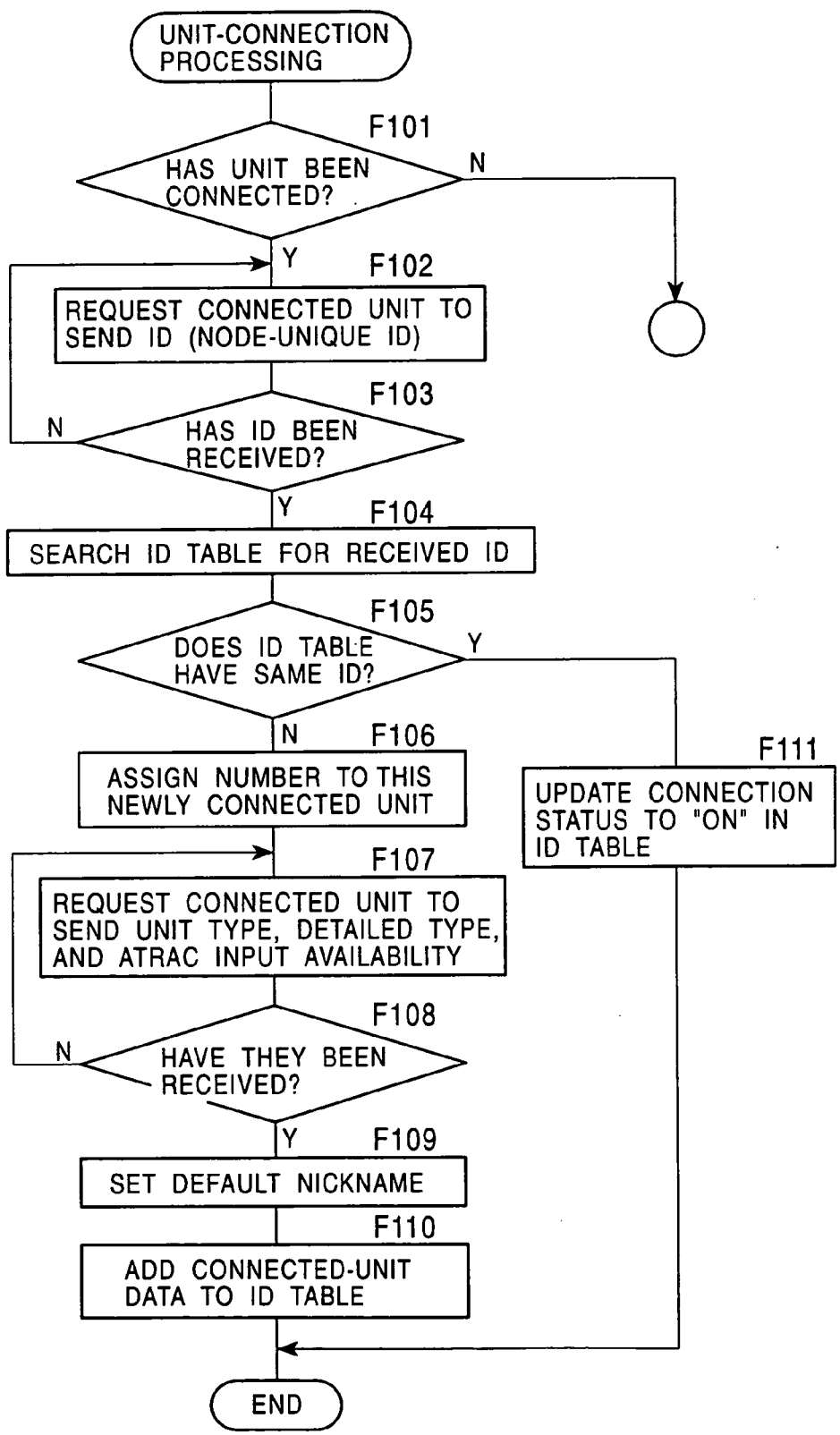
FIG. 21 is a flowchart of unit-connection processing in the IRD in the present embodiment.

FIG. 21 shows processing of the CPU 80 to be executed when a storage device is connected.

When a storage device 13 is connected to the IRD 12 through the IEEE-1394 bus 16, the processing of the CPU 80 proceeds from a step F101 to a step F102 in FIG. 21, and a process for adding data to the ID table is started.

In step F102, a request is sent to the connected unit so as to have the unit send back an ID given to the unit. The ID, referred to as a node unique ID, is actually a ID code given to the unit as a unique number (or character).

The connected unit sends back the ID code unique to the IRD 12 as a response to the ID request.

The CPU 80 awaits receipt of the ID code in a step F103. When the CPU 80 receives the ID code, the processing proceeds to a step F104.

In the step F104, whether the ID table has the same ID code as the received ID code is checked.

When a new unit is connected to the IRD 12, the ID table does not have the same ID code as that of the unit. Therefore, when the new unit is connected, the processing proceeds from a step F105 to a step F106, and the CPU 80 assigns a number to the connected unit.

When numbers are sequentially assigned to connected units starting from 1, for example, if three units have already been connected and then a new unit is connected, the number of the new unit is 4.

In the following step F107, the connected unit is sequentially requested to send necessary information such as a unit type, a detailed type, and whether it can receive an ATRAC input.

The connected unit sends the information, such as the unit type, the detailed type, and the ATRAC input availability, according to the information requests.

The unit type includes information for discriminating between a VCR unit and a disc unit. For example, an analog VCR, a DV unit, and a D-VHS unit are VCR units. An MD recorder, a CD player, a DVD recorder, and a hard disk drive are disc units.

The detailed type is the information of an actual unit type. It includes, for example, an MD recorder, an analog VCR, and a DVD player.

In a step F108, when the CPU 80 receives the requested necessary information, the processing proceeds to a step F109. A nickname is automatically assigned to the connected unit.

As described later, in the present embodiment, the user can set any nickname for the connected unit, but when the unit is connected, the CPU 80 automatically assigns a default nickname first. For example, a tentative nickname such as MD-1 is assigned to an MD recorder.

In the following step F110, the information of the connected unit is added to the ID table.

Information for one unit in the ID table includes a connected-unit number to be assigned in the step F106, an ID to be received in the step F103, a unit type, a detailed type, and ATRAC-input availability to be received in the step F108, and a default nickname to be set in the step F109.

These information items are written into the ID table shown in FIG. 24.

While only the MD recorders 13A and 13B are connected in FIG. 20, for example, when the VCR 13C is connected as a new unit, the processing shown in FIG. 21 is executed and data shown in the fourth line of the table in FIG. 24 is stored, which includes a unit number of 3, an ID of "id3," a unit type of "VCR," a detailed type of "analog VCR," a default nickname of "VCR-1," and an ATRAC input of "not allowed." The connection-status data is set to "on."

FIG. 24 shows a case in which five units shown in FIG. 20 are connected through the IEEE-1394 bus and the user has already assign nicknames to the MD recorders 13A, 13B, and 13E.

The user can assign a nickname to any unit by operating, for example, the remote commander 64 in a nickname input mode to send data to the IRD 12.

Figure 29:
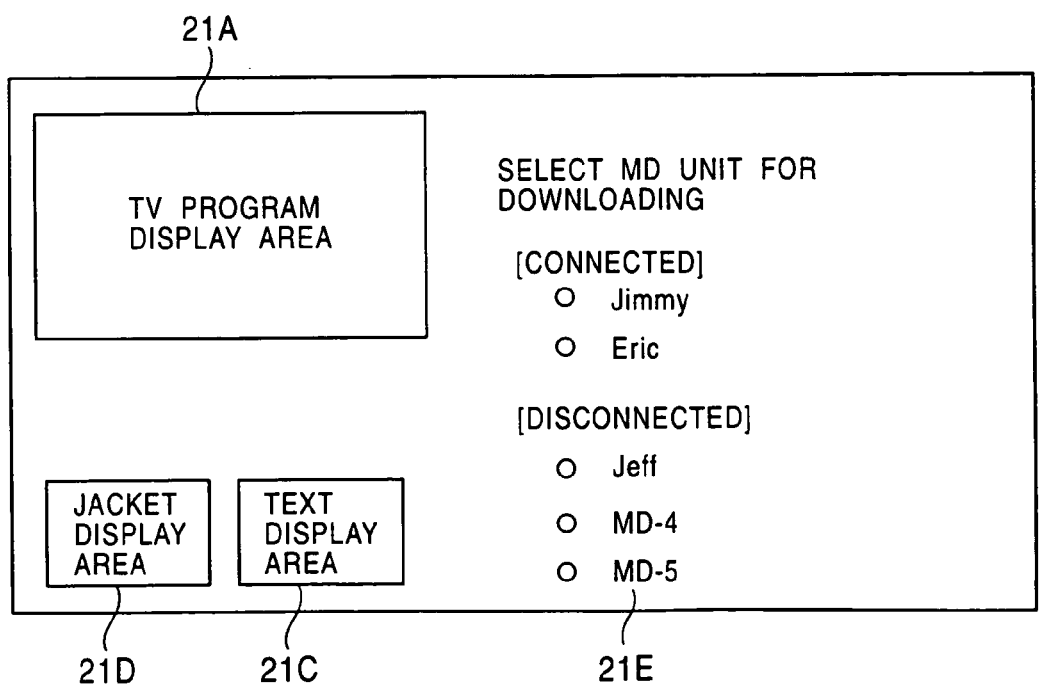
FIG. 29 is a view showing an examplary unit list in the present embodiment.

It is assumed that five units are connected with their default nicknames written in an ID table. For example, the units 13A to 13E shown in FIG. 29 are connected with their nicknames being set to MD-1, MD-2, VCR-1, DVD-1, and MD-3 in the ID table.

The user needs to specify in advance a unit to which downloading is performed, as described later. The IRD 12 displays the nicknames of connected units on the monitor unit 14 to ask the user to select one unit.

When the default nicknames of three MD recorders are written into an ID table, they are shown as MD-1, MD-2, and MD-3. In this case, the user is more likely to understand the relationship between the nicknames and the MD recorders than in a case in which just their model names are displayed. In some cases, the user does not like a default nickname or the user wants to set a discriminator nickname. Therefore, to make the three MD recorders 13A, 13B, and 13E discriminated, the user is allowed to assign any nicknames to them by an operation in the nickname input mode. A nickname assigned in the past can also be changed.

Figure 23:
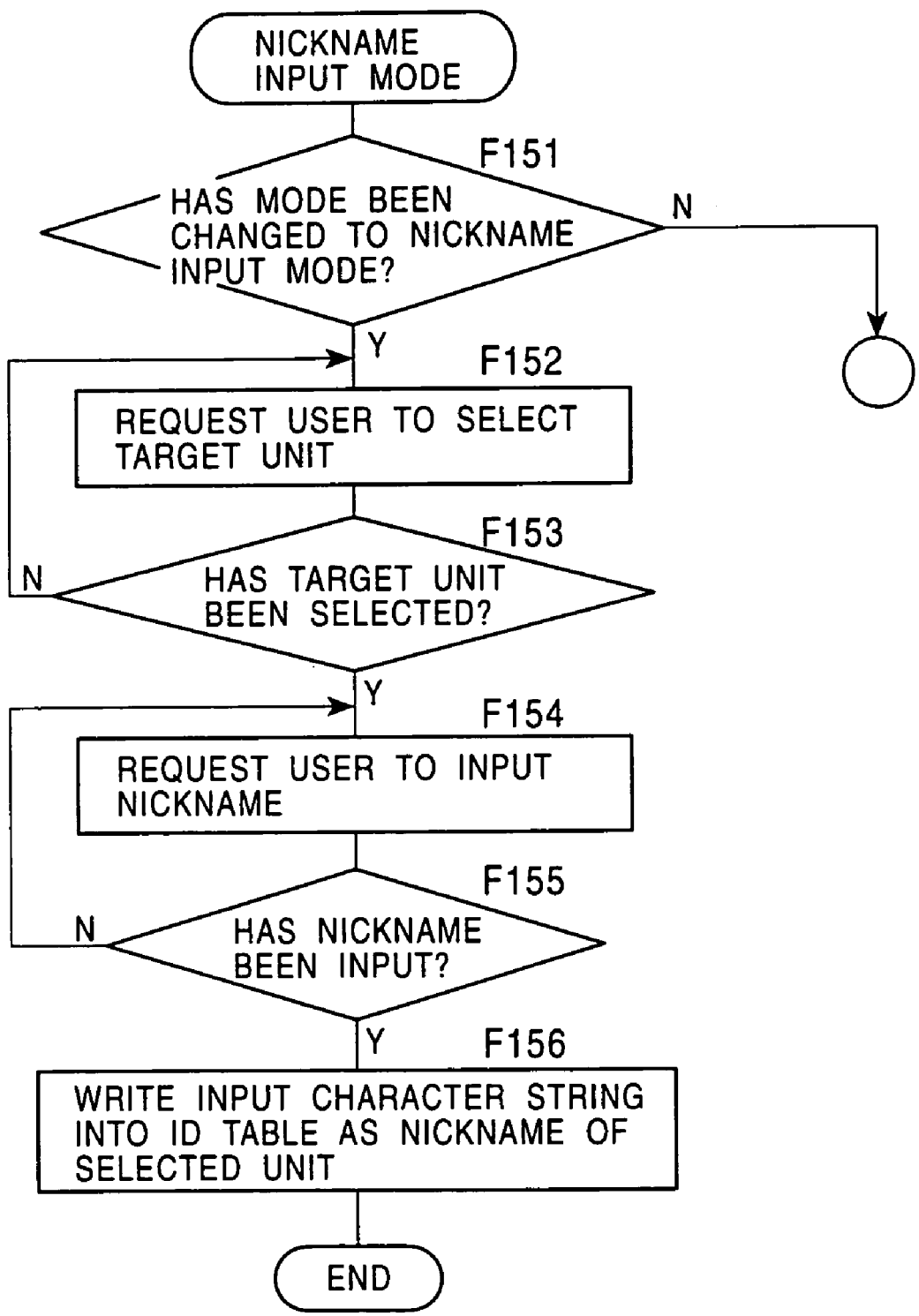
FIG. 23 is a flowchart of nickname-input-mode processing in the IRD in the present embodiment.

When the mode is changed to the nickname input mode, processing of the CPU 80 proceeds from a step F151 to a step F152 in FIG. 23. The user is requested to select a unit to which a nickname is assigned. For example, the nickname (default nickname or nickname registered in the past) and the type of each unit at that point are displayed on the monitor unit 14 to ask the user to select a unit.

When a unit is selected, the processing proceeds from a step F153 to a step F154. The user is requested on the monitor unit 14 to input a nickname.

The user inputs characters and numbers for the nickname in response to the request. When the input is determined, the processing proceeds from a step F155 to a step F156, and the ID table is updated. The nickname data of the selected unit is changed to the input characters and numbers. The nickname of the MD recorder 13, which has a unit number 1, is set, for example, to Jimmy as shown in FIG. 24. The user input needs to be performed by operations on the GUI screen and the remote commander 64.

With these operations, any nickname can be assigned to each unit as shown in FIG. 24. When the CPU 80 asks the user to select a unit for some reason, the CPU 80 shows the nicknames written into the ID table for selection. This makes a unit-selection operation more easy-to-understand for the user.

The connection status in the ID table shown in FIG. 24 indicates whether the unit is currently connected.

Therefore, when a connected unit is disconnected, the connection-status data is updated.

Figure 22:
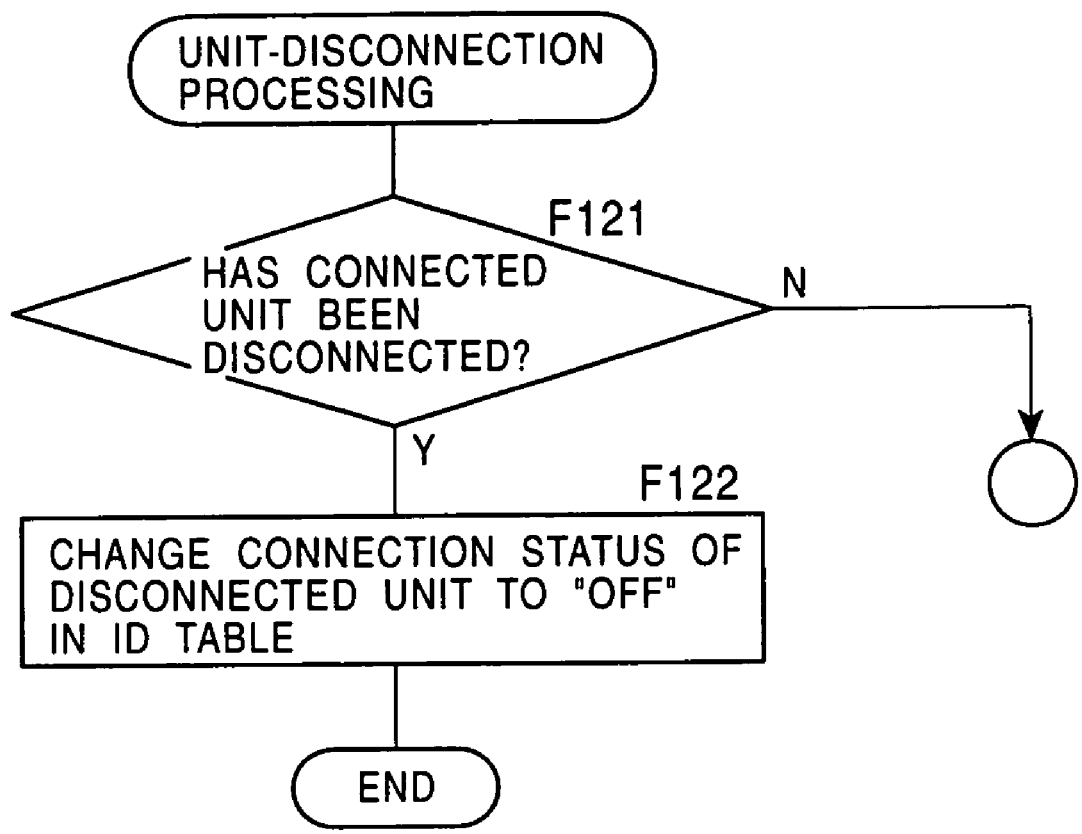
FIG. 22 is a flowchart of unit-disconnection processing in the IRD in the present embodiment.

As shown in FIG. 22, when a connected unit is disconnected from the IEEE-1394 bus 16, processing of the CPU 80 proceeds from a step F121 to a step F122. The connection-status data of the unit is updated to "off" in the ID table.

With these operations, the information of a connected unit is maintained and the IRD 12 easily understands the actual connection status.

A case in which a disconnected unit is again connected will be described below.

When a disconnected unit is connected, the processing shown in FIG. 21 is executed. In this case, when the ID table is searched in the step F104, the same ID as the received ID is found. Since information of the connected unit necessary for the ID table has been written into the ID table when it was connected before, the processing proceeds to a step F111. Only the connection-status data needs to be changed to "on."

In other words, when a connected-and-then-disconnected unit is again connected, information such as the unit type has already been stored, the information does not need to be written and the connection processing is simplified.

When the user assigned a nickname to the unit in the past, the stored nickname can also been handled as effective data (does not need to be written again).

Since the data of a unit is left in the ID table even after the unit is disconnected, when a unit (a portable MD recorder, for example) is repeatedly connected and disconnected, the data is used very effectively.

As described above, since the processing is executed when the storage unit 13 is connected (and disconnected), the IRD 12 can accurately understand the model and condition of the connected storage device 13 and can perform appropriate processing during downloading.

Since the user can assign a nickname to a connected unit, a unit-selection operation becomes easy-to-understand, and the user obtains a friendly impression.

The above processing is applied to a unit connected to the IEEE-1394 bus 16. It can be also applied to a case in which the MD recorder 13G is connected through another control line as shown in FIG. 20.

2–3. General Downloading Operation

A series of general operations executed when the IRD 12 has a storage device 13 perform downloading will be described below by referring to FIG. 25 and FIG. 26. Detailed processing in each procedure will be described later.

It is assumed that the MD recorder 13A or 13B, which conforms to IEEE 1394 and can receive ATRAC data, serves as the storage device 13 executing a downloading operation.

Figure 25:
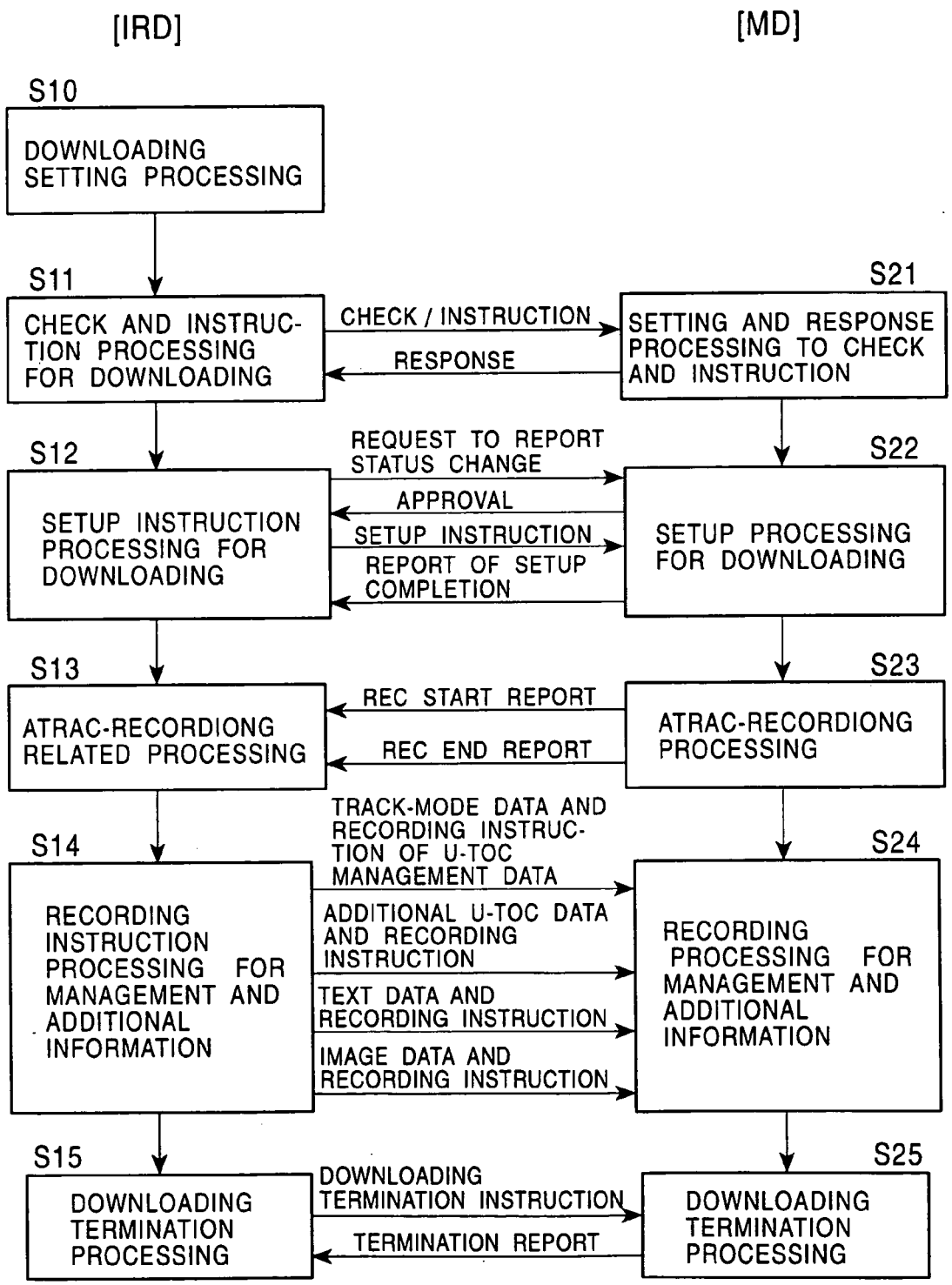
FIG. 25 is a view showing downloading processing procedures in the present embodiment.
Figure 26:
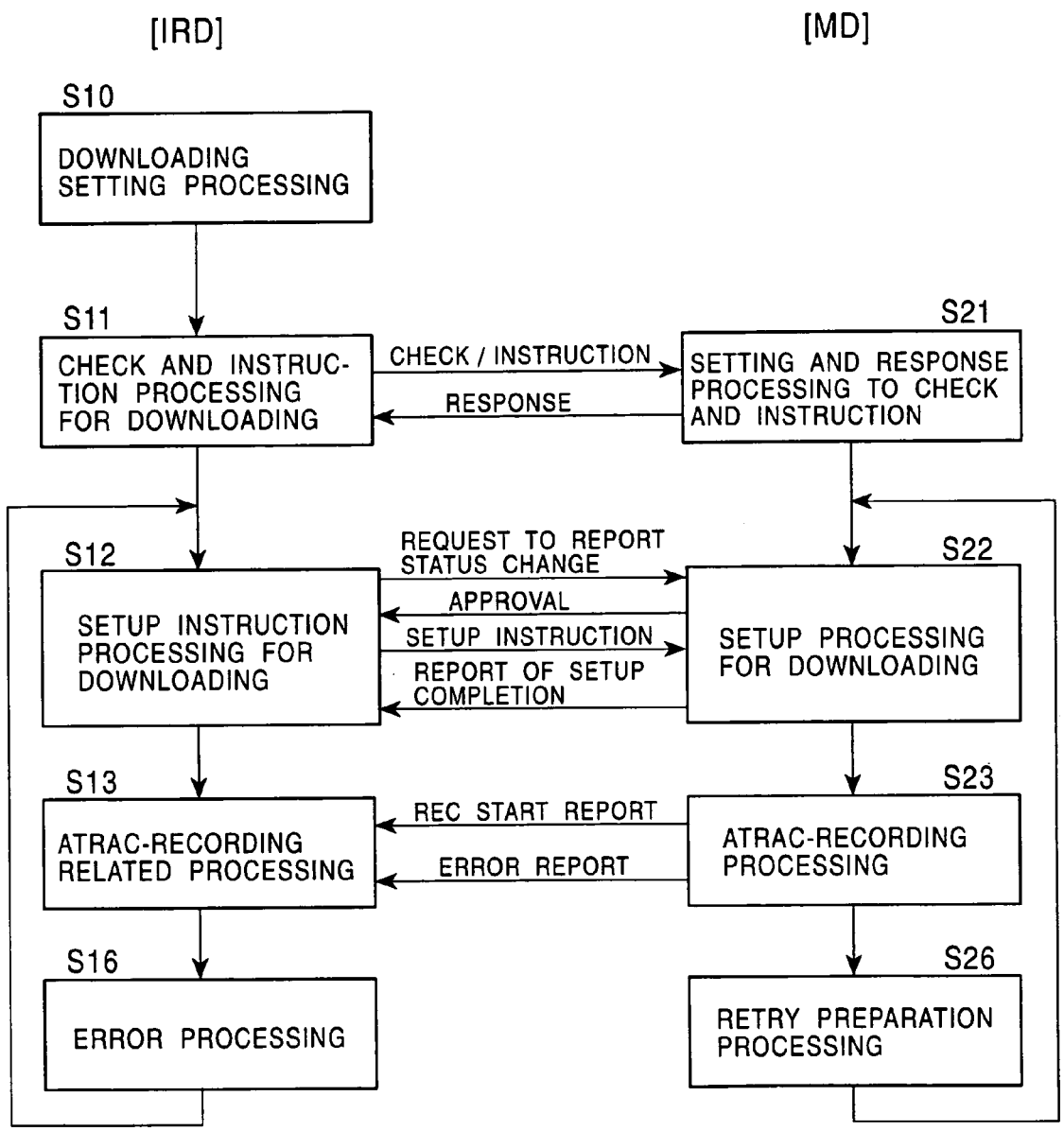
FIG. 26 is a view showing downloading processing procedures in the present embodiment.

Procedures S10 to S16 in FIG. 25 and FIG. 26 indicate what the IRD 12 executes in downloading, and procedures S21 to S26 indicate a procedure which the storage device 13 (MD recorder 13A) performs in downloading.

A general operation in each procedure will be described below.

The user needs to perform setting operations for the IRD 12 to download a musical piece. Downloading setting processing in a procedure S10 specifies a downloading operation which the user requests. The processing includes a selection of a storage device to which downloading is to be performed, and a selection of contents (musical piece) to be downloaded.

The IRD 12 performs check and instruction processing for downloading in a procedure S11. The processing instructs the selected storage device 13 to be ready to execute the downloading operation specified in the procedure S10 and checks whether the storage device is ready to perform the operation.

The IRD 12 sends a command to the storage device 13 for this checking and instruction processing to execute a predetermined operation or receives a required response.

The storage device 13 performs setting and response processing to the checking and instruction, in a procedure S21. In other words, the storage device 13 executes a setting operation according to the sent command or sends back a response.

When the IRD 12 confirms that a downloading operation is ready, the IRD 12 instructs a setup for downloading. Specifically, the IRD 12 first requests the storage device 13 to change the mode to a downloading mode.

As described later in detail, the setting up for downloading includes a request that, when the operation condition of the storage device 13 changes, the storage device 13 report the change to the IRD 12, and to ready the storage device 13 for an actual set-up condition.

In response to this instruction, the storage device 13 performs setup processing for downloading in procedure S22. For example, the storage device 13 is set to a state in which recording is awaited (a pause of recording at a position where recording is to be started for the disc 101, for example) and is set to a mode in which the storage device 13 reports its status change, if any, to the IRD 12.

In the downloading mode, the storage device 13 itself determines the start and end of ATRAC data.

The IRD 12 just outputs the ATRAC data of the selected musical piece to be downloaded through the IEEE-1394 interface 60. In other words, among the received data items shown in FIG. 6, the IRD 12 outputs the quadruple-speed ATRAC data of the target channel.

When the ATRAC data is input to the storage device 13, it detects a TS packet at the top of the ATRAC data and starts the actual recording operation (downloading).

During downloading, a TS packet at the end of the ATRAC data is monitored. If it is detected, recording is finished.

The storage device 13 performs ATRAC recording processing in procedure S23 in this way. The start and end of recording is based on monitoring of TS packets.

The IRD 12 recognizes the start of downloading when it receives a status change of the storage device 13 to a recording operation (REC start report).

The IRD 12 also recognizes the end of downloading the ATRAC data when it receives a status change of the storage device 13 to a stop status (REC end report).

During downloading, a downloading progress condition is displayed although not shown, and data is required. This processing is included in a procedure S13 (ATRAC-recording related processing).

When the IRD 12 recognizes the end of downloading the ATRAC data by receiving a REC end report, it performs recording instruction processing for management and additional information in a procedure S14. The IRD 12 requests the storage device 13 to record management information and additional information, and provides necessary data. Specifically, the IRD 12 requests U-TOC data, AUX-TOC data, and AUX data to be recorded and sends necessary data to the MD recorder 13A.

In response to this processing, the storage device 13 records management information and additional information in a procedure S24 according to the instruction.

When management information and additional information have been recorded, a series of downloading operations is finished. The IRD 12 instructs downloading termination in a procedure S15, and the storage device 13 changes the mode out of the downloading mode in response to the instruction.

The usual downloading procedure has been described. During downloading, namely, when the storage device 13 is performing the procedure S23, the storage device 13 may detect an error in the ATRAC data being recorded. Some error may occur in the storage device 13, and thereby a recording operation is not successfully performed.

If such an error occurs, it is not appropriate that downloading continues with the error being ignored. Especially when the user downloads a musical piece at some charge (namely, a musical piece is sold), it is necessary to take an appropriate action if an error occurs.

As shown in FIG. 26, if an error occurs, the storage device 13 reports the error to the IRD 12 in a procedure S23.

Then, the IRD 12 performs error processing in a procedure S16. In this processing, whether a retry is possible is determined, if possible, a retry is performed, and if not possible, the downloading operation is stopped.

At the same time, the storage device 13 performs retry preparation processing in a procedure S26.

If a retry is possible, the IRD 12 and the storage device 13 go back to the procedures S12 and S22, respectively, and a retry operation of downloading is executed.

A series of downloading operations is executed as shown in FIG. 25 and FIG. 26 while necessary communication is performed between the IRD 12 and the storage device 13.

Detailed contents of the processing to be performed in each procedure will be described below. In communication used in the following processing, AV/C commands in the IEEE-1394 method, for example, may be used. Commands newly set for communication in the present embodiment are also required. They include a downloading setup command, a command for specifying transition to the downloading mode, and a command for specifying the end of downloading.

The following processing is just an example, and various processing methods can of course be considered.

2-4. Downloading Setting Processing

The downloading setting processing in the procedure S10 will be described below by referring to FIG. 27.

The user first performs a setting operation for the IRD 12 to download a musical piece. In that case, a screen such as that shown in FIG. 4(b) is displayed.

Two types of downloading are possible: downloading immediately after setting and reserved recording in which downloading is performed afterwards. In either case, a setting processing is generally the same.

When the user performs some operation to start setting, the setting processing proceeds from a step F201 to a step F202 by the CPU 80, and this downloading setting processing is started. Some operation may be, for example, an operation of pressing the downloading button 28 or the recording reservation button 25 shown in FIG. 4(b). Alternatively, a special setting button is provided for the GUI screen and it may be pressed.

In the step F202, the CPU 80 lists units for which downloading is allowed among connected IEEE-1394 units.

The units for which downloading is allowed are limited to MD recorders in the present embodiment.

The list is made with the use of the ID table shown in FIG. 24. In other words, units for which downloading is allowed are selected from the ID table. Various selection conditions can be considered. When units for which downloading is allowed are limited to MD recorders as in the present embodiment, for example, a selection condition is "MD recorder." Then, the MD recorder 13A (Jimmy), the MD recorder 13B (Eric), and the MD recorder 13E (Jeff) shown in FIG. 20 are listed.

In the following step F203, when units are connected through a control line, not through the IEEE-1394 bus, a unit for which downloading is allowed is also listed among them. In this case, if an ID table like that shown in FIG. 24 is created for units connected through the control line, the table is used. If the ID table is not yet created, the connected units are requested to send back their unit types (detailed types) and then the list is made. In the present embodiment, the MD recorder 13G shown in FIG. 20 is listed.

In the following step F204, units which can be controlled by the IRD 12 with infrared commands and for which downloading is allowed are listed. In this case, because the CPU 80 cannot determine connected units, the user is, for example, requested to input data. Alternatively, the user is requested in advance to input units which can be controlled by infrared rays and the CPU 80 lists the units satisfying the above conditions from the input data.

Figure 28:
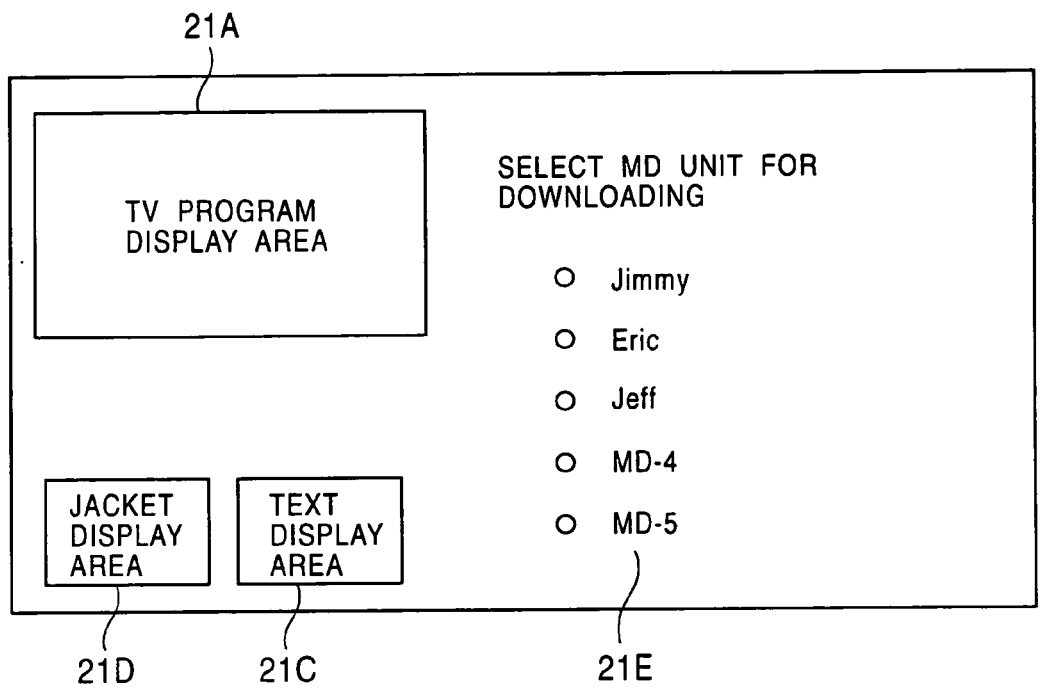
FIG. 28 is a view showing an examplary unit list in the present embodiment.

At least with the list generated in the step F202, or with the lists created in the steps F203 and F204 as required, the units for which downloading is allowed, such as all MD recorders, are listed. In a step F205, the listed units (MD recorders) are displayed on the monitor unit 14, and the user is prompted to select a unit for which downloading is to be executed. A unit list 21E is displayed as shown in FIG. 28, for example, to prompt the user to select a unit.

Since nicknames are used for indicating units in the list, the user easily understands the units to select one. In addition to the nicknames, actual model names and model numbers may be also displayed at the same time.

The listing processing up to the step F204 and the display form of the unit list 21E can be implemented in various ways.

Assuming that units for which downloading is allowed are MD recorders, only MD recorders which are actually connected in that point of time may be listed. Specifically, units having a detailed type of "MD" and a connection status of "on" are extracted from the ID table shown in FIG. 24.

Only units which allow ATRAC inputs may be listed.

The steps F203 and F204 may be omitted in a case in which only IEEE-1394-connected units are listed.

Although depending on a listing condition, connected units and unconnected units may be separately displayed in the unit list 21E as shown in FIG. 29. In FIG. 29, the MD recorder 13E (Jeff), the MD recorder 13F (MD-4), and the MD recorder 13G (MD-5) are unconnected at that point of time.

Figure 30:
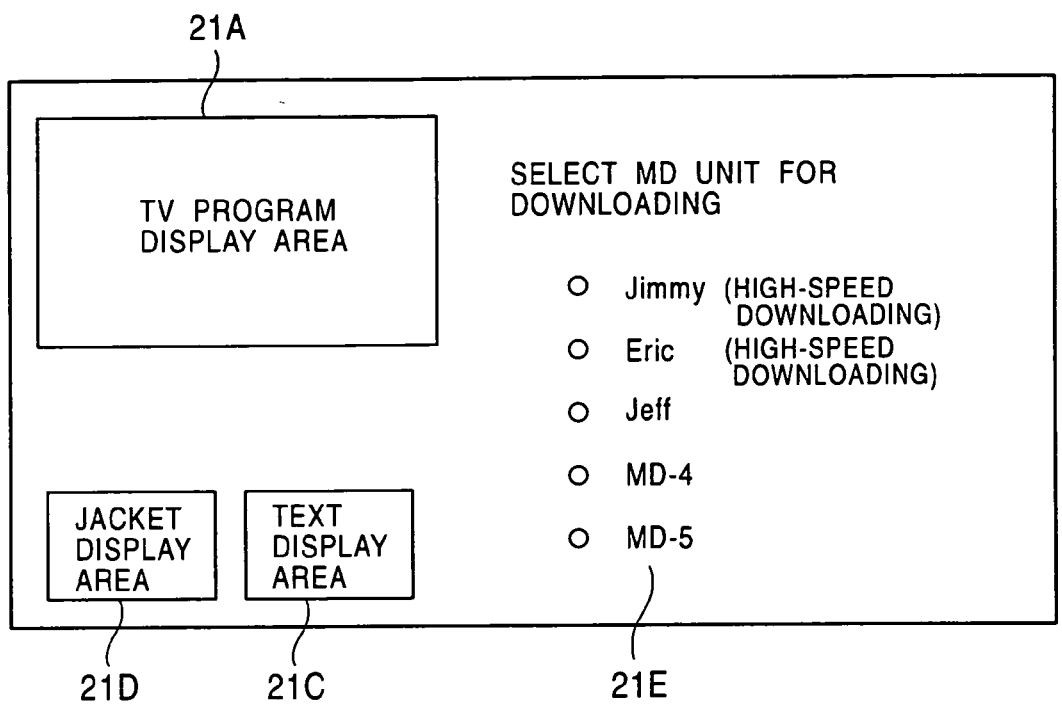
FIG. 30 is a view showing an examplary unit list in the present embodiment.

FIG. 30 shows a case in which a listing condition does not include ATRAC-input availability but whether each unit can handle an ATRAC input is indicated as an operation difference to the user.

More specifically, when a unit can handle an ATRAC input, since quadruple-speed ATRAC data is input through the IEEE-1394 interface, the period required for downloading becomes shorter than that for usual real-time recording. Therefore, since, for the user, the required downloading time depends on whether each unit can handle an ATRAC input, a unit which can handle an ATRAC input is, for example, displayed with a sign of high-speed downloading as shown in the figure.

Figure 31:
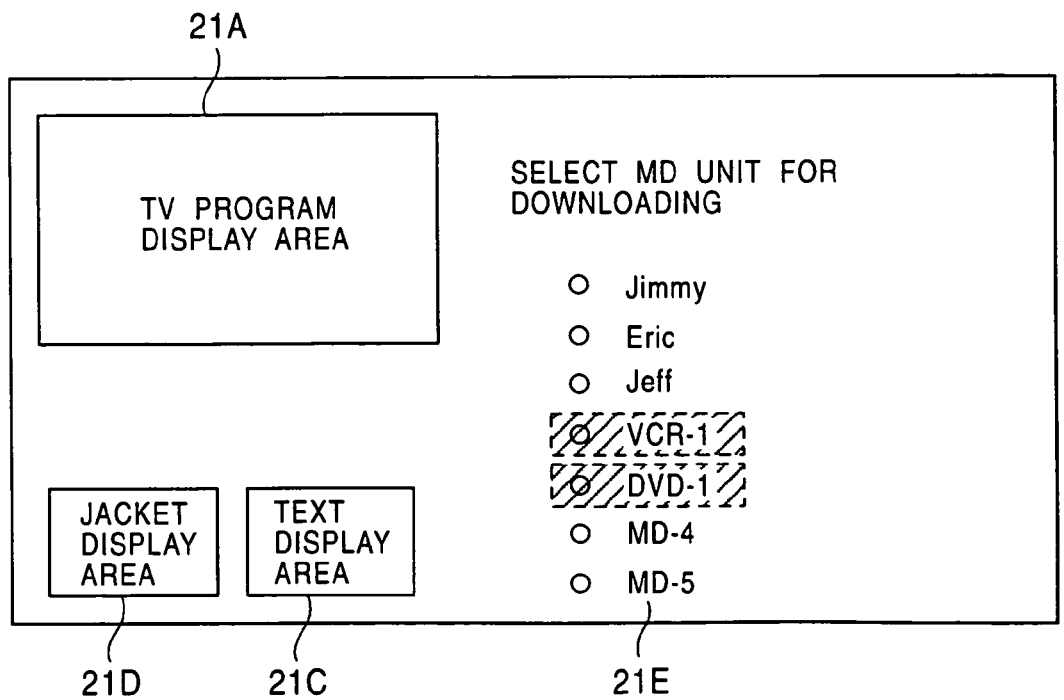
FIG. 31 is a view showing an examplary unit list in the present embodiment.

FIG. 31 illustrates a case in which the unit list 21E shows all connected units. When only listed MD recorders can be selected, other types of devices such as VCR-1 and DVD-1 are shown in an inactive state for which a selection cannot be made.

Many other ways of listing and display forms can be considered. A method suited to a user operation for selecting units needs to be employed.

For the displayed unit list 21E, the user moves the cursor to a unit for which downloading is to be executed and executes a decision operation.

The processing proceeds from a step F206 to a step F207, and the CPU 80 determines the selected unit as a unit for which downloading is to be performed.

In the following step F208, contents which can be downloaded are listed and the user is requested to select the desired contents. For example, as shown in FIG. 4(b), musical pieces which can be downloaded at that point of time are displayed.

When the user is specifying a setting for recording reservation, musical pieces which can be downloaded at the time of recording are displayed according to user operations.

As described with FIG. 4, the user may perform a downloading operation after the user selects a musical piece and test-listens to it. In this case, since the contents to be downloaded has already been determined, the processes in the steps F208 and F209 are unnecessary.

When the user selects the contents, the processing proceeds from the step F209 to a step F210. The selected contents are determined to be downloaded.

When the user performs an execution operation (such as pressing the downloading button 28 or the recording reservation button 25), the processing proceeds from a step F211 to the procedure S11.

Figure 27:
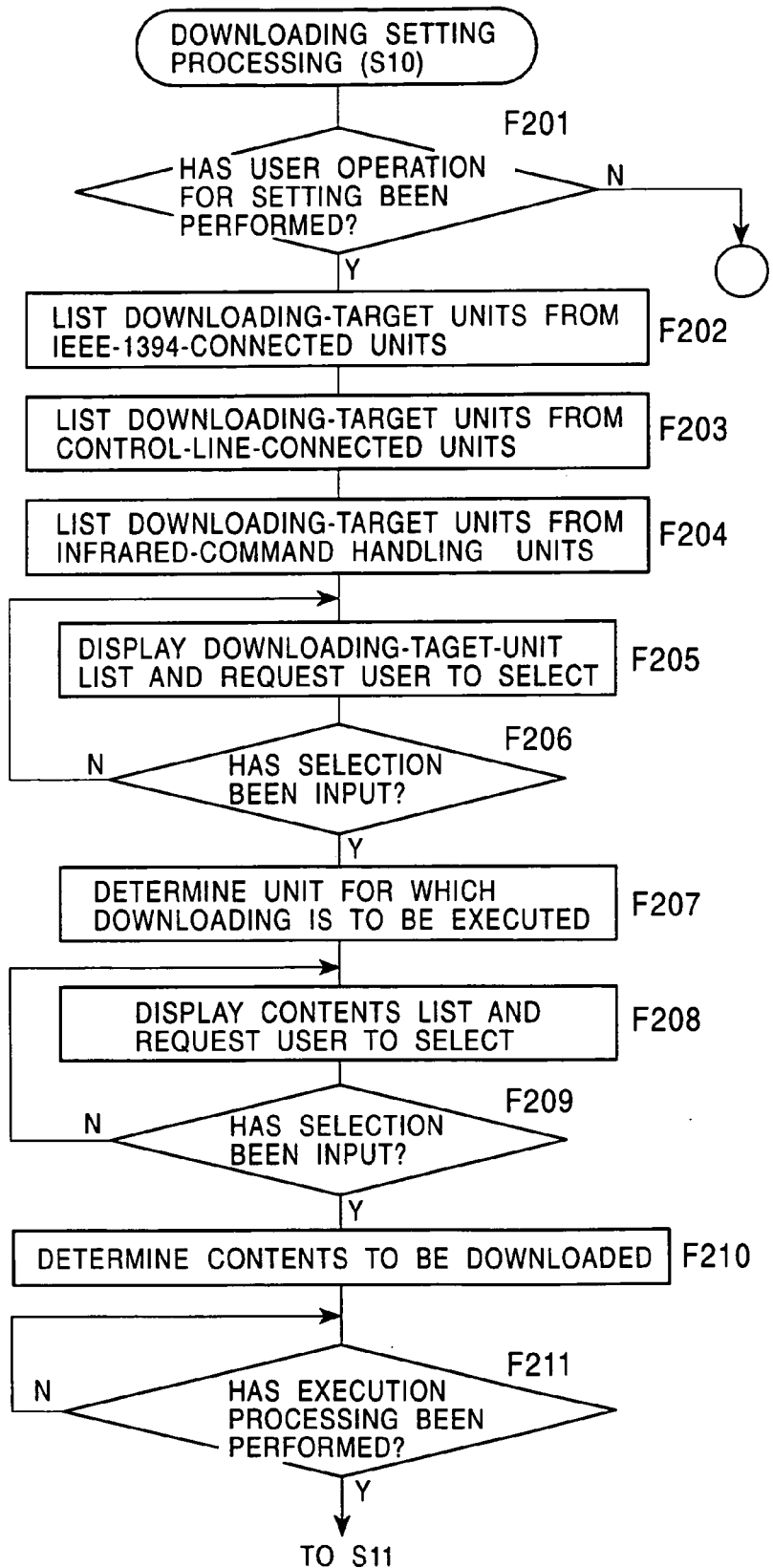
FIG. 27 is a flowchart of downloading setting processing in the present embodiment.

The setting processing in the procedure S10, namely, the selections of the unit for which downloading is to be executed and the contents to be downloaded, has been finished as shown in FIG. 27. The following descriptions continue assuming that the MD recording 13A is selected as a unit for which downloading is to be executed.

2–5. Check Processing Before Downloading

FIG. 32 to FIG. 35 show check and instruction processing for downloading to be performed by the IRD 12 in the procedure S11.

The IRD 12 checks whether the MD recorder 13A, which has been selected in the procedure S10, is ready to perform a downloading operation.

Figure 32:
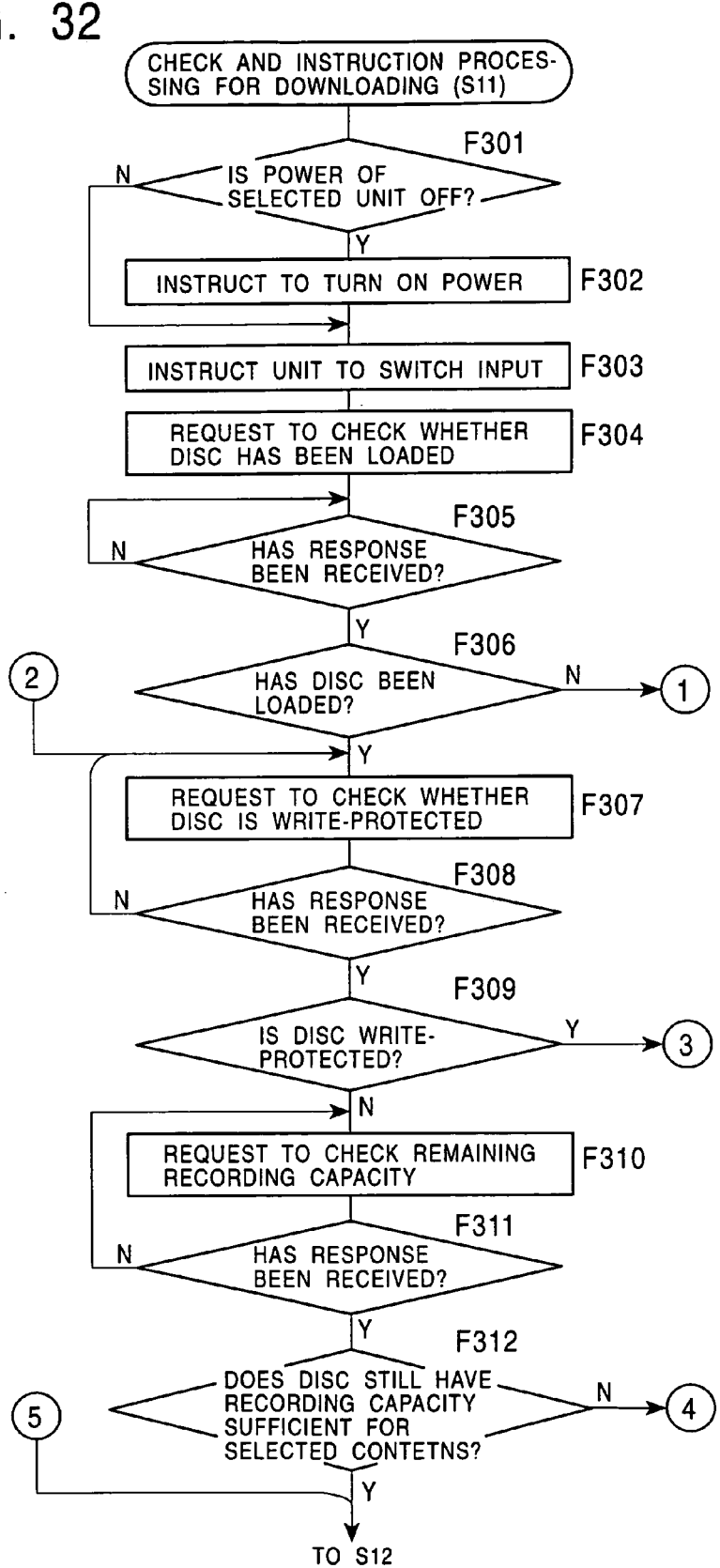
FIG. 32 is a flowchart of check and instruction processing for downloading in the present embodiment.

In a step F301 shown in FIG. 32, whether the power of the selected unit, namely, the MD recorder 13A, is off is checked.

When the power is off, the processing proceeds to a step F302. A command for turning the power on is sent to the MD recorder 13A. In response to this command, the system controller 111 of the MD recorder 13A turns the power on.

When the power is on, the processing proceeds from the step F301 to a step F303.

In the step F303, a command for switching the input is sent to the MD recorder 13A (system controller 111). As shown in FIG. 17, the MD recorder 13A is provided with a plurality of audio input systems. To download ATRAC data, the MD recorder 13A is requested to switch the input system such that ATRAC data is input through the IEEE-1394 interface 125.

In the subsequent steps from a step F304, a medium itself (disc 101) for which data is downloaded and recorded is checked.

In the step F304, a command for asking the MD recorder 13A if the disc 101 has been loaded is issued.

The system controller 111 checks a disc loading status, and sends back information indicating whether the disc 101 has been loaded. When the CPU 80 receives the information, the processing proceeds from the step F305 to a step F306. The contents of the response is determined. When it is found that the disc has been loaded, the processing proceeds to a step F307. If it is found that the disc has not yet been loaded, the processing proceeds to a step F321 as indicated by a connector 1. The display processing section 58 displays a message and a request to perform a necessary operation to the user on the monitor unit 14.

On the monitor unit 14, a message such as "Disc is not in Jimmy MD recorder. Insert disc." is displayed. In a step F322, a variable "n" is set to 1 and the processing enters a loop consisting of steps from F323 to F327.

A command for asking the MD recorder 13A whether the disc 101 has been loaded is issued in the step F323. A response is awaited in a step F324, and the contents of the response is determined in a step F325.

Such a process is repeated with the variable "n" being incremented in the step F327 until it is determined in a step F326 that the variable "n" exceeds a setting M1.

When the user reads the message displayed in the step F321, the user loads the disc 101 into the MD recorder 13A. After the disc has been loaded, information indicating that the disc has been loaded is received from the system controller in the step F324. In this case, since it is confirmed that the disc 101 has been loaded, the processing proceeds from the step F325 to a step F307, which is the next check process, shown in FIG. 32 as shown by a connector 2.

Figure 33:
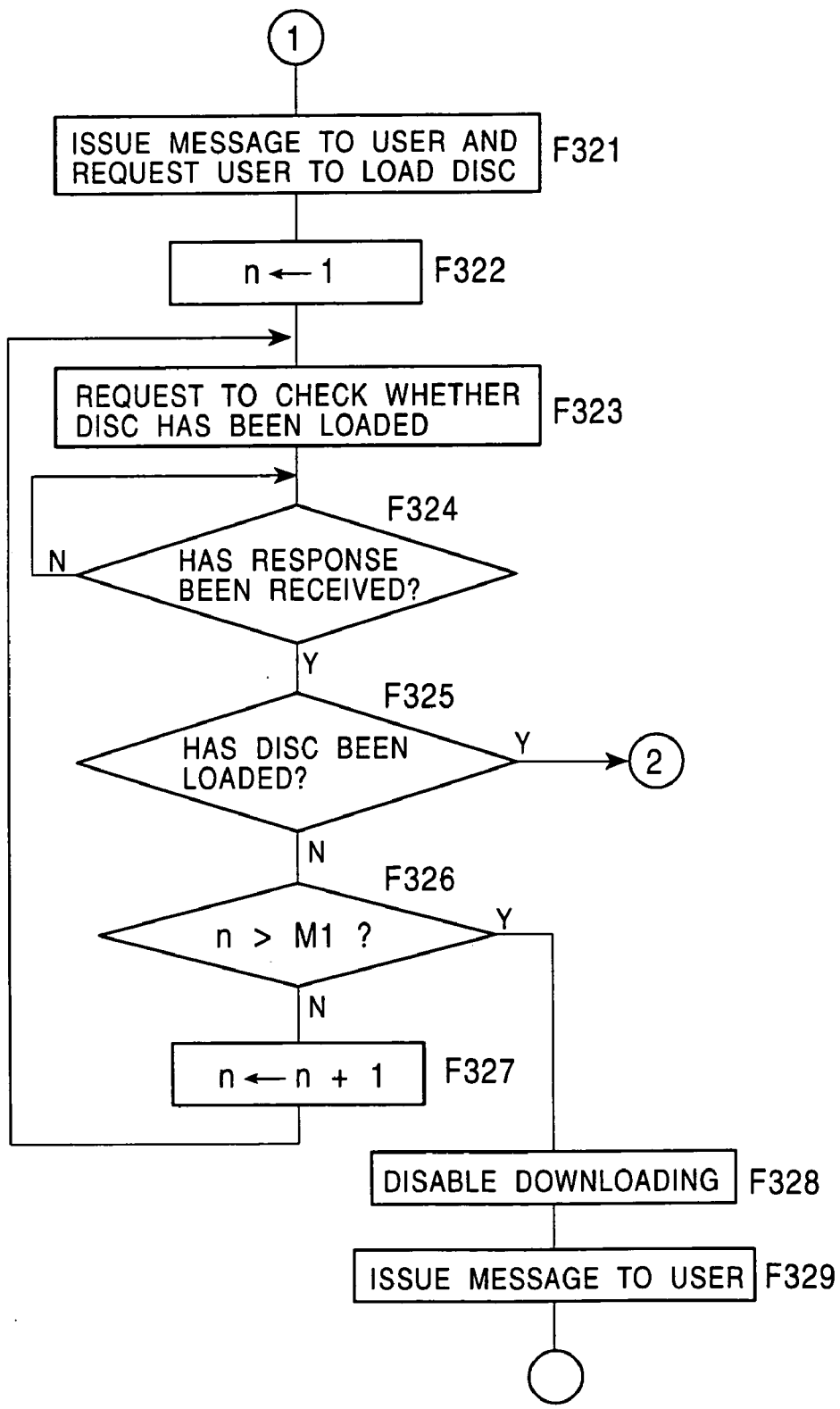
FIG. 33 is a flowchart of disc-loading check processing in the present embodiment.

If the user is not there, or if the user does not take any action, such as loading the disc 101, an affirmative result is obtained in the step F326 shown in FIG. 33 at a certain point of time. The CPU 80 regards this result as a timeout and disables downloading in a step F328. The execution of the downloading operation specified in the procedure S10 is halted or cancelled.

In a step F329, a message to the user is displayed on the monitor unit 14 to report that the downloading operation has been disabled because a disc was not loaded.

When the disc has been loaded, the processing proceeds to the step F307 shown in FIG. 32. The CPU checks whether the loaded disc 101 is write-protected. This is performed by checking whether a write-protection slide lever on the Mini Disc cartridge is positioned at a protection side.

In the step F307, the CPU 80 issues a command for asking the MD recorder 13A about a protection status of the disc 101 to the MD recorder 13A.

Then, the system controller 111 checks the protection status of the disc 101 and sends back protection-status information. When the CPU 80 has received the information, the processing proceeds from a step F308 to a step F309. When the response shows "unprotected (recording allowed)," the processing proceeds to a step F310.

When the response shows "protected," the processing proceeds to a step F341 through a connector 3. The display processing section 58 displays a message and a request to take a necessary action on the monitor unit 14 for the user.

On the monitor unit 14, a message such as "Disc is write-protected. Release protection." is displayed.

In a step F342, a variable "n" is set to 1 and the processing enters a loop consisting of steps F343 to F347.

To release write protection, the user needs to unload the disc 101, move the slide lever on the cartridge to a write-enable position, and load it again, or to load another disc which is not write-protected. In either case, the user first needs to eject the disc 101 currently loaded.

To check whether the user takes an appropriate action, a command for asking the MD recorder 13A whether the disc 101 has been loaded is issued in the step F343. A response is awaited in a step F344, and the contents of the response is determined in a step F345.

The process is repeatedly performed with the variable "n" being incremented in the step F347 until it is determined in a step F346 that the variable "n" exceeds a setting M2.

When the user reads the message displayed in the step F341, the user first unloads the disc 101 from the MD recorder 13A. At this point of time, it is found in the step F345 that the disc has been discharged.

Since the disc 101 is not loaded, the processing proceeds to the step F321 shown in FIG. 33.

When it is confirmed that the disc has been loaded, the processing proceeds again to the step F307 shown in FIG. 32 and the write-protection status is checked.

Figure 34:
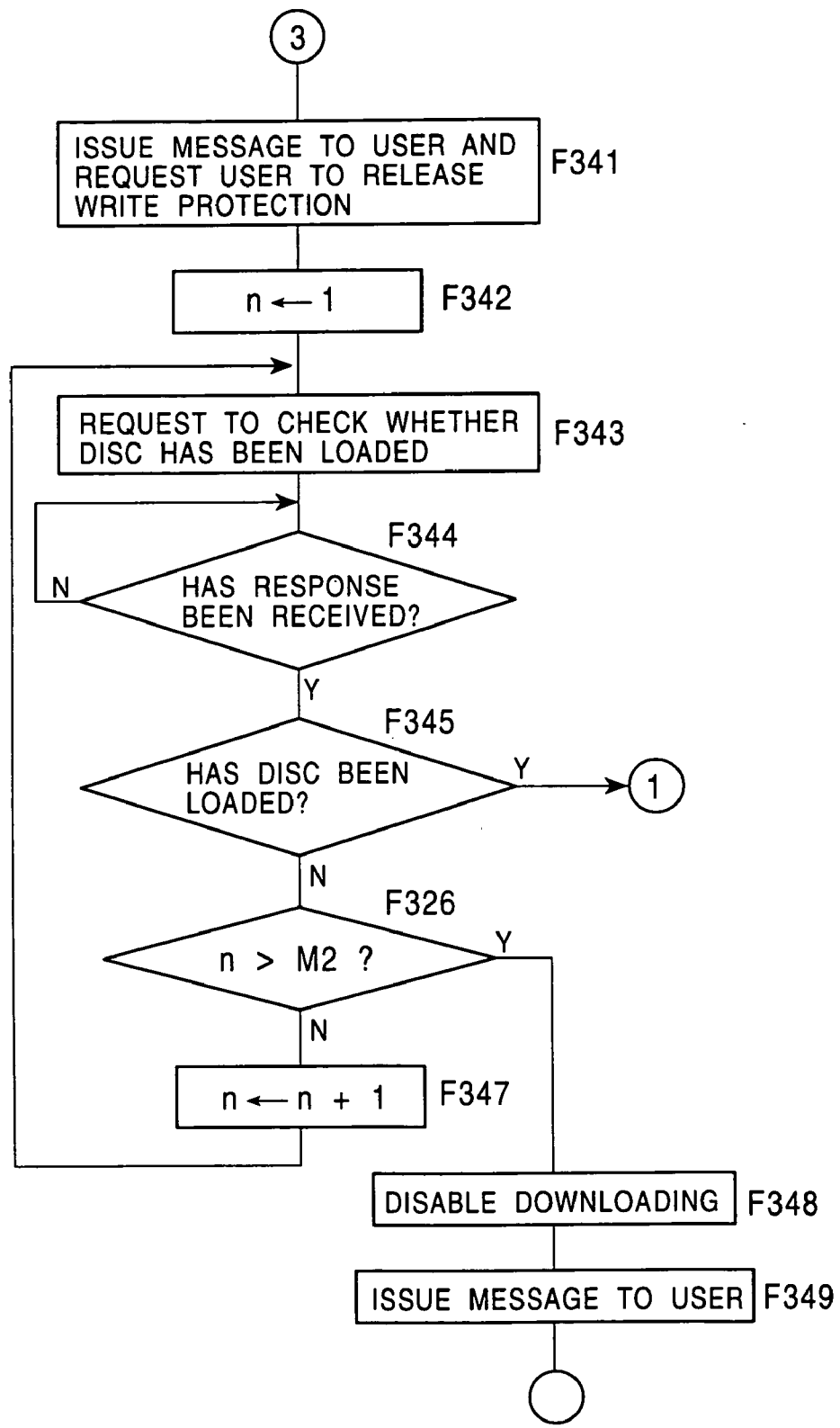
FIG. 34 is a flowchart of write-protection check processing in the present embodiment.
Figure 35:
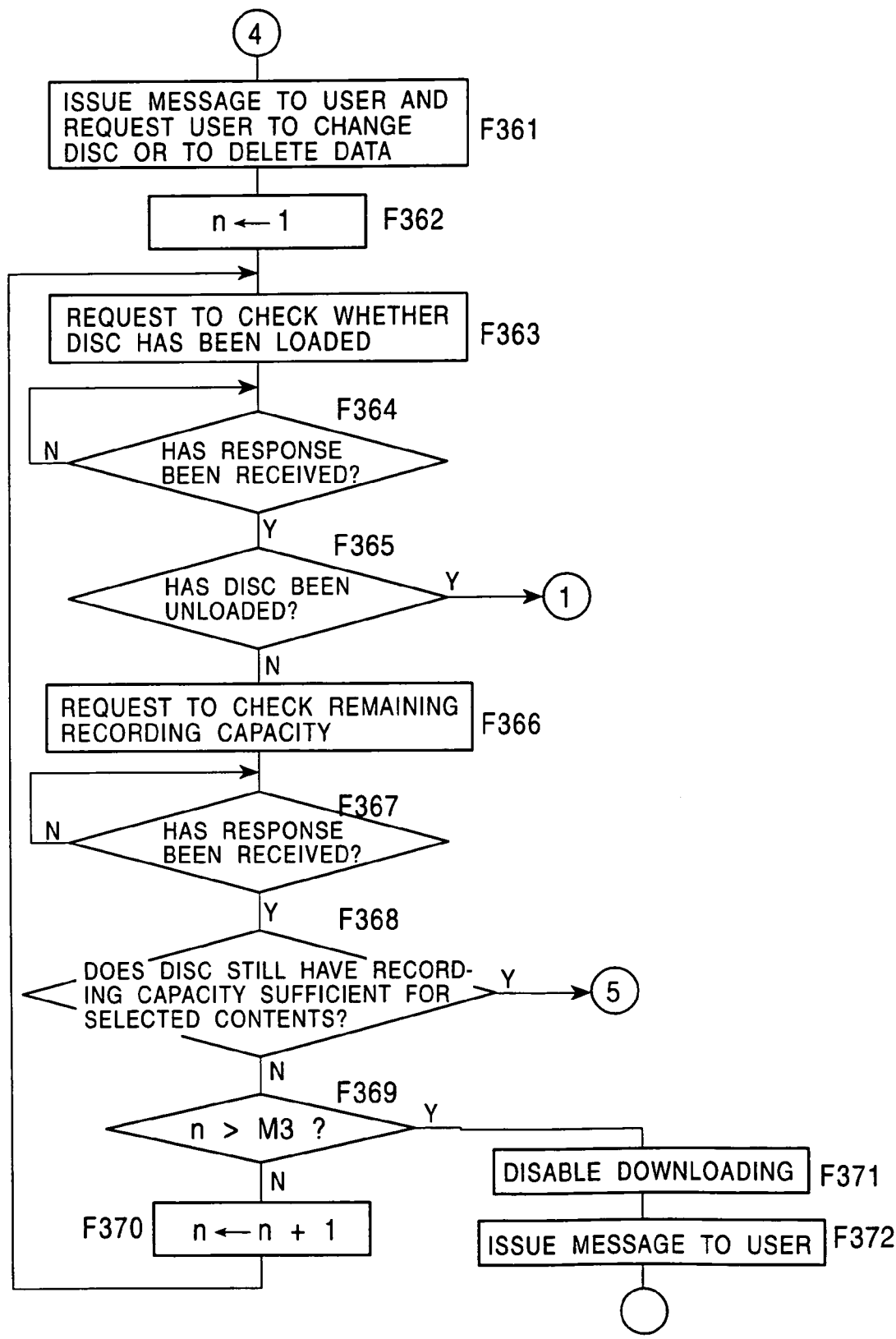
FIG. 35 is a flowchart of disc-capacity check processing in the present embodiment.

If the user does not take any action (does not eject the disc) in the processes shown in FIG. 34, an affirmative result is obtained in the step F346 at a certain point of time. The CPU 80 regards this result as a timeout and disables downloading in a step F348. The execution of the downloading operation specified in the procedure S10 is halted or cancelled.

In a step F349, a message to the user is displayed on the monitor unit 14 to report that the downloading operation has been disabled because the disc was write-protected.

After the user unloads the disc, if the user does not load it again when a predetermined time elapses, the processing proceeds to the steps F328 and F329 and the downloading operation is stopped.

When it is determined that the disc 101 is not write-protected, the recording capacity of the disc 101 is checked in a step F310 shown in FIG. 32. Whether the disc 101 still has a recording capacity sufficient for recording the contents to be downloaded is checked.

Therefore, a command for asking the MD recorder about the remaining capacity of the disc 101 is issued in the step F310.

Then, the system controller 111 checks the remaining recording capacity from the U-TOC data in the disc 101, and sends back the information. When the CPU 80 receives the information, the processing proceeds from a step F311 to a step F312. The capacity required for recording the contents selected in the procedure S10 is compared with the received remaining capacity to determine whether the disc still has a capacity sufficient for downloading the contents.

When the disc still has a sufficient capacity, the checking processing in the procedure S11 is finished.

Figure 36:
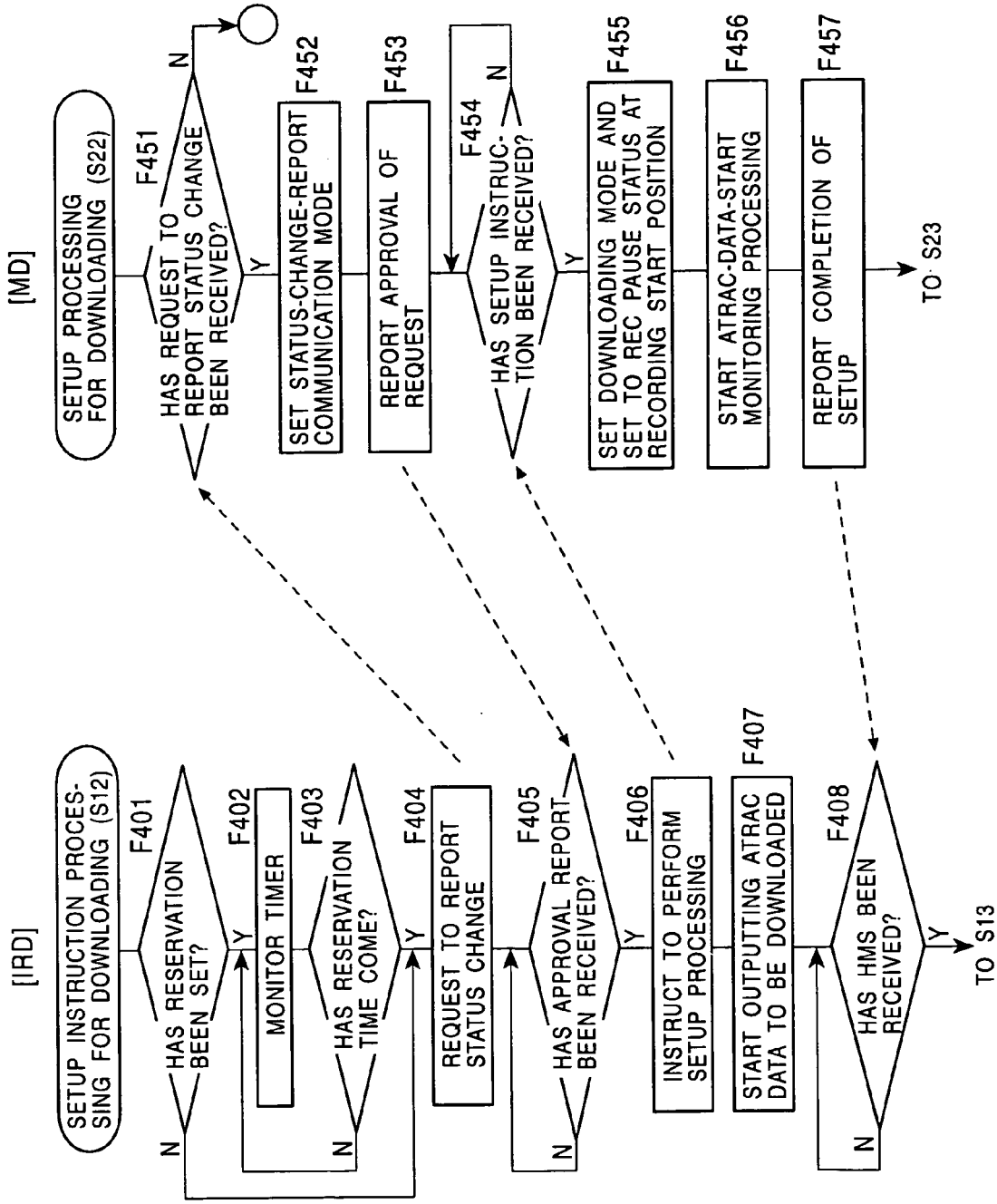
FIG. 36 is a flowchart of setup processing for downloading in the present embodiment.

When it is determined that a sufficient capacity does not remain, the processing proceeds to a step F361 shown in FIG. 36 through a connector 4. The display processing section 58 displays a message and a request to take a necessary action on the monitor unit 14 for the user.

On the monitor unit 14, a message such as "Disc does not have sufficient capacity. Change disc or delete unnecessary track." is displayed.

In a step F362, the variable "n" is set to 1 and the processing enters a loop consisting of steps F363 to F370.

In this situation, the user needs to change the disc or to delete an unnecessary track in an editing process by operations at the MD recorder 13A.

Assuming that the user changes the disc, a command for asking the MD recorder 13A whether the disc 101 has been loaded is issued in the step F363. A response is awaited in a step F364, and the contents of the response is determined in a step F365.

When the user actually changes the disc, the user first unloads the disc 101 from the MD recorder 13A. At this point of time, it is found in the step F365 that the disc has been discharged.

Since the disc 101 is not loaded, the processing proceeds to the step F321 shown in FIG. 33.

When it is confirmed that the disc has been loaded, the processing proceeds again to the step F307 shown in FIG. 32 and the checking processing is again started from checking of the write-protection status.

Since the user may delete a track, a command for asking the MD recorder 13A about the remaining recording capacity of the disc 101 is issued in a step F366. A response is awaited in a step F367, and the same determination (determination of whether the disc still has a capacity sufficient for downloading the contents) as in the step F312 is performed in a step F368.

While the user performs editing operations at the MD recorder 13A to delete a track, it is determined in the step F368 that a sufficient capacity is obtained at a certain point of time. Then, the processing goes back through a connector 5 (shown in FIG. 32) and the checking processing in the procedure S11 is finished.

The processes from the step F363 to the step F370 are repeatedly performed with the variable "n" being incremented in the step F370 until it is determined in a step F369 that the variable "n" exceeds a setting M3.

If the user does not take any action (does not change the disc or delete a track), an affirmative result is obtained in the step F369 at a certain point of time. The CPU 80 regards this result as a timeout and disables downloading in a step F371. The execution of the downloading operation specified in the procedure S10 is halted or cancelled.

In a step F372, a message to the user is displayed on the monitor unit 14 to report that the downloading operation has been disabled because the disc had a insufficient capacity.

After the user unloads the disc for replacement, if the user does not load a disc when a predetermined time elapses, the processing proceeds to the steps F328 and F329 shown in FIG. 33 and the downloading operation is stopped.

With the processing shown in FIG. 32 to FIG. 35, it is checked whether downloading is positively to be executed. Therefore, downloading is prevented from failing even if the user forgets to load a disc, the disc is write-protected, or the remaining capacity is insufficient.

When the user cannot take a necessary action for some reason or because the user is not there, for example, downloading is not performed.

With these types of checking, since a case in which downloading positively fails is determined before the downloading, the downloading is prevented from starting. This is a greatly appropriate processing because the user cannot stop the downloading. In addition, since downloading always imposes a charge on the user, it is very important to prevent downloading which positively fails from starting.

When an affirmative reply is not obtained in any of these types of checking, the user is required to take a necessary action. Required control may be performed automatically.

When the MD recorder 13A is provided with a disc changer system, for example, the IRD 12 may instruct the system to automatically load or change the disc.

When the disc 101 has an insufficient remaining recording capacity, the IRD 12 may instruct the MD recorder 13A to automatically delete a track. In this case, it is appropriate that a message is displayed on the monitor unit 14 to ask the user whether the track is deleted.

In addition to the various types of checking described above, whether the MD recorder 13A is in another operation status may be checked.

When the MD recorder 13A is performing a recording operation or a reproduction operation, for example, it is necessary to determine whether downloading takes priority over the current operation.

The IRD 12 checks the operation status of the MD recorder 13A and asks the user whether downloading takes priority over another operation when the MD recorder 13A is performing a recording or reproduction operation.

The procedure S21 to be performed by the system controller 111 of the MD recorder 13A will not be described in detail. The system controller 111 performs control processing and communication processing corresponding to commands in the processing of the CPU 80 shown in FIG. 32 to FIG. 35.

2-6. Setting Up for Downloading

Setup instruction processing for downloading to be performed by the CPU 80 of the IRD 12 in the procedure S12 and setup processing for downloading to be performed by the system controller 111 of the MD recorder 13A in the procedure S22 will be described below by referring to FIG. 36.

When the procedure S11 is completed, the processing proceeds to a step F401 shown in FIG. 36. When the downloading button 28 (shown in FIG. 4) is pressed as an execution operation in the step F211 in the downloading setting processing shown in FIG. 27, for example, downloading is immediately executed. On the other hand, when the recording reservation button 25 is pressed as an execution operation in the step F211, downloading is executed when the time of the reserved broadcast arrives.

Therefore, when a reservation has been made, the processing proceeds from the step F401 to a step F402 in FIG. 36, the current time is monitored by using the timer 69. When the reservation time (the time when the reserved contents (musical piece) is to be broadcasted) arrives, the processing proceeds from a step F403 to a step F404. Setup processing for downloading is started.

When a reservation has not been made, the processing proceeds from the step F401 to the step F404.

A setup instruction is issued to the MD recorder 13A to actually execute downloading from the step F404.

In the step F404, the CPU 80 requests the MD recorder 13A to report a status change.

This request asks the system controller 111 of the MD recorder 13A to report a status change every time the MD recorder 13A has any status change (such as a change from a recording pause to a recording state) in the downloading mode.

Receiving such a request to report a status change, the processing proceeds from a step F451 to a step F452 at the system controller 111. The system controller is set to a communication mode so that a status change is reported in the downloading mode. After this setting, the system controller reports to the CPU 80 that the system controller approved a status-change-report request.

When the CPU 80 has received the approval report in a step F405, the CPU 80 instructs the system controller 111 to perform setup processing for downloading in the following step F406.

This setup instruction asks the system controller 111 that the system controller 111 be set to a downloading mode as the start of preparation for downloading, an access be made at a recording start position on the disc 101 and the system controller await in a recording pause state, and then the system controller monitor ATRAC data to be input and start or stop a downloading (recording) operation according to the monitor result.

After the setup instruction is issued, the CPU 80 starts outputting ATRAC data, the contents to be downloaded, through the IEEE-1394 interface 60 in a step F407. In other words, for example, only the ATRAC data of the selected channel is output among the received ATRAC data of 10 channels.

When the CPU issues the setup instruction in the step F406, the processing proceeds from a step F454 to a step F455 at the system controller 111. The downloading mode is set, the heads (optical head 103 and magnetic head 121) are moved to the recording start position, and the system controller is set to a recording pause status.

In the following step F456, processing for monitoring ATRAC data to be input through the IEEE-1394 interface 125 is started.

In this ATRAC-data monitoring processing, the system controller 111 monitors the TS packets shown in FIG. 12 and FIG. 13 in downloading. More specifically, the data-start indicator, the data-end indicator, the PES data counter, and the present PES number all shown in FIG. 13, and the transport error indicator in the transport packet header shown in FIG. 12 are monitored.

The IEEE-1394 interface 125 detects an error by using a checksum data shown in FIG. 13 and FIG. 14 in the input ATRAC data.

When the system controller 111 completes the above setup processing, it reports the completion of the setup processing in a step F457, and then the processing proceeds to the procedure S23.

When the CPU 80 of the IRD 12 receives this setup completion report, the processing proceeds from a step F408 to the procedure S13.

As described above, in setting up for downloading in the present embodiment, the IRD 12 instructs the MD recorder 13A to execute downloading, more specifically, requests the MD recorder 13A to independently control the start and stop of downloading (recording).

Since a status change is reported, the IRD 12 determines the operation condition of the MD recorder 13A during downloading.

2-7. Downloading ATRAC Data

The procedures S13 and S23, in which actual downloading of ATRAC data is performed, will be described below by referring to FIG. 37.

The start and stop of this downloading operation are controlled by the MD recorder 13A with the above setup processing. The IRD 12 just selects by the IEEE-1394 interface 60 and outputs the ATRAC data to be downloaded. The IRD 12 also performs processing required for reporting a downloading progress condition to the user.

After starting the monitor processing in the step F456 shown in FIG. 36, the system controller 111 of the MD recorder 13A waits for the start timing of the musical piece to be downloaded in the input ATRAC data. Specifically, the system controller 111 waits for a data status indicator of 1 to be detected in a TS packet.

When the start timing is detected, the processing proceeds to a step F552. From ATRAC data in the TS packet, recording onto the disc 101 is started. Since this operation changes the status, the status change, a transition to a recording state, is reported to the CPU 80 in a step F553.

After having started recording, the system controller 111 consecutively monitors the end of the ATRAC data in a step F554, responds to a time data request from the CPU 80 in a step F555, and monitors an error in a step F556.

When the status change, the transition to a recording state, has been reported in the step F553, the CPU 80 indicates on the monitor unit 14 that downloading has started, and the processing proceeds from a step F501 to a step F502. An internal timer is reset and a time count is started. This time counting operation is used for issuing a time-data request at a constant-time interval to display a downloading process condition.

Then, the CPU 80 determines in a step F503 whether a status change report indicating the completion of recording has been received from the system controller 111, monitors an error-occurrence report in a step F504, and determines in a step F505 whether a predetermined time has elapsed by using the time count.

While the MD recorder 13A appropriately continues downloading, the IRD 12 (monitor unit 14) displays the progress condition. This display processing will be described below.

When it is determined that the predetermined time has elapsed by using the time count, the processing in the CPU 80 proceeds from the step F505 to a step F506. The CPU 80 requests the system controller 111 to report time data (HMS (hours, minutes, and seconds) time data with the top of the musical piece being set to 0 hours, 0 minutes, and 0 seconds) related to the ATRAC data currently being downloaded.

Receiving this request, the processing proceeds from the step F555 to a step F559 and the system controller 111 checks the time position of the ATRAC data currently being recorded and reports the time to the CPU 80. Since the ATRAC data is four times faster than that in actual time and the quadruple-speed ATRAC data is recorded as is, the reported time data is not measured in an actual time during downloading, but corresponds to an actual time for which the ATRAC data is actually reproduced.

This time data is determined from an address on the recording disc or a data address included in the ATRAC data.

When the HMS time data has been received, the processing proceeds from a step F507 to a step F508, and the CPU 80 displays on the monitor unit 14 the downloading progress condition according to the time data. The current recording time position is indicated, for example, with the total performance time of the ATRAC data (musical piece) being set to 100%.

FIG. 38 shows examples of condition indications. FIG. 38(*a*) shows a case in which an indication 21F of the downloading progress condition is shown in percentage with the screen shown in FIG. 4(*a*).

FIG. 38(*b*) shows a case in which an indication 21F of the downloading progress condition is shown in a bar-graph form with the screen shown in FIG. 4(*b*).

Various indication formats can be considered. Any indication needs to report the user the progress condition of downloading until the end of the musical piece.

When the display control process is performed in the step F508, the processing returns to the step F502. The timer is reset again and started. When the predetermined time has elapsed, the processes in the steps F505, F506, F507, and F508 are performed.

When the predetermined time is set to one minute, for example, the progress condition indicated in percentage rises every one minute on the screen. The user can roughly determine the time required for completing the downloading.

The predetermined time for updating the indication may be set to a shorter period, such as 30 seconds, 10 seconds, or five seconds. The shorter it is, the smoother the percentage indication changes.

Error monitoring of the system controller 111 during a downloading (recording) operation will be described below.

The system controller 111 checks the PES data counter and the present PES number shown in FIG. 13 in every TS packet in the ATRAC data to be sent.

Since continuity of TS packets can be checked from these two factors, if a TS packet is not input for some reason, the fact that the ATRAC data is missing can be recognized.

When such a continuity error is found, the processing in the system controller 111 proceeds from the step F556 to a step F560. The system controller reports an error to the CPU 80. Since it is not appropriate to continue downloading while the error has occurred, the processing proceeds to the procedure S26, described later.

When the CPU 80 receives an error report, the processing proceeds from the step F504 to the procedure S16, described later.

In addition to such a data continuity check, the system controller 111 may monitor other errors at the same time.

When the transport error indicator in the TS packet header is monitored, the reliability of ATRAC data in the TS packet can be determined. Therefore, when unreliable ATRAC data is input, it may be determined that an error has occurred.

In addition, an error is detected by using a checksum data in a TS packet. When the error is detected, it is determined that the error has occurred.

In addition to an error on the input ATRAC data, an operational error (which adversely affects recording data) of the MD recorder 13A may be checked.

When downloading ATRAC data continues without an error, the system controller 111 detects a data-end indicator of 1 in a TS packet at a certain point of time.

Since this means that the TS packet is the last one in the musical piece, the processing proceeds from the step F554 to a step F557. Recording on the disc 101 is terminated with ATRAC data in the last TS packet being recorded last.

Since this means that the status has been changed, the processing proceeds to a step F558 to report that the status has been changed from a recording condition to a stop condition. And then, the processing proceeds to the procedure S24.

When the CPU 80 has received a status change report indicating the completion of recording, the processing proceeds from the step F503 to the procedure S14.

As described above, processing during downloading is performed in the procedures S13 and S23.

Since the MD recorder 13A controls the start and stop of the downloading (recording), a small load is imposed on the IRD 12. The IRD 12 only needs to output the ATRAC data to be downloaded and wait for a report of the start or stop of the downloading.

Since the downloading progress condition is indicated on the monitor unit 14 during recording, the progress condition is appropriately presented to the user and the downloading operation is made easy-to-understand for the user.

As the progress condition, for example, an actual elapsed time (elapsed time of actual downloading operation) during downloading or the time position (elapsed time position in the musical piece) of the ATRAC data, or both may be indicated.

In the present embodiment, downloading of quadruple-speed ATRAC data is described. When audio data is downloaded in an actual time with the use of a unit (such as the MD recorder 13E, 13F, or 13G shown in FIG. 20) not conforming to ATRAC inputs, the same progress condition can be displayed. When audio data is sent to the storage device 13 in a low speed or in burst, a progress condition can be shown.

When the storage device 13 has a display function such as the display section 129 of the MD recorder 13A, the same progress condition may be indicated by the use of the display function. In this case, the CPU 80 needs to report the total performance time of the musical piece to the system controller 111 such that the system controller 111 determines the percentage of the ATRAC data which has been recorded to the total time.

When appropriate downloading cannot be executed due to some error in the present embodiment, since the system controller 111 report an error to the CPU 80 and the procedures S16 and S26 are performed, an appropriate action is taken.

2-8. Downloading Management/Additional Information and End Processing

Processing in the procedures S14 and S24 will be described below by referring to FIG. 39 and FIG. 40.

When ATRAC data has been normally recorded on the disc 101 in the procedures S13 and S23, management information and additional information related to the ATRAC data are next recorded on the disc 101.

In a usual case, the MD recorder 13A generates management information related to ATRAC-data recording, disposed at U-TOC sector 0, that is, the start address as a recording position corresponding to the track number, the end address, and the track mode, when data recording is completed, and updates the U-TOC sector-0 information.

When the IRD 12 instructs to be the downloading mode, the IRD 12 sends track-mode data.

Figure 39:
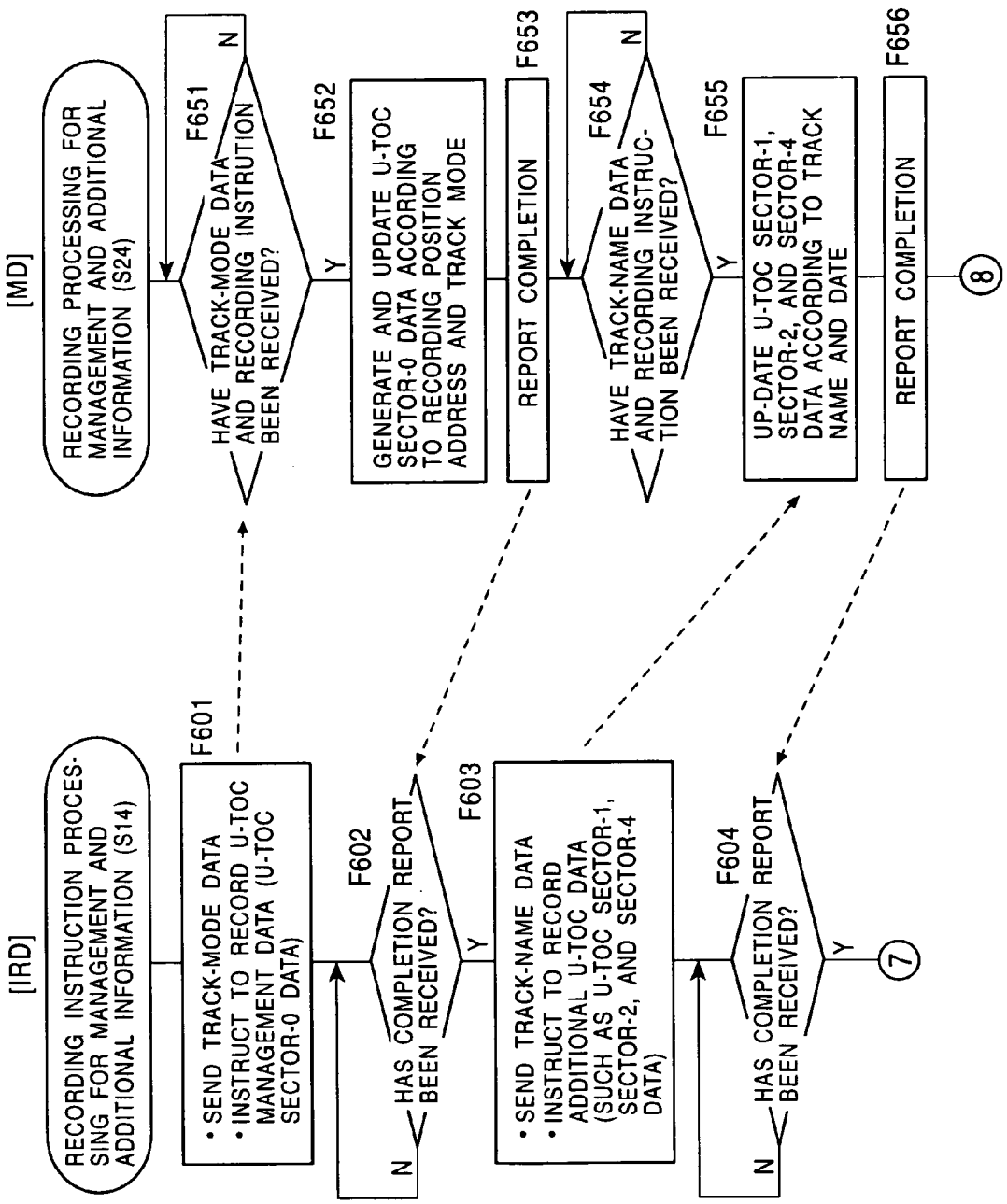
FIG. 39 is a flowchart of recording processing for management information and additional information.

In a step F601 shown in FIG. 39, the CPU 80 of the IRD 12 sends the track-mode data related to the downloaded ATRAC data to the system controller 111. According to the information of copyright, original/copy, stereo/mono, and emphasis described in the FDF shown in FIG. 13, for example, eight-bit track-mode data (track-mode data conforming to the U-TOC format in a Mini Disc system) is generated and sent. The CPU 80 also instructs to update the U-TOC sector-0 information with the use of the generated data.

When the system controller 111 has received such track-mode data and command, the processing proceeds from a step F651 to a step F652. The U-TOC sector-0 information related to the disc 101, for example, stored in the RAM 113, is updated. The received track mode and the start and end addresses of recording are written correspondingly to the track number of the recorded ATRAC data.

The U-TOC sector-0 information on the disc 101 may be updated, for example, when the disc 101 is ejected or the MD recorder 13A is turned off. The U-TOC may be updated actually at this point of time on the disc 101. The other U-TOC sector data, the AUX-TOC data, and the AUX data may also be updated in the same way. In some cases, it is appropriate for the AUX data to be written into the disc 101 when it is sent from the IRD 12, due to the capacity of the RAM 113.

When the system controller 111 finishes the U-TOC sector-0 processing, the system controller 111 reports the completion of the processing to the CPU 80 in a step F653.

When the CPU 80 receives this completion report, the processing proceeds from a step F602 to a step F603. The CPU 80 sends the track-name data (that is, the title of the musical piece) to be written into the U-TOC sector 1 or sector 4, and instructs the system controller 111 to perform processing for the U-TOC sector-1 data and others.

When the system controller 111 has received such track-name data and command, the processing proceeds from a step F654 to a step F655. The U-TOC sector-1, sector-2, and sector-4 information related to the disc 101, stored in the RAM 113, is updated. The track name and the recording time are written correspondingly to the track number of the recorded ATRAC data according to the received track-name data and the current time data which the system controller 111 has.

When the system controller 111 finishes the process related to the U-TOC sectors starting from the U-TOC sector 1, the system controller 111 reports the completion of the process to the CPU 80 in a step F656. Then, the processing proceeds to a step F657 shown in FIG. 40 as indicated by a connector 8.

The system controller 111 determines in the step F657 whether text data and a recording instruction have been received, determines in a step F660 whether image data and a recording instruction have been received, and determines in a step F663 whether a downloading-termination instruction has been received.

Figure 40:
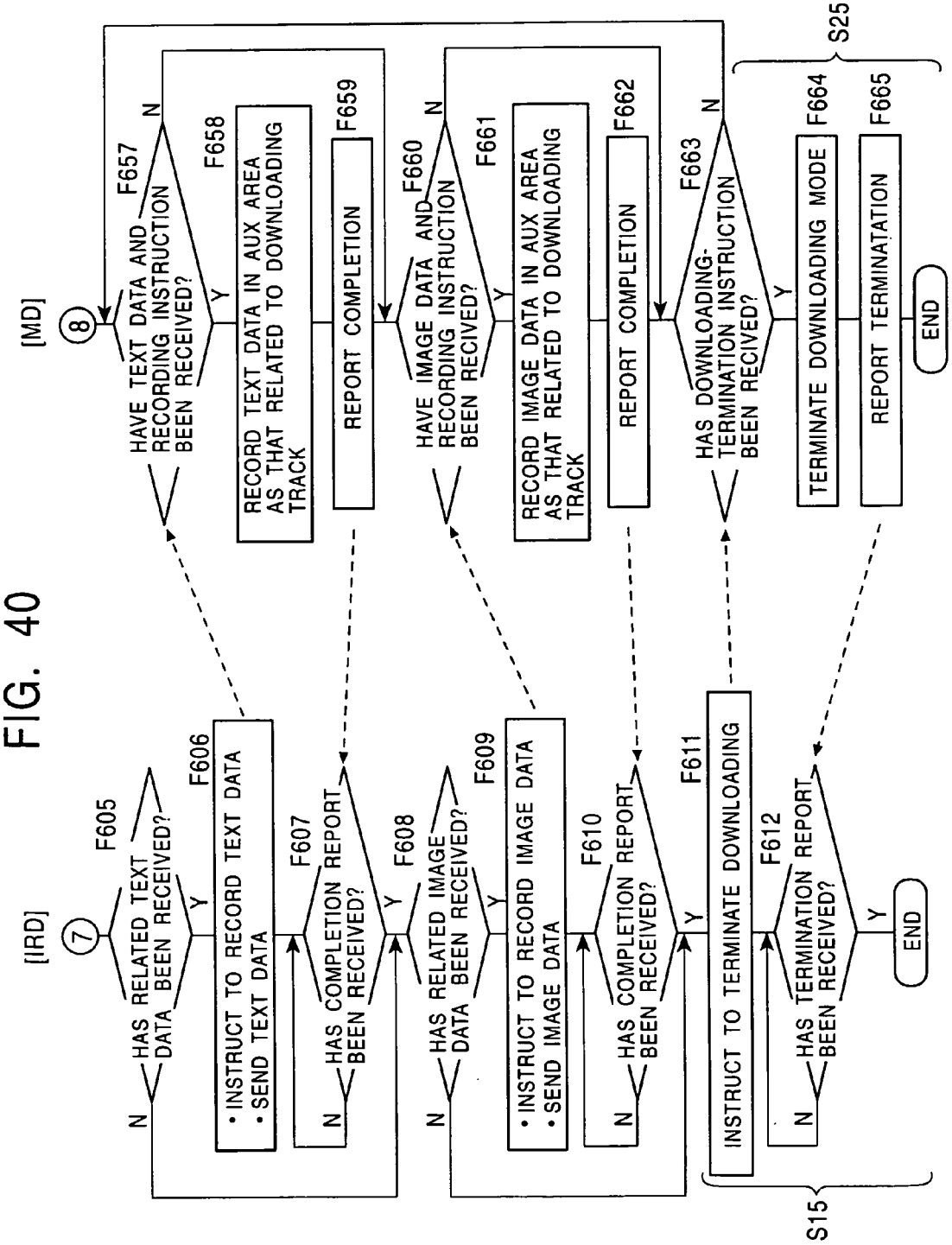
FIG. 40 is a flowchart of the recording processing for management information and additional information.

When the CPU 80 receives the completion report sent in the step F656 from the system controller 111, the processing proceeds from a step F604 shown in FIG. 39 to a step F604 shown in FIG. 40 as indicated by a connector 7.

In the step F605, it is determined that text data has been broadcasted as additional information accompanied by the downloaded ATRAC data. The text data includes the lyrics data of the musical piece, an artist profile, and the liner note of an album. These types of data are broadcasted, if any, as additional audio information as shown in FIG. 6.

When text data accompanied by the downloaded ATRAC data has not been broadcasted, the processing proceeds to a step F608. When such text data has been broadcasted, the processing proceeds to a step F605. The CPU 80 sends the text data to the system controller 111 and issues a recording instruction command.

When the text data and command have been sent in the step F605, the processing in the system controller 111 proceeds from a step F657 to a step F658. The system controller 111 records the text data in the AUX area of the disc 101 as the AUX-text-file data corresponding to the track of the downloaded data recorded on the disc 101. The management information data of the file is also written into AUX-TOC.

When this process is finished, the system controller 111 reports the completion of the process to the CPU 80 in a step F659. The CPU 80 waits for this completion report in a step F607, and the processing proceeds to a step F608 when the CPU 80 receives it.

In the step F608, the CPU 80 determines that image data has been broadcasted as additional information accompanied by the downloaded ATRAC data. The image data includes the album jacket of the musical piece and a photograph of the artist. These types of data are broadcasted, if any, as additional audio information as shown in FIG. 6.

When image data accompanied by the downloaded ATRAC data has not been broadcasted, the processing proceeds to a step F611. When such image data has been broadcasted, the processing proceeds to a step F609. The CPU 80 sends the image data to the system controller 111 and issues a recording instruction command.

When the image data and command have been sent in the step F609, the processing in the system controller 111 proceeds from a step F660 to a step F661. The system controller 111 records the image data in the AUX area of the disc 101 as the AUX-image-file data corresponding to the track of the downloaded data recorded on the disc 101. The management information data of the file is also written into AUX-TOC.

When this process is finished, the system controller 111 reports the completion of the process to the CPU 80 in a step F662. The CPU 80 waits for this completion report in a step F610, and the processing proceeds to a step F611 when the CPU 80 receives it.

When the processing proceeds to the step F611, the procedure S14 in the CPU 80 has been finished. Downloading end processing in the procedure S15 starts next.

The CPU 80 sends a downloading end instruction command to the system controller 111 in the step F611.

When the system controller 111 receives this downloading end instruction, the procedure S24 has been finished and down loading end processing in the procedure S25 starts. The processing proceeds from a step F663 to a step F664. Since a series of downloading operations has been finished, the downloading mode is terminated. In a step F665, the system controller 111 reports the termination of the downloading mode to the CPU 80. The downloading mode processing in the system controller 111 has been thus finished.

The CPU 80 waits for a termination report in a step F612. When it receives the termination report from the system controller 111, the CPU 80 terminates the series of downloading processes, and displays a message of downloading termination on the monitor unit 14.

As described above, the IRD 12 sends the track mode, the track name, text data, and image data accompanied by the downloaded ATRAC data to the MD recorder 13A and records them on the disc 101 in relation to the ATRAC data.

Assuming that downloading means musical-piece sales, since not only the audio data but also characters and image data are sent, a user service has been enhanced.

Especially when data superposed on a broadcast as a track mode, such as copyright information, which the broadcasting station (the contents sending side) has given, is recorded, it is suited to copyright protection and appropriate reproduction condition setting.

2-9. Error Processing

When an error is detected in the procedures S13 and S23, processing shown in the procedures S16 and S26 is executed. The processing will be described below by referring to FIG. 41.

Figure 37:
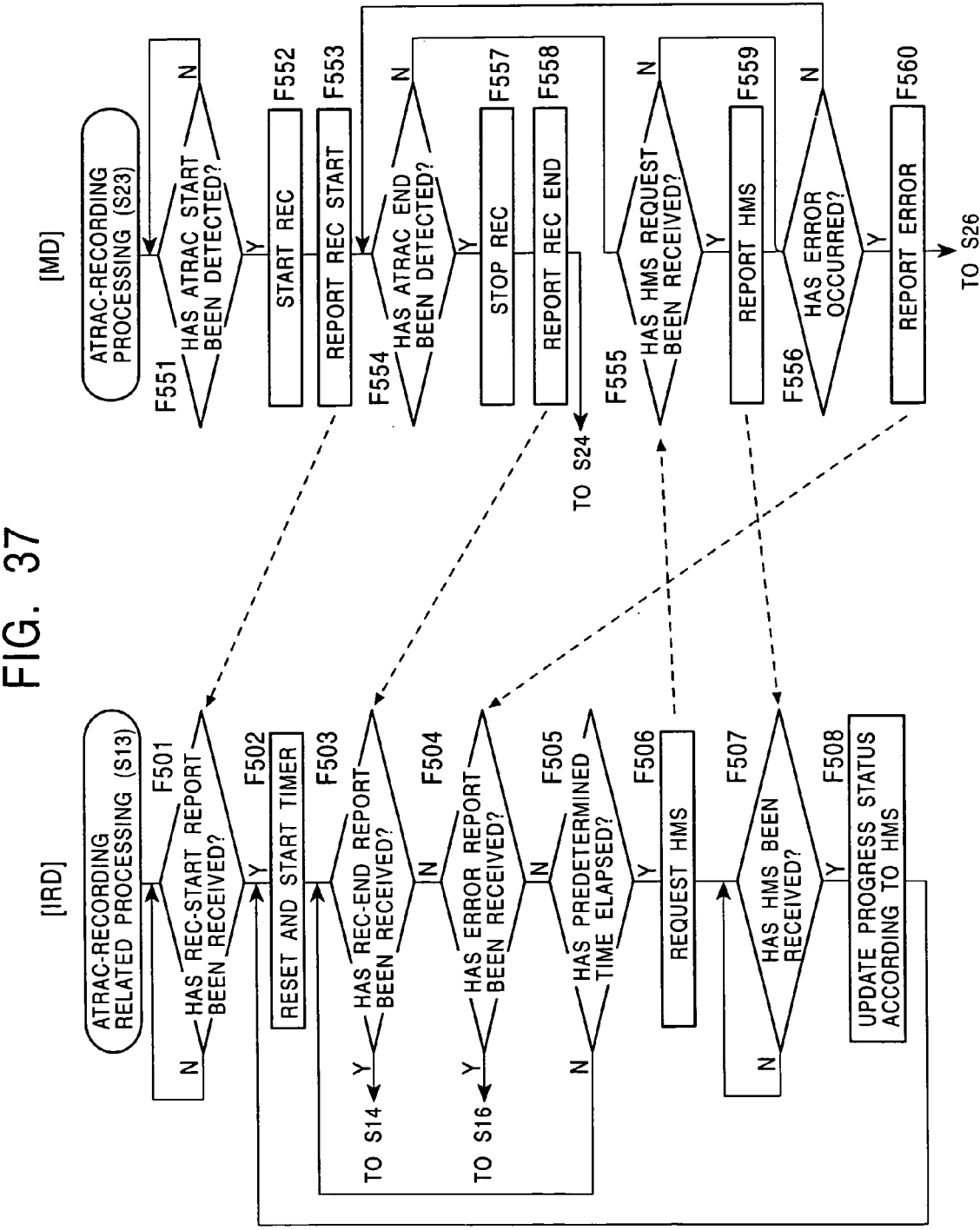
FIG. 37 is a flowchart of ATRAC recording processing in the present embodiment.
Figure 41:
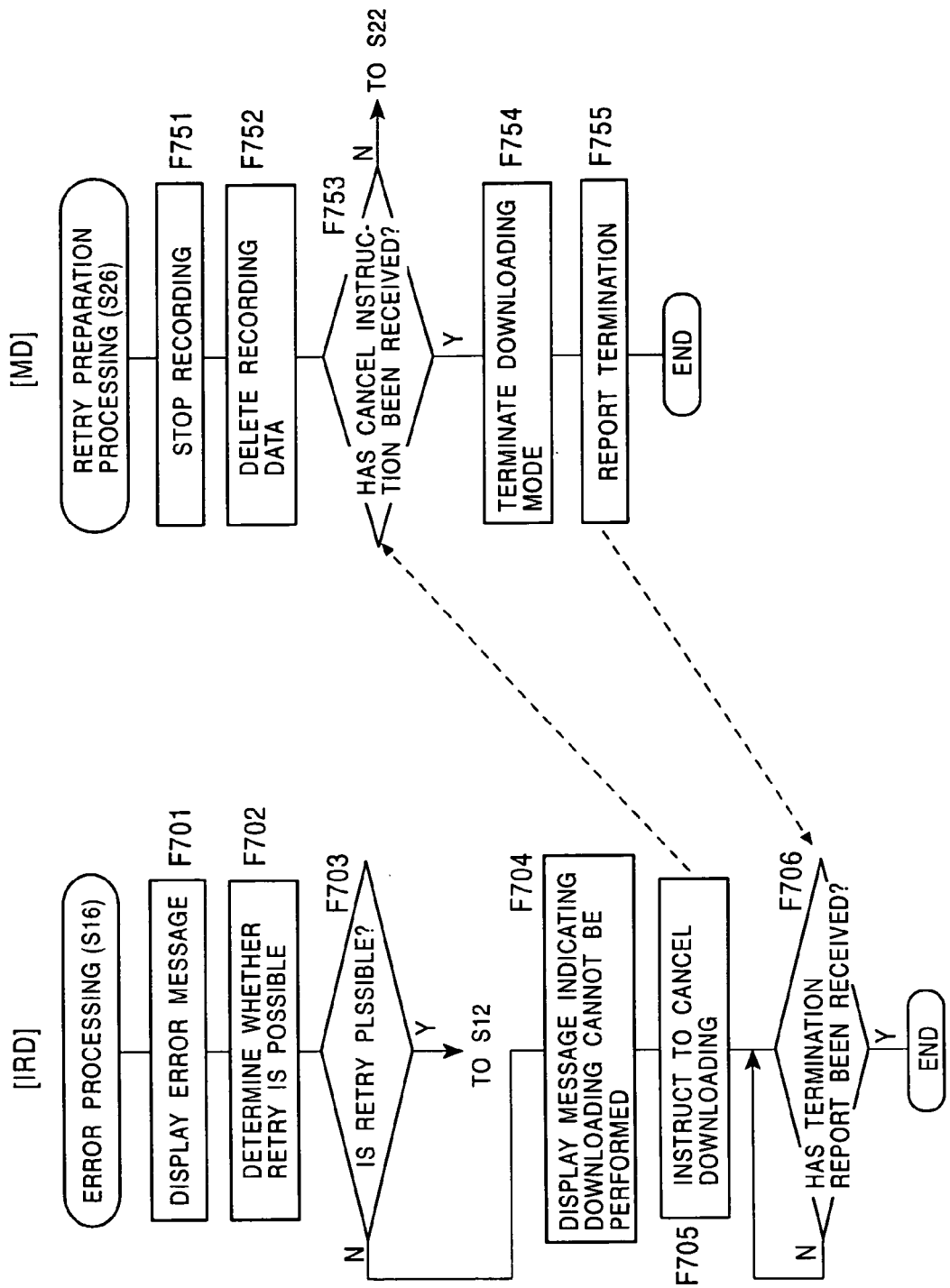
FIG. 41 is a flowchart of error processing in the present embodiment.

When the processing in the IRD 12 proceeds from the step F504 shown in FIG. 37 to the procedure S16, control is performed to display an error message in a step F701 shown in FIG. 41. A message such as "Error occurred during downloading. Downloading will be restarted." is displayed on the monitor unit 14 to the user.

In a step F702, it is determined whether a retry of downloading is actually possible.

Since ATRAC data is repeatedly broadcasted within a broadcasting period of one event as shown in FIG. 6, for example, if downloading fails, the same ATRAC data is broadcasted again in the event. Therefore, a retry of downloading is possible at the timing of the top of the same musical piece to be broadcasted next.

When an error has occurred while the last ATRAC data of the musical piece is being downloaded in the event, however, a retry of downloading is impossible.

In addition, if an error has occurred just in data, a retry of downloading is possible. When an error has occurred in the MD recorder 13A, a retry of downloading may be impossible in some cases.

The CPU 80 determines whether a retry of downloading is possible with the above conditions taken into account. When a retry of downloading is possible, the processing proceeds from a step F703 to the procedure S12. In other words, the setup processing for downloading will be again performed.

On the other hand, in the system controller 111, when an error has been detected and the processing proceeds to a step F751, the recording operation for the ATRAC data into the disc 101 is stopped first.

In a step F752, the ATRAC data recorded to an intermediate point is deleted. Since it is deemed that recording on the disc 101 has been performed when the U-TOC sector-0 data is updated, this deleting process can be performed just by internally clearing the address of the current recording position in the system controller 111.

When a downloading cancel instruction is not received from the CPU 80, the processing proceeds to the procedure S22. The setup processing for downloading will be again performed according to an instruction from the CPU 80 in the procedure S12.

When an error has occurred in the above condition, downloading is stopped but a retry of downloading is performed afterwards.

When a retry of downloading is impossible for some reason as described above, the processing at the CPU 80 proceeds to a step F709. A message indicating that downloading cannot be performed is shown to the user. Namely, a message such as "Downloading cannot be performed again. Downloading is canceled." is displayed on the monitor unit 14.

In a step F705, the CPU 80 instructs the system controller 111 to cancel downloading.

In this case, the processing at the system controller 111 proceeds from a step F753 to a step F754. Since the downloading operation has been canceled, the system controller 111 terminates the downloading mode. Then, in the next step F7555, the system controller 111 report the termination of downloading to the CPU 80. In other words, the downloading mode processing in the system controller 111 has been terminated.

On the other hands, the CPU 80 waits for the termination report in a step F706. When the CPU 80 receives the termination report from the system controller 111, the CPU 80 cancels the series of downloading processing.

It is understood from the above processes that, even if a data error occurs during downloading, a retry of downloading is performed in many cases and a downloading operation which the user requests is correctly implemented. When an error occurs, downloading does not continue in this system. This maintains the quality of downloaded data and is suited to a data sales system.

If a retry of downloading is impossible, the user is correctly informed of the condition. In addition, downloading is canceled, and thereby inappropriate data cannot be sold to the user.

ATRAC data which had been recorded until an error occurred can be used as effective data together with a retry operation.

In this case, the system controller 111 stores the recording address (the number of a TS packet or a PES packet, for example) used immediately before the error occurred, and the recording position on the disc 101 is also stored. And in a retry operation, when the ATRAC data is input up to the address (the TS packet or the PES packet), recording is restarted from the next recording position on the disc 101 with data in the next packet being handled as a starting point.

The following operation can be performed to reduce the number of cases in which a retry of downloading is determined to be impossible.

When a error occurs due to a malfunction of the MD recorder 13A, for example, a retry of downloading is executed for another unit (such as the MD recorder 13B).

When an error occurs in the last ATRAC data in an event and it is determined that a retry of downloading is impossible, the same downloading operation is reserved. When the same musical piece is broadcasted afterwards, it is automatically downloaded.

The structure and example processes have been described in detail so far in the present embodiment. In addition to the above-described processes, various specific processes can be of course considered.

The communication methods between units or communication commands are not limited to those described in the above embodiment.

In the above embodiment, the IRD 12 is separated from the storage device 13. They may be integrated as a unit.

The broadcasting transmission and receiving system is not limited to that employing the DSM-CC method. The present invention can also be applied to any system employing a transmission method having the transmission format described in the above embodiment. In addition to a digital broadcasting system, the present invention can also be applied to a cable-TV broadcasting system and an Internet broadcasting system.

What is claimed is:

1. User receiving apparatus provided at a user end for receiving a repeatedly broadcast multiplexed data signal broadcast from a transmission end remote to the user receiving apparatus, the user receiving apparatus comprising:

a receiving unit operable to accept the repeatedly broadcast multiplexed data signal from a communications channel broadcast from the transmission end remote to the user receiving apparatus;

a demultiplexer operable to extract a desired data signal from the repeatedly broadcast multiplexed data signal;

an instruction unit operable to send download mode instructions to a designated storage unit selected by the user from two or more storage units located at the user end and connected to the user receiving apparatus, the download mode instructions at least indicating that the user-selected storage unit should enter a ready-to-download mode for downloading the desired data signal from the repeatedly broadcast multiplexed data signal;

a status determination unit operable to receive download status information from the user-selected storage unit indicating at least whether the user-selected storage unit has entered the ready-to-download mode; and a controller operable to permit the downloading of the desired data signal from the demultiplexer to the user-selected storage unit as a function of the download status information.

2. The apparatus of claim 1, wherein at least one of the receiving unit, the demultiplexer, the instruction unit, the status determination unit, and the controller are separately implemented.

3. The apparatus of claim 1, wherein at least two of the receiving unit, the demultiplexer, the instruction unit, the status determination unit, and the controller are integrally implemented.

4. The apparatus of claim 1, wherein the storage device controls start and stop conditions for downloading independently of the controller.

5. The apparatus of claim 1, wherein the instruction unit is operable to provide a wait instruction to the storage unit which indicates that the storage unit should wait until a scheduled time is reached to download the desired data signal.

6. The apparatus of claim 1, wherein the instruction unit is operable to provide a setup instruction to the storage unit which indicates that the storage unit should transmit download status changes to the status determination unit during the downloading of the desired data signal.

7. The apparatus of claim 6, wherein the controller permits release of the desired data signal to the storage unit such that the storage unit independently controls a download start and a download stop by monitoring data start and data stop indicators within the desired data signal.

8. The apparatus of claim 7, wherein the desired data signal is in an ATRAC compressed format.

9. The apparatus of claim 1, wherein:

the status determination unit is operable to request the downloading status information from the storage unit; and the controller unit is operable to (i) compute downloading completion information from the downloading status information, and (ii) output the downloading completion information to a display unit.

10. The apparatus of claim 9, wherein the status determination unit is operable to request the downloading status information on a periodic basis.

11. The apparatus of claim 9, wherein the downloading status information includes time data and the controller is operable to compare the time data with a total time value contained within the desired data signal to obtain the downloading completion information.

12. The apparatus of claim 11, wherein the downloading completion information represents at least one of: (i) a numerical percentage of downloading completion; and (ii) elapsed time in downloading.

13. The apparatus of claim 1, wherein:
the status determination unit is operable to receive an error signal from the storage unit indicating that at least one of a packet continuity error, a transport error, a checksum error, and an operational error has occurred; and
the controller is operable to output an error message to a display unit in response to the error signal.

14. The apparatus of claim 13, wherein the controller is operable to instruct the storage unit to retry the downloading of the desired data signal at a next scheduled time at which the desired data signal is available to download.

15. The apparatus of claim 13 wherein:
the controller is operable to (i) determine whether a download retry is possible in response to the error signal; and (ii) output a message to the display unit indicating that downloading cannot be accomplished when the downloaded retry is not possible; and
the instruction unit is operable to output a download mode instruction to the storage unit to terminate downloading when the controller determines that the download retry is not possible.

16. The apparatus of claim 1, wherein the instruction unit is operable to request that the storage unit record management data concerning the downloaded desired data signal when downloading is complete.

17. The apparatus of claim 16, wherein the management data includes at least one of U-TOC data, AUX-TOC data, and AUX data obtained from the desired data signal.

18. The apparatus of claim 1, wherein the instruction unit is operable to request, and the status determination unit is operable to receive, download readiness information from the storage unit, the download readiness information including at least one of (i) whether the storage unit is powered on; (ii) whether a storage medium is loaded in the storage unit; (iii) whether the storage medium is write protected; and (iv) whether the storage medium has requisite storage capacity to store the desired data signal.

19. The apparatus of claim 1, wherein the controller is operable to facilitate downloading of the desired data signal from the demultiplexer to one or more storage units.

20. The apparatus of claim 19, wherein the controller is operable to register a new storage unit that is connected to the apparatus.

21. The apparatus of claim 20, wherein:
the instruction unit is operable to request identification information from the new storage unit; and
the controller is operable to store the identification information received from the new storage unit.

22. The apparatus of claim 21, wherein the instruction unit is further operable to request, and the controller is operable to: (i) receive storage unit information from the storage unit, including storage unit type, detailed type, and ATRAC compression capability; and (ii) store the requested information.

23. The apparatus of claim 22, wherein the storage unit type information includes at least one of an analog VCR type, a digital VCR type, a DV type, a D-VHS type, an MD recorder type, a CD recorder type, a DVD recorder type, and a hard disc drive type.

24. The apparatus of claim 22, wherein the detailed type information includes at least one of an analog VCR indication, an MD recorder indication, and a DVD recorder indication.

25. The apparatus of claim 20, wherein the controller is operable to perform at least one function selected from (i) assigning the new storage unit a name by default; and (ii) assigning the new storage unit the name in accordance with a user instruction.

26. The apparatus of claim 25, wherein the controller is operable to prompt the user to select at least one of the one or more storage units into which the desired data signal is to be downloaded by selecting the name of the storage unit.

27. The apparatus of claim 19, wherein the controller is operable to prompt the user to select at least one of the one or more storage units into which the desired data signal is to be downloaded.

28. The apparatus of claim 19, wherein the controller is operable to register that the storage unit has been disconnected from the apparatus.

29. A method for downloading a desired data signal from a repeatedly broadcast multiplexed data signal broadcast from a remote transmission end to a user end, comprising:
receiving at the user end the repeatedly broadcast multiplexed data signal from a communications channel broadcast from the transmission end remote to the user end;
demultiplexing the repeatedly broadcast multiplexed data signal at the user end to extract the desired data signal;
sending download mode instructions at the user end to a designated storage unit selected by the user from two or more storage units located at the user end, the download mode instructions at least indicating that the user-selected storage unit should enter a ready-to-download mode for downloading the desired data signal from the repeatedly broadcast multiplexed data signal;
receiving download status information at the user end from the user-selected storage unit indicating at least whether the user-selected storage unit has entered the ready-to-download mode; and
downloading the desired data signal at the user end to the user-selected storage unit as a function of the download status information.

30. The method of claim 29, wherein the downloading of the desired data signal to the storage unit is performed such that the storage unit independently controls start and stop conditions for downloading.

31. The method of claim 30, wherein the storage unit independently controls the start and stop conditions by monitoring data start and data stop indicators within the desired data signal.

32. The method of claim 31, wherein the desired data signal is in an ATRAC compressed format.

33. The method of claim 29, further comprising providing a wait instruction to the storage unit which indicates that the storage unit should wait until a scheduled time is reached to download the desired data signal.

34. The method of claim 29, further comprising providing a setup instruction to the storage unit which indicates that the storage unit should transmit download status changes to the status determination unit during the downloading of the desired data signal.

35. The method of claim 29, further comprising:
   requesting the downloading status information from the storage unit;
   computing downloading completion information from the downloading status information; and
   outputting the downloading completion information to a display unit.

36. The method of claim 35, wherein the request for the downloading status information is performed on a periodic basis.

37. The method of claim 35, wherein the downloading status information includes time data, the method further comprising comparing the time data with a total time value contained within the desired data signal to obtain the downloading completion information.

38. The method of claim 37, wherein the downloading completion information represents at least one of: (i) a numerical percentage of downloading completion; and (ii) elapsed time in downloading.

39. The method of claim 29, further comprising:
   receiving an error signal from the storage unit indicating that at least one of a packet continuity error, a transport error, a checksum error, and an operational error has occurred; and
   outputting an error message to a display unit in response to the error signal.

40. The method of claim 39, wherein the storage unit retries the downloading of the desired data signal at a next scheduled time at which the desired data signal is available to download.

41. The method of claim 39, further comprising:
   determining whether a download retry is possible in response to the error signal;
   outputting a message to the display unit indicating that downloading cannot be accomplished when the download retry is not possible; and
   outputting a download mode signal to the storage unit to terminate downloading when the download retry is not possible.

42. The method of claim 29, wherein the storage unit records management data concerning the downloaded desired data signal when downloading is complete.

43. The method of claim 42, wherein the management data includes at least one of U-TOC data, AUX-TOC data, and AUX data obtained from the desired data signal.

44. The method of claim 29, wherein the storage unit provides download readiness information, the download readiness information including at least one of (i) whether the storage unit is powered on; (ii) whether a storage medium is loaded in the storage unit; (iii) whether the storage medium is write protected; and (iv) whether the storage medium has requisite storage capacity to store the desired data signal.

45. The method of claim 29, further comprising downloading the desired data signal to one or more storage units.

46. The method of claim 45, further comprising registering a new storage unit.

47. The method of claim 46, wherein said registering step includes:
   requesting identification information from the new storage unit; and
   storing the identification information received from the new storage unit.

48. The method of claim 47, further comprising (i) requesting storage unit information from the new storage unit, including at least one of storage unit type, detailed type, and ATRAC compression capability; and (ii) storing the requested information.

49. The method of claim 48, wherein the storage unit type information includes at least one of an analog VCR type, a digital VCR type, a DV type, a D-VHS type, an MD recorder type, a CD recorder type, a DVD recorder type, and a hard disc drive type.

50. The method of claim 48, wherein the detailed type information includes at least one of an analog VCR type, an MD recorder type, and a DVD recorder type.

51. The method of claim 46, further comprising at least one step selected from: (i) assigning the new storage unit a name by default; and (ii) assigning the new storage unit the name in accordance with a user instruction.

52. The method of claim 51, further comprising prompting a user to select at least one of the one or more storage units into which the desired data signal is to be downloaded by selecting the name of the storage unit.

53. The method of claim 45, further comprising prompting a user to select at least one of the one or more storage units into which the desired data signal is to be downloaded.

54. The method of claim 45, further comprising registering that a storage unit has been disconnected.

* * * * *

UNITED STATES PATENT AND TRADEMARK OFFICE
CERTIFICATE OF CORRECTION

PATENT NO. : 6,931,198 B1
DATED : August 16, 2005
INVENTOR(S) : Ichiro Hamada, Masao Mizutani and Hiraku Inoue It is certified that error appears in the above-identified patent and that said Letters Patent is hereby corrected as shown below:

Column 4,
Line 60, before "misunderstanding" insert -- from --.

Column 5,
Line 30, "display" should read -- displays --.

Column 7,
Line 47, "example" should read -- examplary --.
Line 61, after "example" insert -- , --.

Column 10,
Line 32, "seconds" should read -- sends --.
Line 56, delete ",".

Column 33,
Line 38, delete "when".
Line 58, delete "a".

Column 52,
Line 38, "device" should read -- unit --.
Line 63, delete "unit".

Column 53,
Line 30, "downloaded" should read -- download --.

Column 55,
Line 1, "the" should read -- a --.

UNITED STATES PATENT AND TRADEMARK OFFICE
CERTIFICATE OF CORRECTION

PATENT NO. : 6,931,198 B1
DATED : August 16, 2005
INVENTOR(S) : Ichiro Hamada, Masao Mizutani and Hiraku Inoue It is certified that error appears in the above-identified patent and that said Letters Patent is hereby corrected as shown below:

Column 56,
Lines 39, 43 and 46, "a" should read -- the --.

Signed and Sealed this

Twenty-ninth Day of November, 2005

JON W. DUDAS
*Director of the United States Patent and Trademark Office*